US008967468B2

(12) United States Patent  
Gomez et al.

(10) Patent No.: US 8,967,468 B2
(45) Date of Patent: *Mar. 3, 2015

(54) TERMINAL INCLUDING IMAGING ASSEMBLY

(71) Applicant: Hand Held Products, Inc., Fort Mill, SC (US)

(72) Inventors: Garrison Gomez, Marietta, NY (US); Timothy R. Fitch, Syracuse, NY (US); Melvin D. McCall, Homer, NY (US); James F. O'Donnell, Camillus, NY (US); George S. Smith, II, Skaneateles, NY (US); David Sperduti, Auburn, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,762

(22) Filed: Oct. 21, 2013

(65) Prior Publication Data

US 2014/0097249 A1 Apr. 10, 2014

Related U.S. Application Data

(60) Continuation of application No. 13/225,103, filed on Sep. 2, 2011, now Pat. No. 8,561,895, which is a division of application No. 12/637,528, filed on Dec. 14, 2009, now Pat. No. 8,544,737, which is a division (Continued)

(51) Int. Cl.
*G06K 15/00* (2006.01)
*G06K 7/00* (2006.01)

(Continued)

(52) U.S. Cl.
CPC .............. *G06K 7/01* (2013.01); *G06Q 20/4014* (2013.01); *G07F 19/20* (2013.01); *G06Q 20/341* (2013.01);

(Continued)

(58) Field of Classification Search
CPC ............................... G06K 7/10; G07G 1/0018
USPC .......... 235/439, 454, 462.01, 462.43–462.46, 235/472.01, 472.02
See application file for complete search history.

(56) References Cited

U.S. PATENT DOCUMENTS 3,596,389 A 8/1971 Drueck, Jr.
3,857,626 A 12/1974 Rosenberger et al.

(Continued)

FOREIGN PATENT DOCUMENTS

AU 645909 B2 1/1994
CA 2086670 A1 11/1992

(Continued)

OTHER PUBLICATIONS

Dolphin 7400 Handheld Computer and HomeBase User's Guide, Hand Held Products, 2000, pp. 1-49.

(Continued)

*Primary Examiner* — Thien M Le
*Assistant Examiner* — April Taylor
(74) *Attorney, Agent, or Firm* — Additon, Higgins & Pendleton, P.A.

(57) ABSTRACT

A terminal includes a housing, a touch screen, and an imaging assembly. The imaging assembly in one embodiment is disposed in the housing so that an imaging axis extends externally from the housing. The imaging assembly can be utilized for capture of images disposed externally to the housing. In one embodiment a frame of image data captured utilizing an imaging assembly can be processed for attempting to decode a decodable indicia. In one embodiment a frame of image data captured utilizing an imaging assembly can be stored.

25 Claims, 39 Drawing Sheets

Related U.S. Application Data of application No. 10/252,227, filed on Sep. 23, 2002, now Pat. No. 7,748,620, which is a continuation-in-part of application No. 10/044,137, filed on Jan. 11, 2002, now abandoned.

(60) Provisional application No. 60/348,738, filed on Jan. 14, 2002, provisional application No. 60/347,708, filed on Jan. 11, 2002.

(51) Int. Cl.

| | | |
|---|---|---|
| *G06K 7/10* | (2006.01) | |
| *G06Q 20/40* | (2012.01) | |
| *G07F 19/00* | (2006.01) | |
| *G06K 7/01* | (2006.01) | |
| *G06Q 20/34* | (2012.01) | |
| *G07F 7/10* | (2006.01) | |
| *G07C 9/00* | (2006.01) | |
| *G07G 1/00* | (2006.01) | |
| *G06Q 20/00* | (2012.01) | |

(52) U.S. Cl.
CPC ............... *G07F 7/1008* (2013.01); *G07F 7/10* (2013.01); *G07C 9/00039* (2013.01); *G06Q 20/40145* (2013.01); *G07G 1/0018* (2013.01); *G07F 19/205* (2013.01); *G06Q 20/00* (2013.01)
USPC ...... 235/383; 235/439; 235/454; 235/462.01; 235/462.43; 235/472.01

(56) References Cited

U.S. PATENT DOCUMENTS

| | | |
|---|---|---|
| 3,954,244 A | 5/1976 | Gopstein |
| 4,017,129 A | 4/1977 | Boldt et al. |
| 4,075,460 A | 2/1978 | Gorgens |
| 4,126,768 A | 11/1978 | Grenzow |
| 4,134,537 A | 1/1979 | Glaser et al. |
| 4,141,078 A | 2/1979 | Bridges, Jr. et al. |
| 4,273,996 A | 6/1981 | Weimer |
| RE30,773 E | 10/1981 | Glaser et al. |
| 4,313,035 A | 1/1982 | Jordan et al. |
| 4,317,957 A | 3/1982 | Sendrow |
| 4,357,032 A | 11/1982 | Uchida |
| 4,390,968 A | 6/1983 | Hennessy et al. |
| 4,392,023 A | 7/1983 | Sears |
| 4,403,700 A | 9/1983 | Manlove |
| 4,417,136 A | 11/1983 | Rushby et al. |
| 4,432,020 A | 2/1984 | Onose et al. |
| 4,438,704 A | 3/1984 | Hutcheon |
| 4,460,965 A | 7/1984 | Trehn et al. |
| 4,471,165 A | 9/1984 | DeFino et al. |
| 4,476,468 A | 10/1984 | Goldman |
| 4,501,958 A | 2/1985 | Glize et al. |
| 4,524,396 A | 6/1985 | Schulz et al. |
| 4,529,870 A | 7/1985 | Chaum |
| 4,534,562 A | 8/1985 | Cuff et al. |
| 4,582,985 A | 4/1986 | Lofberg |
| 4,630,201 A | 12/1986 | White |
| 4,658,418 A | 4/1987 | Rodgers |
| 4,680,801 A | 7/1987 | Etherington et al. |
| 4,689,478 A | 8/1987 | Hale et al. |
| 4,689,742 A | 8/1987 | Troy et al. |
| 4,711,996 A | 12/1987 | Drexler |
| 4,747,050 A | 5/1988 | Brachtl et al. |
| 4,771,460 A | 9/1988 | Tamada et al. |
| 4,775,784 A | 10/1988 | Stark |
| 4,783,823 A | 11/1988 | Tasaki et al. |
| 4,803,347 A | 2/1989 | Sugahara et al. |
| 4,809,326 A | 2/1989 | Shigenaga |
| 4,839,781 A | 6/1989 | Barnes et al. |
| 4,843,224 A | 6/1989 | Ohta et al. |
| 4,858,121 A | 8/1989 | Barber et al. |
| 4,868,376 A | 9/1989 | Lessin et al. |
| 4,870,503 A | 9/1989 | Mura |
| 4,897,865 A | 1/1990 | Canuel |
| 4,902,079 A | 2/1990 | Kaplan et al. |
| 4,910,767 A | 3/1990 | Brugliera et al. |
| 4,917,792 A | 4/1990 | Murakami |
| 4,920,256 A | 4/1990 | Marty et al. |
| 4,920,567 A | 4/1990 | Malek |
| 4,928,001 A | 5/1990 | Masada |
| 4,930,093 A | 5/1990 | Houser et al. |
| 4,941,090 A | 7/1990 | McCarthy |
| 4,943,868 A | 7/1990 | Yoshinaga et al. |
| 5,000,598 A | 3/1991 | Jingu et al. |
| 5,001,612 A | 3/1991 | Odlum |
| 5,012,512 A | 4/1991 | Basso et al. |
| 5,025,373 A | 6/1991 | Keyser, Jr. et al. |
| D319,434 S | 8/1991 | Lund |
| 5,055,660 A | 10/1991 | Bertagna et al. |
| 5,109,426 A | 4/1992 | Parks |
| 5,115,588 A | 5/1992 | Schneider |
| 5,151,581 A | 9/1992 | Krichever et al. |
| 5,202,826 A | 4/1993 | McCarthy |
| 5,202,922 A | 4/1993 | Iijima |
| D336,464 S | 6/1993 | Clough et al. |
| 5,216,517 A | 6/1993 | Kinoshita et al. |
| 5,223,677 A | 6/1993 | Kapp et al. |
| 5,227,614 A | 7/1993 | Danielson et al. |
| 5,229,588 A | 7/1993 | Detwiler et al. |
| D338,656 S | 8/1993 | Spayde et al. |
| 5,237,487 A | 8/1993 | Dittmer et al. |
| 5,249,103 A | 9/1993 | Forsythe |
| 5,258,604 A | 11/1993 | Behrens et al. |
| 5,287,268 A | 2/1994 | McCarthy |
| 5,288,980 A | 2/1994 | Patel et al. |
| 5,297,030 A | 3/1994 | Vassigh et al. |
| 5,297,202 A | 3/1994 | Kapp et al. |
| 5,298,897 A | 3/1994 | Harrison et al. |
| D345,966 S | 4/1994 | Perez |
| 5,311,325 A | 5/1994 | Edwards et al. |
| 5,317,136 A | 5/1994 | Hasegawa et al. |
| 5,324,922 A | 6/1994 | Roberts |
| D350,120 S | 8/1994 | Tsuboi et al. |
| 5,334,821 A | 8/1994 | Campo et al. |
| 5,340,428 A | 8/1994 | Schatz |
| 5,347,589 A | 9/1994 | Meeks et al. |
| 5,352,877 A | 10/1994 | Morley |
| 5,353,331 A | 10/1994 | Emery et al. |
| 5,356,243 A | 10/1994 | Vogel |
| 5,357,563 A | 10/1994 | Hamilton et al. |
| 5,362,053 A | 11/1994 | Miller |
| 5,365,046 A | 11/1994 | Haymann |
| 5,379,037 A | 1/1995 | Harrison et al. |
| 5,384,449 A | 1/1995 | Peirce |
| 5,386,104 A | 1/1995 | Sime |
| 5,406,619 A | 4/1995 | Akhteruzzaman et al. |
| 5,414,251 A | 5/1995 | Durbin |
| 5,422,472 A | 6/1995 | Tavislan et al. |
| 5,444,226 A | 8/1995 | Collins, Jr. |
| 5,448,044 A | 9/1995 | Price et al. |
| D363,271 S | 10/1995 | Peterson |
| D363,511 S | 10/1995 | Hui |
| 5,455,829 A | 10/1995 | Klingberg |
| 5,455,861 A | 10/1995 | Faucher et al. |
| 5,464,971 A | 11/1995 | Sutcliffe et al. |
| 5,467,403 A | 11/1995 | Fishbine et al. |
| 5,479,530 A | 12/1995 | Nair et al. |
| D366,466 S | 1/1996 | Lee et al. |
| 5,489,773 A | 2/1996 | Kumar |
| 5,509,083 A | 4/1996 | Abtahi et al. |
| 5,521,966 A | 5/1996 | Friedes et al. |
| D372,730 S | 8/1996 | Sasaki |
| 5,559,885 A | 9/1996 | Drexler et al. |
| 5,561,282 A | 10/1996 | Price et al. |
| 5,568,357 A | 10/1996 | Kochis et al. |
| 5,577,118 A | 11/1996 | Sasaki et al. |
| 5,581,607 A | 12/1996 | Richardson, Jr. et al. |
| 5,586,166 A | 12/1996 | Turban |
| D377,569 S | 1/1997 | Coyer |
| 5,591,955 A | 1/1997 | Laser |
| 5,625,534 A | 4/1997 | Okaya et al. |

(56) References Cited

U.S. PATENT DOCUMENTS

| | | |
|---|---|---|
| 5,638,457 A | 6/1997 | Deaton et al. |
| 5,640,002 A | 6/1997 | Ruppert et al. |
| 5,652,806 A | 7/1997 | Friend |
| 5,657,389 A | 8/1997 | Houvener |
| 5,659,431 A | 8/1997 | Ackley |
| 5,672,860 A | 9/1997 | Miller et al. |
| 5,679,943 A | 10/1997 | Schultz et al. |
| D385,857 S | 11/1997 | Cohen et al. |
| D385,903 S | 11/1997 | Kim |
| D386,781 S | 11/1997 | Sasaki |
| 5,697,202 A | 12/1997 | Totilo |
| 5,703,349 A | 12/1997 | Meyerson et al. |
| D389,813 S | 1/1998 | Itoh |
| 5,714,745 A * | 2/1998 | Ju et al. ............ 235/469 |
| 5,717,195 A | 2/1998 | Feng et al. |
| 5,740,232 A | 4/1998 | Pailles et al. |
| 5,745,705 A | 4/1998 | Iguchi |
| 5,805,807 A | 9/1998 | Hanson et al. |
| D400,191 S | 10/1998 | Butts et al. |
| 5,818,023 A | 10/1998 | Meyerson et al. |
| 5,825,002 A | 10/1998 | Roslak |
| 5,845,256 A | 12/1998 | Pescitelli et al. |
| D404,376 S | 1/1999 | Shane et al. |
| D404,761 S | 1/1999 | Tarpenning et al. |
| 5,864,125 A | 1/1999 | Szabo |
| 5,878,124 A | 3/1999 | Griesmer et al. |
| 5,888,087 A | 3/1999 | Hanson et al. |
| 5,895,902 A | 4/1999 | Ziarno |
| 5,923,735 A | 7/1999 | Swartz et al. |
| 5,926,549 A | 7/1999 | Pinkas |
| 5,933,812 A | 8/1999 | Meyer et al. |
| 5,936,218 A | 8/1999 | Ohkawa et al. |
| 5,945,975 A | 8/1999 | Lundrigan et al. |
| D413,582 S | 9/1999 | Tompkins |
| 5,949,043 A | 9/1999 | Hayashida |
| 5,949,056 A | 9/1999 | White |
| 5,949,378 A | 9/1999 | Coveley |
| 5,959,281 A | 9/1999 | Domiteaux |
| 5,969,324 A | 10/1999 | Reber et al. |
| 5,970,148 A | 10/1999 | Meier |
| 5,979,753 A | 11/1999 | Roslak |
| 5,979,757 A | 11/1999 | Tracy et al. |
| 5,979,764 A | 11/1999 | Swyst et al. |
| 5,984,182 A | 11/1999 | Murrah et al. |
| 5,988,506 A | 11/1999 | Schaham et al. |
| 5,992,744 A | 11/1999 | Smith et al. |
| 5,992,751 A | 11/1999 | Laser |
| 6,003,008 A | 12/1999 | Postrel et al. |
| 6,003,762 A | 12/1999 | Hayashida |
| 6,004,003 A | 12/1999 | Dalton et al. |
| 6,006,990 A | 12/1999 | Ye et al. |
| 6,019,286 A | 2/2000 | Li et al. |
| 6,024,288 A | 2/2000 | Gottlich et al. |
| 6,039,258 A * | 3/2000 | Durbin et al. ............ 235/472.01 |
| 6,049,813 A | 4/2000 | Danielson et al. |
| 6,053,408 A | 4/2000 | Stoner |
| D425,558 S | 5/2000 | Tarpenning et al. |
| 6,062,475 A * | 5/2000 | Feng ............ 235/462.06 |
| 6,062,477 A | 5/2000 | Wike |
| 6,062,478 A | 5/2000 | Izaguirre et al. |
| 6,064,751 A | 5/2000 | Smithies et al. |
| 6,065,679 A | 5/2000 | Levie et al. |
| D426,237 S | 6/2000 | Wranne |
| 6,073,034 A | 6/2000 | Jacobsen et al. |
| 6,076,731 A | 6/2000 | Terrell |
| 6,078,848 A | 6/2000 | Bernstein et al. |
| 6,079,731 A | 6/2000 | Emig et al. |
| 6,084,528 A | 7/2000 | Beach et al. |
| 6,085,972 A | 7/2000 | Wright |
| 6,097,606 A | 8/2000 | Groves et al. |
| 6,101,483 A | 8/2000 | Petrovich et al. |
| 6,102,290 A | 8/2000 | Swartz et al. |
| 6,112,857 A | 9/2000 | Morrison |
| 6,118,889 A | 9/2000 | Izuno et al. |
| 6,123,261 A | 9/2000 | Roustaei |
| 6,123,263 A | 9/2000 | Feng |
| D431,590 S | 10/2000 | Brown et al. |
| D434,399 S | 11/2000 | Lanet |
| 6,142,369 A | 11/2000 | Jonstromer |
| 6,149,055 A | 11/2000 | Gatto |
| 6,149,062 A | 11/2000 | Danielson |
| 6,155,489 A | 12/2000 | Collins, Jr. et al. |
| 6,155,491 A | 12/2000 | Dueker et al. |
| 6,168,077 B1 | 1/2001 | Gray et al. |
| 6,179,206 B1 | 1/2001 | Matsumori |
| 6,179,208 B1 | 1/2001 | Feng |
| 6,193,152 B1 | 2/2001 | Fernando et al. |
| 6,196,460 B1 | 3/2001 | Shin |
| 6,199,753 B1 | 3/2001 | Tracy et al. |
| 6,223,988 B1 | 5/2001 | Batterman et al. |
| 6,230,970 B1 | 5/2001 | Walsh et al. |
| 6,234,389 B1 | 5/2001 | Valliani et al. |
| 6,243,447 B1 | 6/2001 | Swartz et al. |
| 6,246,577 B1 | 6/2001 | Han et al. |
| 6,246,995 B1 | 6/2001 | Walter et al. |
| 6,247,645 B1 | 6/2001 | Harris et al. |
| D445,418 S | 7/2001 | Chen |
| 6,253,998 B1 | 7/2001 | Ziarno |
| 6,257,487 B1 | 7/2001 | Hayashida |
| 6,266,685 B1 | 7/2001 | Danielson et al. |
| 6,268,788 B1 | 7/2001 | Gray |
| D447,136 S | 8/2001 | Groves et al. |
| 6,272,506 B1 | 8/2001 | Bell |
| 6,275,644 B1 | 8/2001 | Domas et al. |
| 6,279,825 B1 | 8/2001 | Yokoyama |
| D447,476 S | 9/2001 | Chaiken et al. |
| 6,298,176 B2 | 10/2001 | Longacre, Jr. et al. |
| 6,308,893 B1 | 10/2001 | Waxelbaum et al. |
| 6,311,165 B1 | 10/2001 | Coutts et al. |
| D451,097 S | 11/2001 | Schmeisser et al. |
| 6,311,896 B1 | 11/2001 | Mulla et al. |
| 6,313,917 B1 | 11/2001 | Tang et al. |
| 6,318,635 B1 | 11/2001 | Stoner |
| 6,321,981 B1 | 11/2001 | Ray et al. |
| D451,507 S | 12/2001 | Lin |
| D451,535 S | 12/2001 | Lee |
| 6,330,973 B1 | 12/2001 | Bridgelall et al. |
| 6,336,900 B1 | 1/2002 | Alleckson et al. |
| 6,340,114 B1 | 1/2002 | Correa et al. |
| 6,340,115 B1 | 1/2002 | Swartz |
| 6,357,662 B1 | 3/2002 | Helton et al. |
| 6,359,603 B1 | 3/2002 | Zwern |
| D455,433 S | 4/2002 | Alviar et al. |
| 6,373,511 B1 | 4/2002 | Groves et al. |
| 6,394,355 B1 | 5/2002 | Schlieffers et al. |
| 6,400,836 B2 | 6/2002 | Senior |
| 6,415,115 B1 | 7/2002 | Moritani |
| 6,415,982 B2 | 7/2002 | Bridgelall et al. |
| 6,424,949 B1 | 7/2002 | Deaton et al. |
| 6,431,444 B1 | 8/2002 | Gatto |
| 6,435,412 B2 | 8/2002 | Tsi et al. |
| 6,439,345 B1 | 8/2002 | Recktenwald et al. |
| D462,679 S | 9/2002 | Liu |
| D464,345 S | 10/2002 | Liu |
| 6,460,069 B1 | 10/2002 | Berlin et al. |
| 6,466,657 B1 | 10/2002 | Anvret et al. |
| 6,471,125 B1 | 10/2002 | Addy |
| 6,474,550 B1 | 11/2002 | Caridas |
| 6,486,862 B1 | 11/2002 | Jacobsen et al. |
| 6,492,978 B1 | 12/2002 | Selig et al. |
| 6,497,368 B1 * | 12/2002 | Friend et al. ............ 235/472.01 |
| 6,512,840 B1 | 1/2003 | Tognazzini |
| 6,532,152 B1 | 3/2003 | White et al. |
| 6,539,363 B1 | 3/2003 | Allgeier et al. |
| 6,550,683 B1 | 4/2003 | Augustine |
| 6,554,705 B1 | 4/2003 | Cumbers |
| 6,557,754 B2 | 5/2003 | Gray et al. |
| 6,572,012 B1 | 6/2003 | Gannon et al. |
| 6,575,368 B1 | 6/2003 | Tamburrini et al. |
| 6,585,159 B1 | 7/2003 | Meier et al. |
| 6,595,417 B2 * | 7/2003 | O'Hagan et al. ............ 235/383 |
| 6,596,422 B2 | 7/2003 | Ren |
| 6,598,798 B1 * | 7/2003 | Kashi et al. ............ 235/462.25 |
| D479,716 S | 9/2003 | Miller |

(56) References Cited

U.S. PATENT DOCUMENTS

| | | | |
|---|---|---|---|
| 6,676,016 B1 | 1/2004 | Coskrey, IV | |
| 6,679,425 B1 | 1/2004 | Sheppard et al. | |
| D486,176 S | 2/2004 | Flaherty et al. | |
| 6,722,569 B2 | 4/2004 | Ehrhart et al. | |
| D491,216 S | 6/2004 | Ookushi et al. | |
| D492,303 S | 6/2004 | Schlieffers et al. | |
| 6,757,156 B2 | 6/2004 | Adams et al. | |
| D492,718 S | 7/2004 | Ookushi et al. | |
| 6,779,196 B1 | 8/2004 | Igbinadolor | |
| D496,682 S | 9/2004 | Ookushi et al. | |
| D498,754 S | 11/2004 | Blyth | |
| 6,824,059 B2 | 11/2004 | Jam et al. | |
| 6,827,260 B2* | 12/2004 | Stoutenburg et al. | 235/380 |
| 6,832,729 B1* | 12/2004 | Perry et al. | 235/472.01 |
| D502,945 S | 3/2005 | Huang et al. | |
| D503,709 S | 4/2005 | Lodato et al. | |
| D504,890 S | 5/2005 | Sung et al. | |
| 6,889,904 B2 | 5/2005 | Bianculli et al. | |
| 6,942,151 B2 | 9/2005 | Ehrhart | |
| 7,086,596 B2 | 8/2006 | Meier et al. | |
| 7,106,309 B2 | 9/2006 | Wood et al. | |
| 7,121,470 B2 | 10/2006 | McCall et al. | |
| 7,219,843 B2 | 5/2007 | Havens et al. | |
| 7,331,523 B2 | 2/2008 | Meier et al. | |
| 7,357,322 B2 | 4/2008 | Patel | |
| 7,451,917 B2 | 11/2008 | McCall et al. | |
| 7,472,825 B2 | 1/2009 | Fitch et al. | |
| 7,479,976 B2 | 1/2009 | Fitch et al. | |
| 7,712,669 B2* | 5/2010 | Mahany et al. | 235/472.02 |
| 7,725,326 B1 | 5/2010 | Tracy et al. | |
| 7,748,620 B2 | 7/2010 | Gomez et al. | |
| RE41,716 E* | 9/2010 | Fernando et al. | 235/380 |
| 8,544,737 B2* | 10/2013 | Gomez et al. | 235/383 |
| 8,561,895 B2* | 10/2013 | Gomez et al. | 235/383 |
| 2001/0000405 A1 | 4/2001 | Gray et al. | |
| 2001/0003071 A1 | 6/2001 | Mansutti et al. | |
| 2001/0020640 A1 | 9/2001 | Yokochi | |
| 2001/0031549 A1 | 10/2001 | Harris et al. | |
| 2002/0140714 A1 | 10/2002 | Hoffman | |
| 2003/0018897 A1 | 1/2003 | Bellis et al. | |
| 2003/0024990 A1* | 2/2003 | Wilz et al. | 235/462.45 |
| 2003/0029917 A1 | 2/2003 | Hennick et al. | |
| 2003/0132292 A1 | 7/2003 | Gomez et al. | |
| 2003/0132293 A1 | 7/2003 | Fitch et al. | |
| 2003/0132294 A1 | 7/2003 | Gomez et al. | |
| 2003/0132297 A1 | 7/2003 | McCall et al. | |
| 2003/0132918 A1 | 7/2003 | Fitch et al. | |
| 2003/0135751 A1 | 7/2003 | O'Donnell et al. | |
| 2003/0178492 A1 | 9/2003 | Tamburrini et al. | |
| 2003/0210223 A1 | 11/2003 | Park | |
| 2003/0222147 A1 | 12/2003 | Havens et al. | |
| 2004/0020990 A1 | 2/2004 | Havens et al. | |
| 2004/0021759 A1 | 2/2004 | Kamoshida et al. | |
| 2004/0031851 A1 | 2/2004 | Bianculli et al. | |
| 2004/0129783 A1 | 7/2004 | Patel | |
| 2005/0127185 A1 | 6/2005 | Wilz et al. | |
| 2005/0279836 A1 | 12/2005 | Havens et al. | |
| 2006/0255144 A1 | 11/2006 | Meier et al. | |
| 2006/0274171 A1 | 12/2006 | Wang | |
| 2006/0283952 A1 | 12/2006 | Wang | |

FOREIGN PATENT DOCUMENTS

| | | | |
|---|---|---|---|
| CA | 2290732 A1 | 5/2001 | |
| DE | 3100662 A1 | 11/1981 | |
| DE | 69223581 T2 | 7/1998 | |
| DE | 69318883 T2 | 3/1999 | |
| DE | 69228742 T2 | 10/1999 | |
| EP | 0185782 A1 | 7/1986 | |
| EP | 0535905 A1 | 4/1993 | |
| EP | 0565253 A2 | 10/1993 | |
| EP | 0809836 A2 | 12/1997 | |
| EP | 0953949 A2 | 11/1999 | |
| EP | 1065481 A2 | 1/2001 | |
| EP | 037159233 | 1/2003 | |
| GB | 2324634 A | 10/1998 | |
| JP | 05205095 A | 8/1993 | |
| JP | 6501331 T | 2/1994 | |
| JP | 6223269 A | 8/1994 | |
| JP | 2000207638 A | 7/2000 | |
| JP | 2000515655 T | 11/2000 | |
| JP | 2001076013 A | 3/2001 | |
| SE | 470149 B | 11/1993 | |
| WO | 92/21110 A1 | 11/1992 | |
| WO | 96/26505 A1 | 8/1996 | |
| WO | 97/28512 A1 | 8/1997 | |
| WO | 98/10368 A1 | 3/1998 | |
| WO | 98/14917 A2 | 4/1998 | |
| WO | 98/19435 A2 | 5/1998 | |
| WO | 98/50876 A1 | 11/1998 | |
| WO | 99/49347 A1 | 9/1999 | |
| WO | 99/49432 A1 | 9/1999 | |
| WO | 99/60533 A1 | 11/1999 | |
| WO | 00/07585 A1 | 2/2000 | |
| WO | 00/16073 A1 | 3/2000 | |
| WO | 00/23936 A1 | 4/2000 | |
| WO | 00/36545 A1 | 6/2000 | |
| WO | 00/70585 A1 | 11/2000 | |
| WO | 00/37229 A1 | 5/2001 | |
| WO | 01/38098 A2 | 5/2001 | |
| WO | 01/61657 A1 | 8/2001 | |
| WO | 01/84771 A1 | 11/2001 | |
| WO | 03/60832 A2 | 7/2003 | |

OTHER PUBLICATIONS

Report by Applicants, Jan. 2, 2013, "Photographs of Portable Data Terminal," (contains photographs of Dolphin 7400 portable data terminal bearing a manufactured date of May 20, 2001 & corresponding, based on information & Belief, to the portable data terminal described & shown in Citation 1 of the Non-Patent Literature Documents herein entitled "Dolphin 7400 Handheld Computer and HomeBase User's Guide," dated 2000).

Aug. 2, 2012 Office Action in U.S. Appl. No. 12/637,528.

Dolphin 7400 Handheld Computer and Scanner, Product Specifications 7400/SS Rev A, 2 pages, 1999-2000.

Dolphin 7400 Mobile Computer, Product Specifications 7400/SS Rev D, 2 pages, Aug. 1, 2001.

Patent Cooperation Treaty International Search Report for PCT/US03/00756 dated Apr. 5, 2004 (5 pages).

Hand Held Products Drawing No. PC000435—Rev E, entitled "Label, TT3100, Overlay/Protector" dated Feb. 1, 2002.

Hand Held Products Drawing No. PC00034—Rev B, entitled "Label_Waterproofing_3100" dated Dec. 12, 2001.

Hand Held Products "Transaction Team 3100/3101 Interactive Signature Capture Terminal Startup Guide," 3100/01/SG Rev. A (Aug. 2002).

Hand Held Products "Transaction Team3100 Interactive Signature Capture Terminal Startup Guide," 3100/SG Rev. A (Jul. 2001).

Gosnell, David. Deadlines Loom for Debit Security Credit Card Management. Dec. 2002, vol. 15, Iss. 10, pg. 46.

From International Preliminary Examining Authority, Notification of Transmittal of International Preliminary Examination Report, Jun. 10, 2004, (4 pages).

Communication from European Patent Office including Extended International Search Report and Annex to the European Search Report regarding European Patent Application No. EP 07 01 8907.1, dated Apr. 28, 2008, 12 pages.

European Patent Office, Supplementary European Search Report EP 03 71 5923, Jun. 10, 2005, 5 pages.

Britt, Phillip. Why Security Encryption Matters to Your Bank Community Banker, Aug. 2002; p. 18.

Delphion Family Report of U.S. Patent No. 7,121,470, dated Oct. 30, 2007, 12 pages.

Report by Applicants, Patent Family Report for U.S. Appl. No. 12/637,528, Lexis Total Patent, dated Jun. 21, 2011 (31 pages).

* cited by examiner

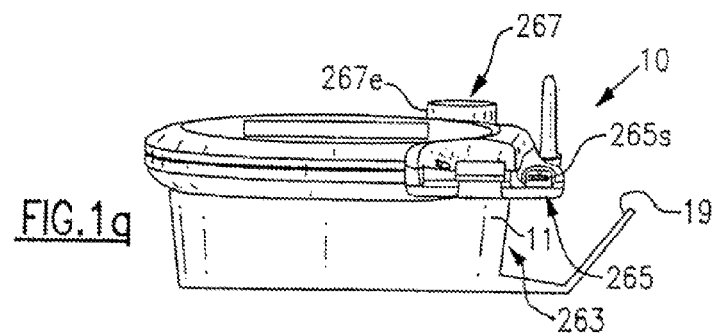
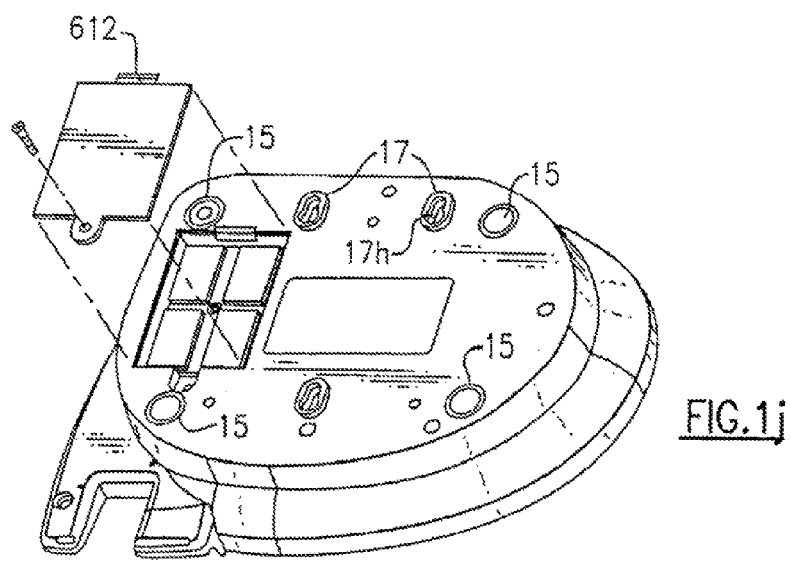
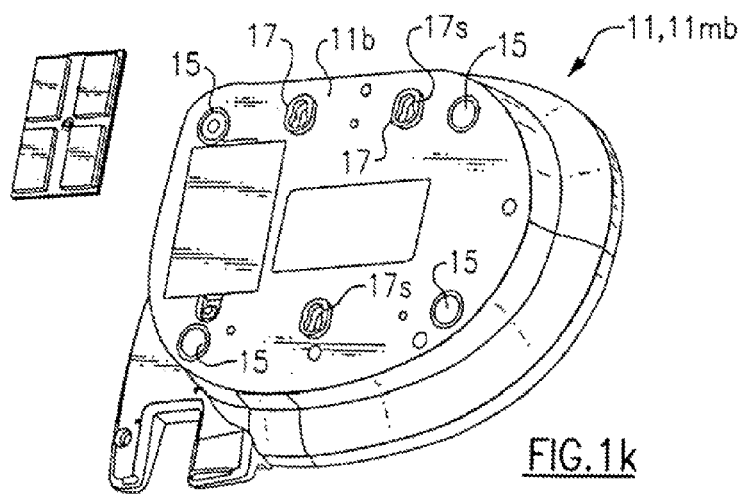

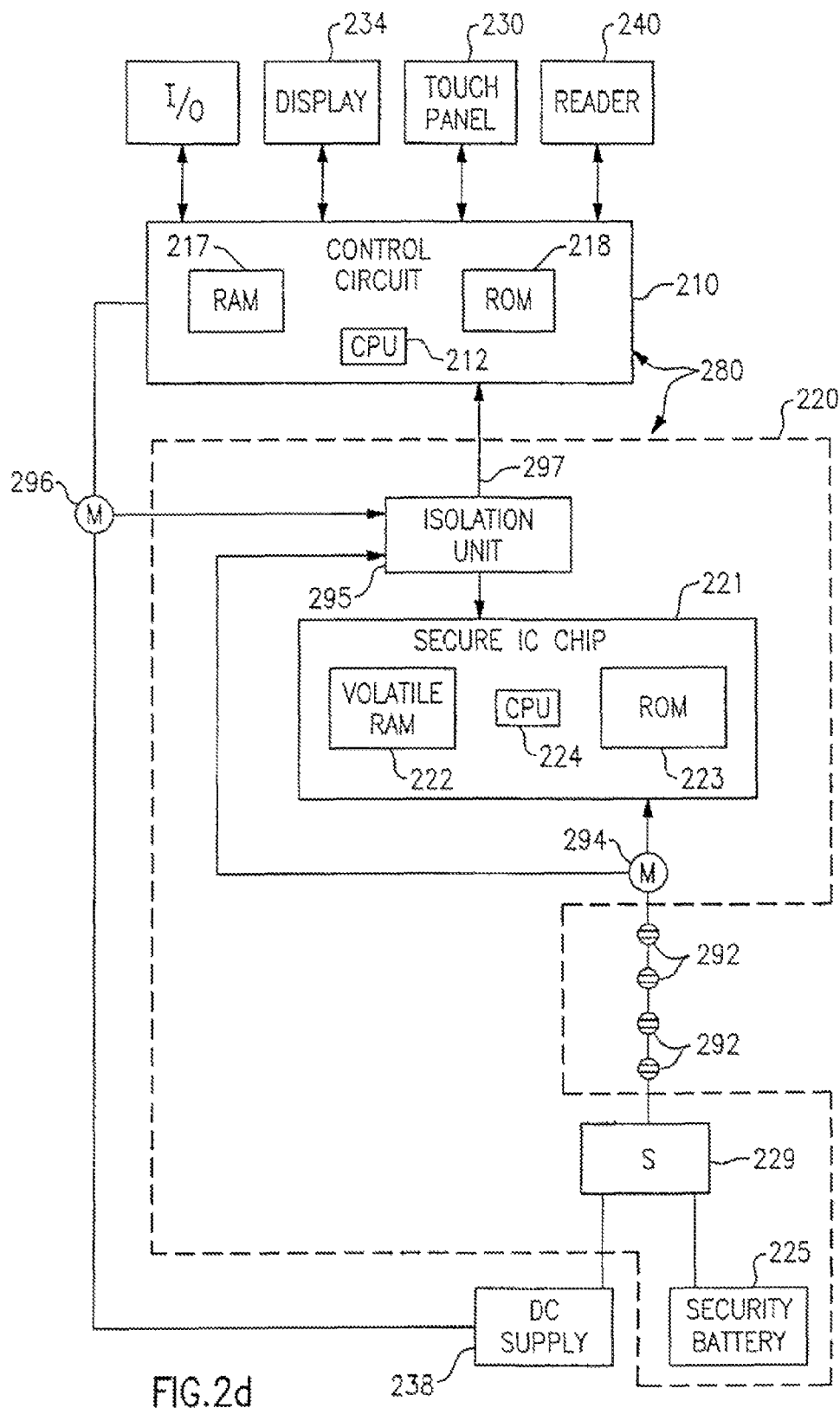

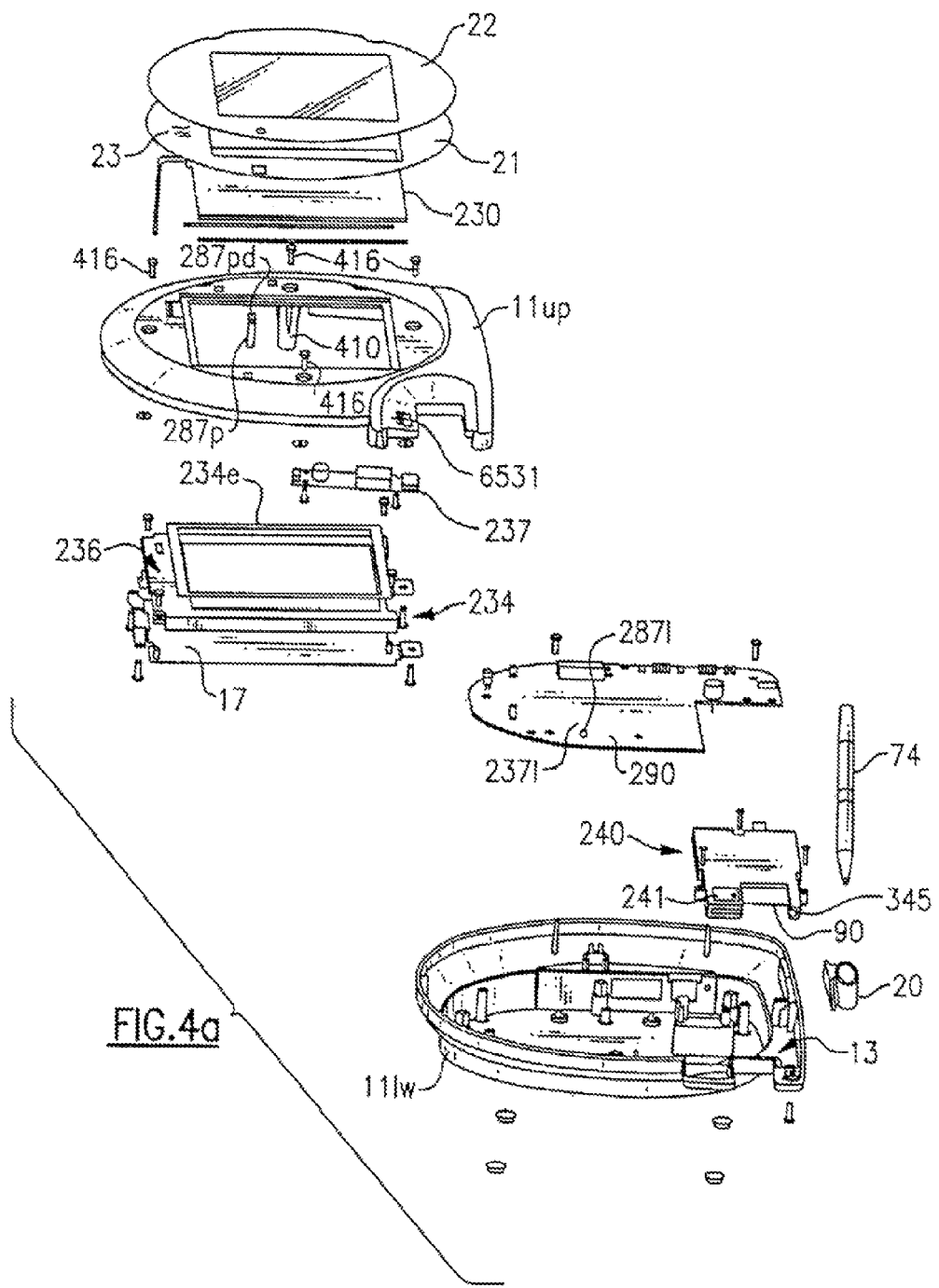

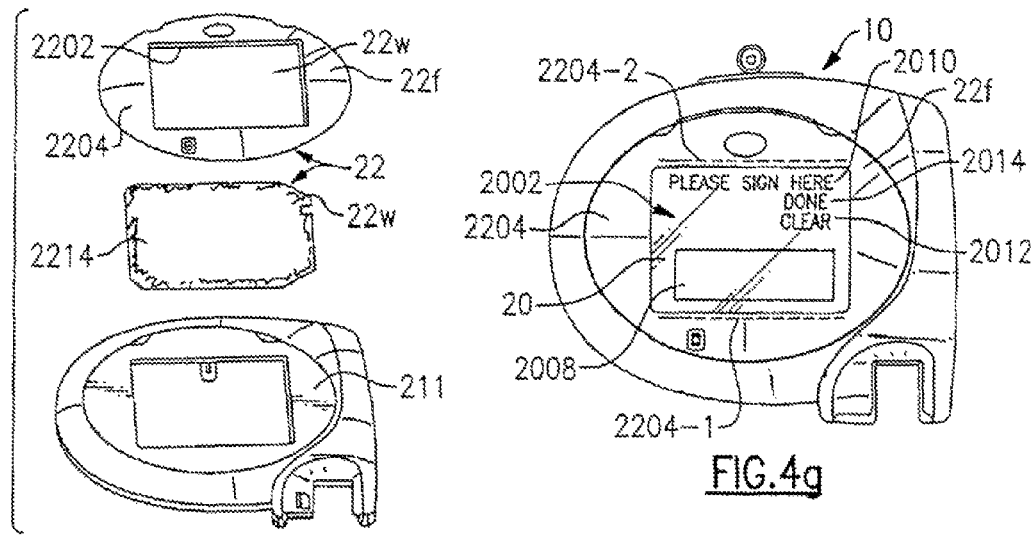
FIG.4e
FIG.4g
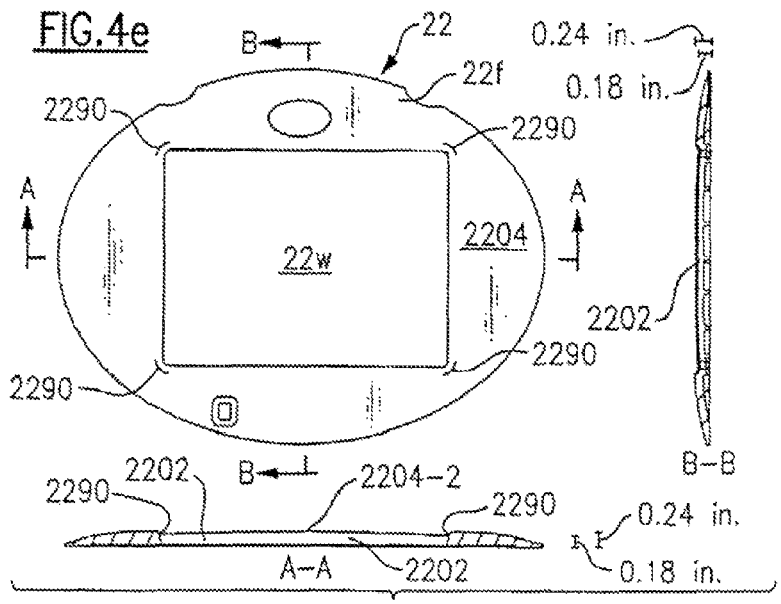
FIG.4f
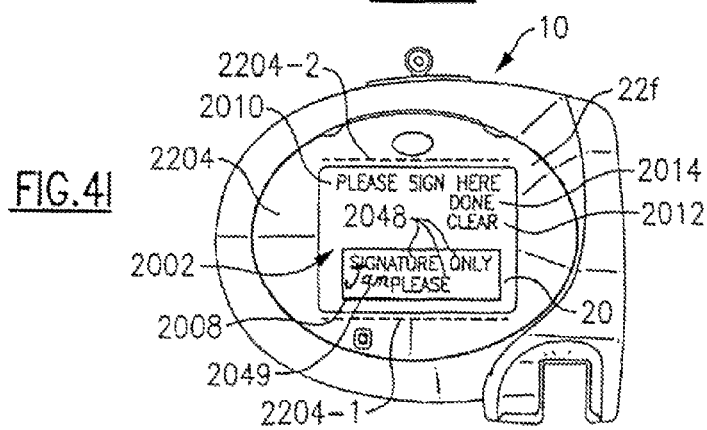
FIG.4I

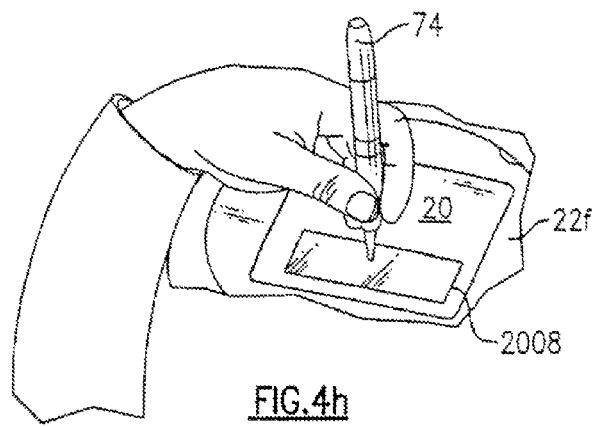
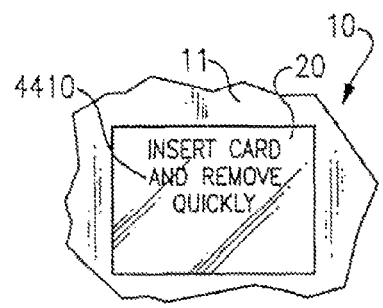
FIG.4h
FIG.4n
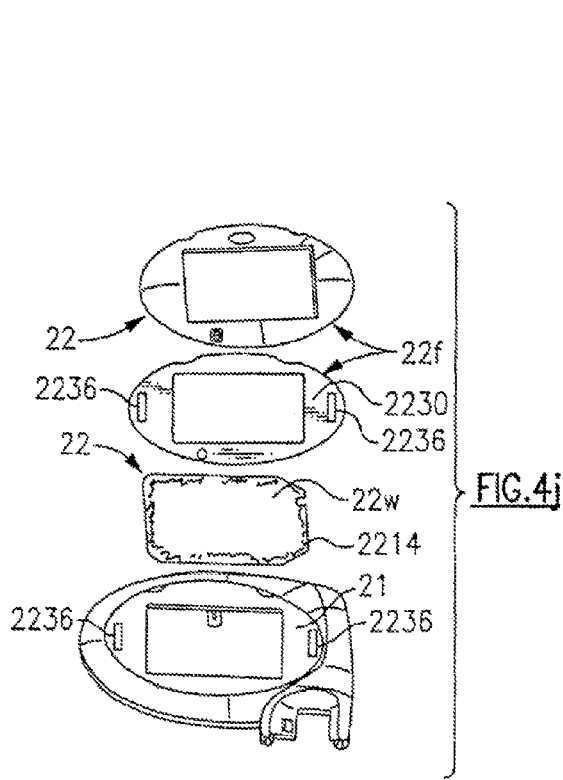
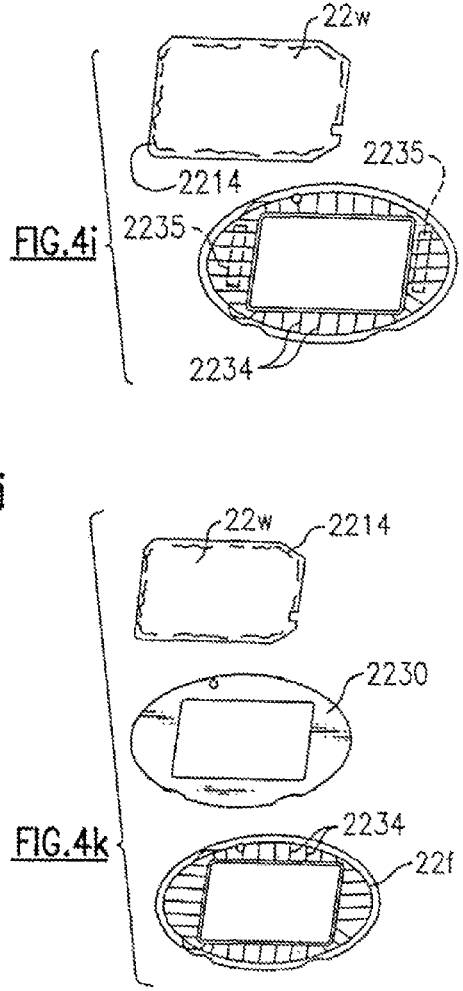
FIG.4j
FIG.4i
FIG.4k

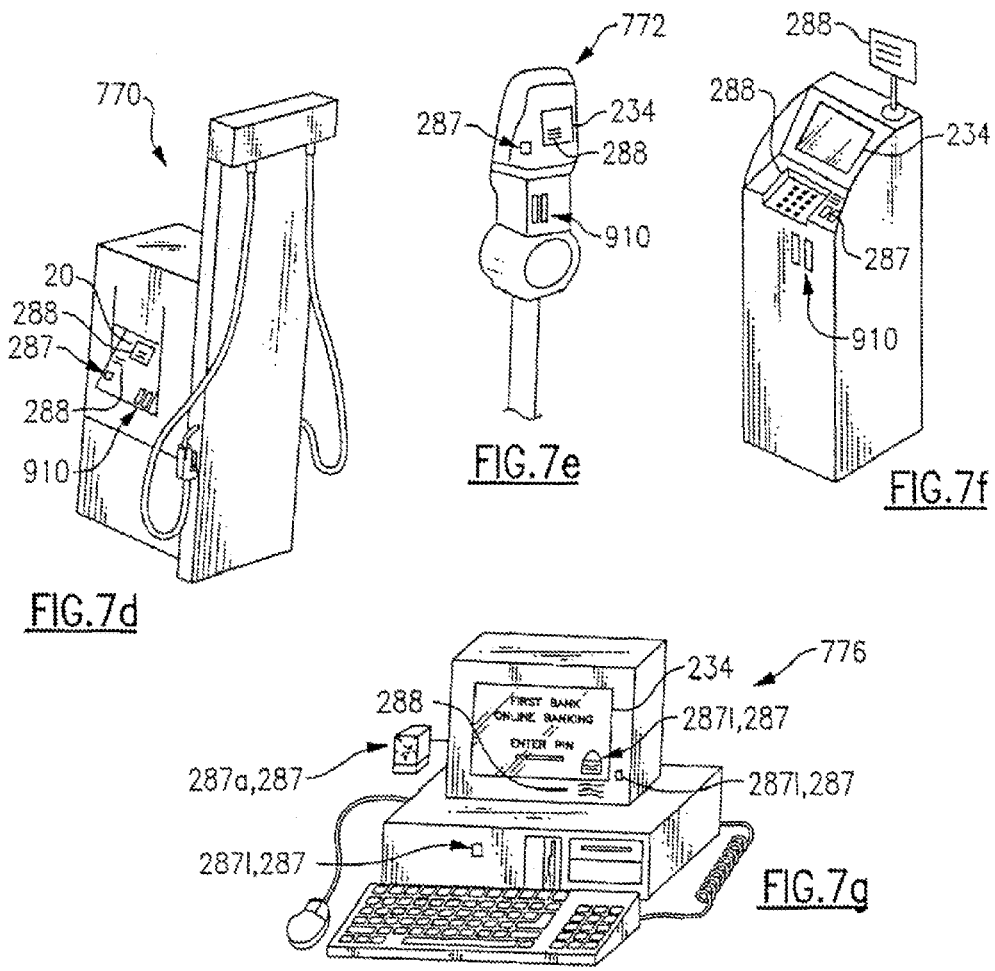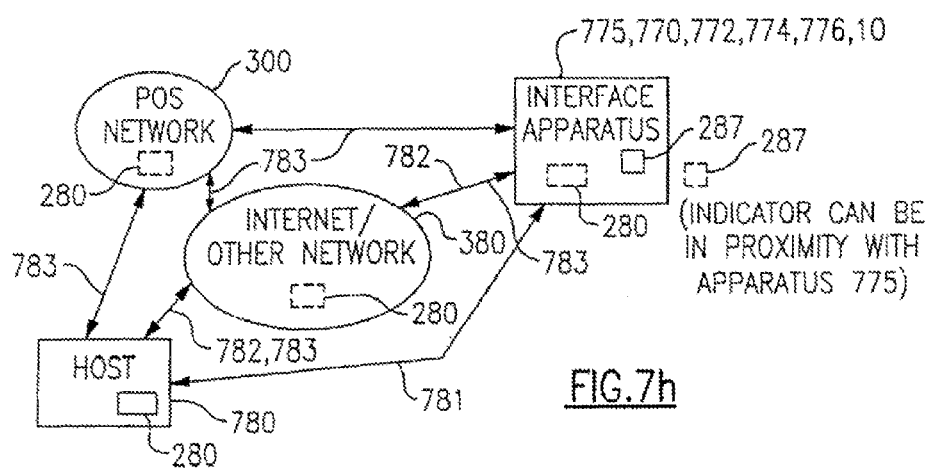

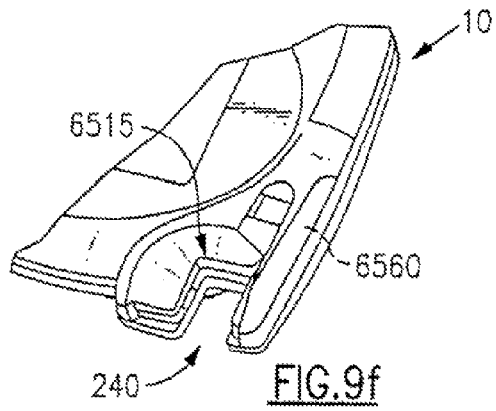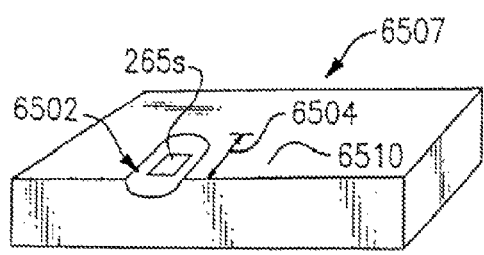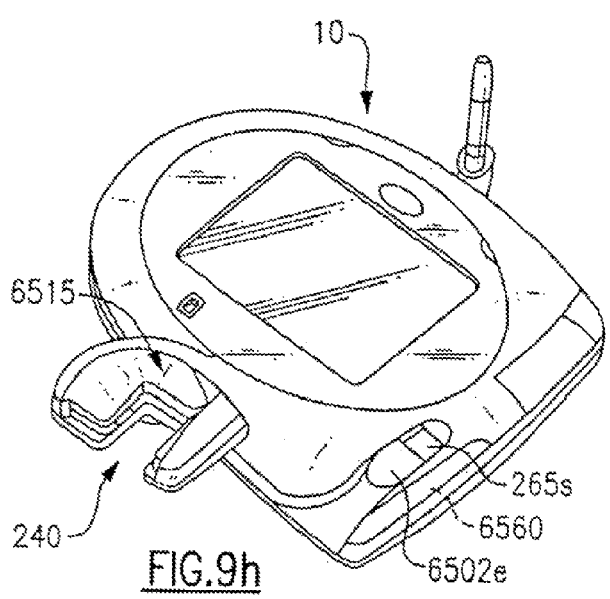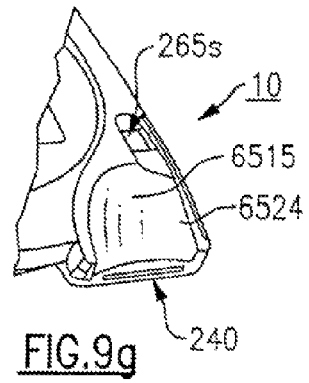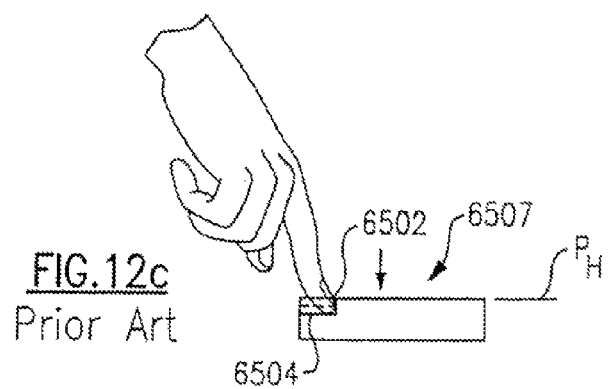

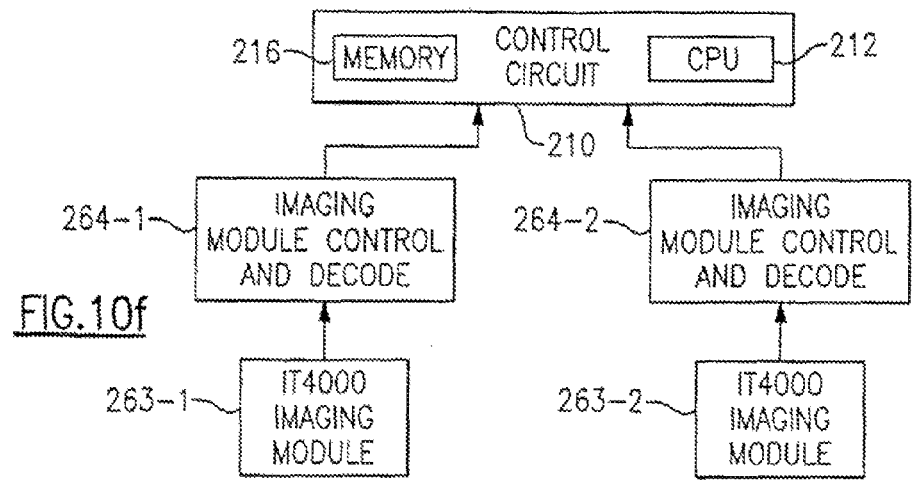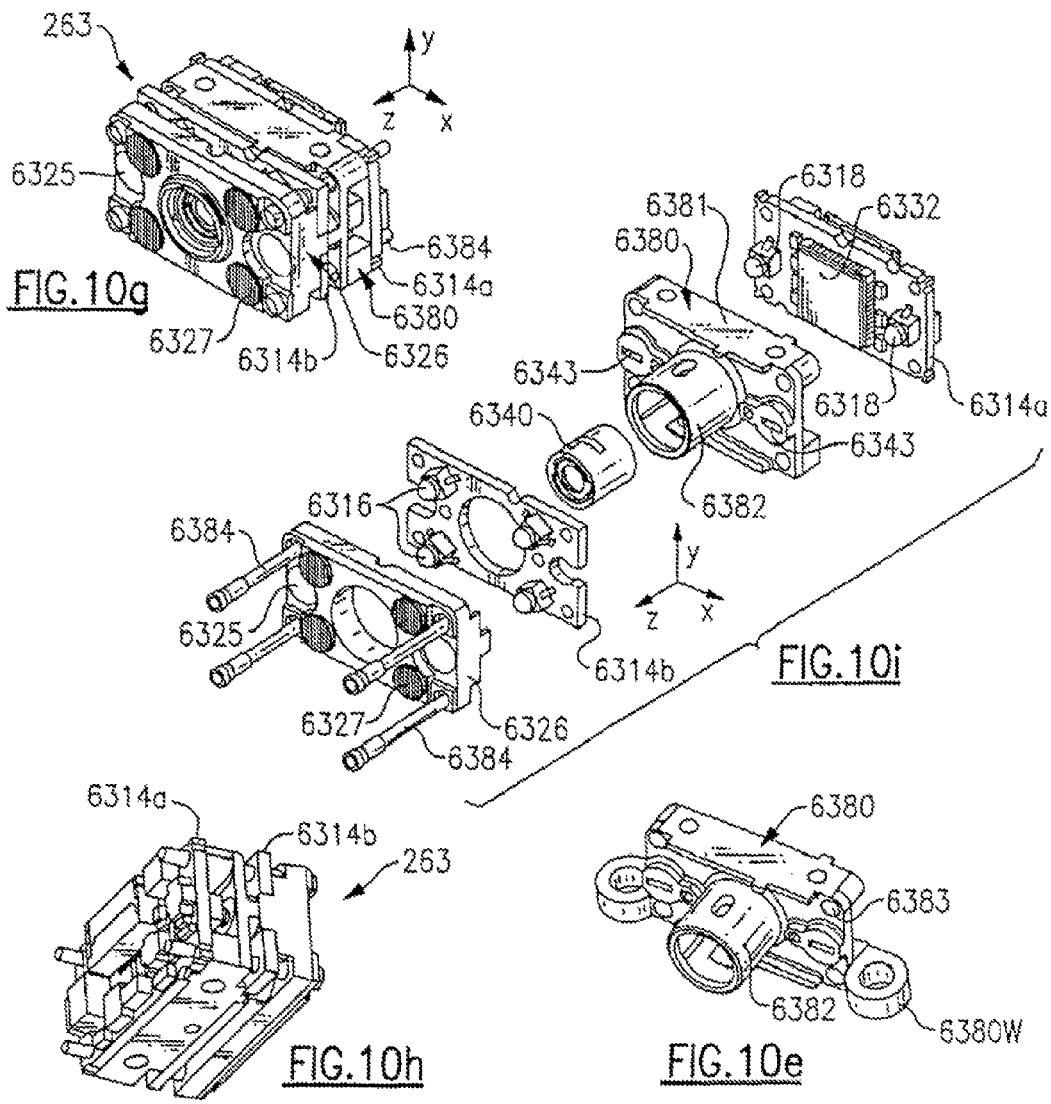

TERMINAL INCLUDING IMAGING ASSEMBLY

CROSS REFERENCE TO RELATED APPLICATIONS

This application is a continuation of U.S. patent application Ser. No. 13/225,103 filed Sep. 2, 2011 (now U.S. Pat. No. 8,561,895) entitled, "Terminal Including Imaging Assembly," which is a divisional of U.S. patent application Ser. No. 12/637,528 filed Dec. 14, 2009 (now U.S. Pat. No. 8,544,737) entitled, "Terminal Including Imaging Assembly," which is a divisional application of U.S. patent application Ser. No. 10/252,227 filed Sep. 23, 2002 (now U.S. Pat. No. 7,748,620) entitled, "Transaction Terminal Including Imaging Module," which is a continuation-in-part of U.S. patent application Ser. No. 10/044,137, entitled "Transaction Terminal Encryption Apparatus Comprising Encryption Mode Indicator," filed Jan. 11, 2002 (now abandoned). U.S. patent application Ser. No. 10/252,227 also claims the priority, under 35 U.S.C. §119, to U.S. Provisional Application No. 60/348,738, entitled "Secure Information Input Apparatus Having Associated Secure Mode Indicator," filed Jan. 14, 2002 (now closed) and to U.S. Provisional Application No. 60/347,708, entitled "Transaction Terminal Adapted for Ease of Use and Having Improved Security Features," filed Jan. 11, 2002 (now closed). All of the above applications are expressly incorporated herein by reference.

FIELD OF THE INVENTION

The invention relates to data collection devices in general and particularly to a data collection device having an imaging assembly.

BACKGROUND OF THE PRIOR ART

"Transaction terminals" of the type having a data collection (e.g. mag stripe, smart card) input and signature capture capability for attachment to a point-of-sale (POS) network are growing in popularity. Unfortunately, currently available transaction terminals have been observed to exhibit numerous limitations.

For example, while presently available transaction terminals often are configured to prompt a user to enter personal identification (PIN) information, presently available transaction terminal lack adequate security features for assuring that the PIN information cannot be stolen, either by overriding of an encryption routine or by theft of encryption keys.

Presently available transaction terminals are also lacking in security features for monitoring presentation fraud. For example, while transaction terminals prompt a user to enter PIN information and to enter a signature, they are lacking in features which would enable determination of whether the person presenting information is in fact the person he purports to be.

The physical housings presently available in transaction terminals have also observed to be problematic. The reading unit of presently available transaction terminals is a "swipe" style mag stripe card reader which defines a slit opening on the top of the terminal. The orientation and configuration of these swipe-style slot transaction terminals force a reader into assuming uncomfortable and awkward body and arm positions during the reading process.

Other problems with present day transaction terminals exist as well. For example, present day transaction terminal allow unscrupulous persons to open the terminal, and remove secure information bearing microchips or to siphon information from the chips.

There is a need to address these and other problems observed with presently available transaction terminals.

SUMMARY OF THE INVENTION

A terminal includes a housing, a touch screen, and an imaging assembly. The imaging assembly in one embodiment is disposed in the housing so that an imaging axis extends externally from the housing. The imaging assembly can be utilized for capture of images disposed externally to the housing. In one embodiment a frame of image data captured utilizing an imaging assembly can be processed for attempting to decode a decodable indicia. In one embodiment a frame of image data captured utilizing an imaging assembly can be stored.

These and other details and advantages will become apparent from the detailed description of the preferred embodiment hereinbelow.

BRIEF DESCRIPTION OF THE DRAWINGS

For a further understanding of these and objects of the invention, reference will be made to the following detailed description of the invention which is to be read in connection with the accompanying drawing, wherein:

FIGS. 1j and 1k are bottom perspective views of an exemplary transaction terminal according to the invention having SAMS access doors;

FIG. 1q is a front view of a terminal according to the invention including an optical reader, a retinal scanner and a fingerprint scanner;

FIG. 2c is a functional electrical block diagram showing of a security block shown in the block diagram of FIG. 2a;

FIG. 2d shows an alternative embodiment of a security block according to the invention;

FIG. 4a is an exemplary assembly diagram for an exemplary transaction terminal according to the invention;

FIG. 4e is an assembly view of a transaction terminal having a replaceable window;

FIG. 4f is a top view of a transaction terminal frame including cutaway views illustrating raised surfaces of the frame;

FIG. 4g is a top view of a transaction terminal in a mode wherein a signature capture screen is displayed on the terminal;

FIG. 4h is a perspective view of a left-handed overwriter entering signature data;

FIG. 4i is a bottom view of a transaction terminal including a replaceable window;

FIG. 4j is a top assembly view of a transaction terminal including a replaceable window;

FIG. 4k is a bottom assembly view of a transaction terminal including a replaceable window;

FIG. 4L is a top view of a transaction terminal in a mode where the transaction terminal displays a signature entry screen;

FIG. 4n is a top view of a transaction terminal in a card reading mode.

FIG. 5b is a cutaway partial side view of the stylus shown in FIG. 5a;

FIGS. 7d-7g are perspective views of alternative apparatuses in which a security feature can be incorporated;

FIG. 7h is a network diagram illustrating incorporation of a security feature in one embodiment;

FIG. 9f is a perspective view of a transaction terminal including an elongated finger recess and a middle finger recess;

FIG. 9g is a perspective view of a transaction terminal and a finger recess formed integrally with a card cavity that is devoid of a card cutout section;

FIG. 9h is a perspective view of a transaction terminal having a spaced apart card cavity and elongated finger recess.

FIG. 10e is a perspective view of an imaging module support having mounting wings;

FIG. 10f is an exemplary block electrical diagram of a transaction terminal having two imaging modules;

FIGS. 10g-10h are perspective views of an imaging module;

FIG. 10i is an assembly view of an imaging module;

FIG. 12b is a perspective view of a prior art finger recess incorporated in a fingerprint scanning device of the prior art;

FIG. 12c is a side view of a prior art finger recess incorporated in a fingerprint scanning device of the prior art.

DETAILED DESCRIPTION OF THE INVENTION

Figure 1A:
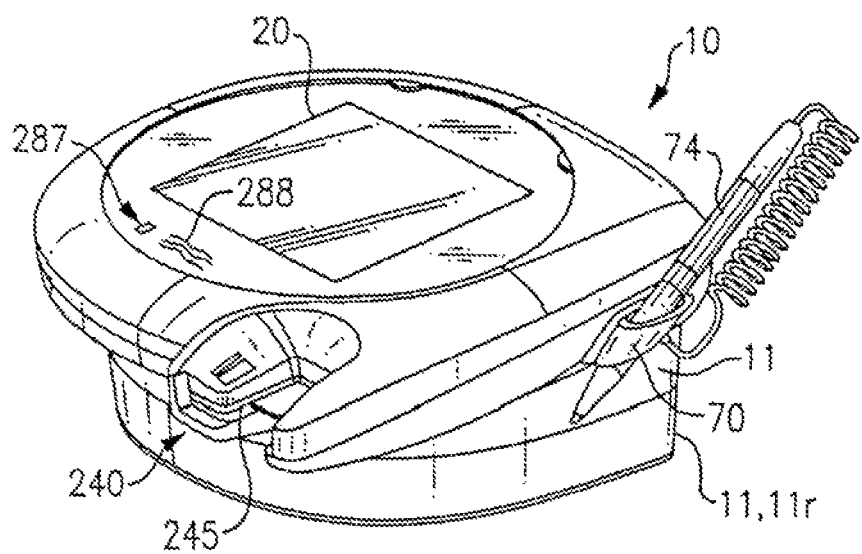
FIGS. 1a and 1b are perspective views of an exemplary transaction terminal according to the invention.
Figure 1B:
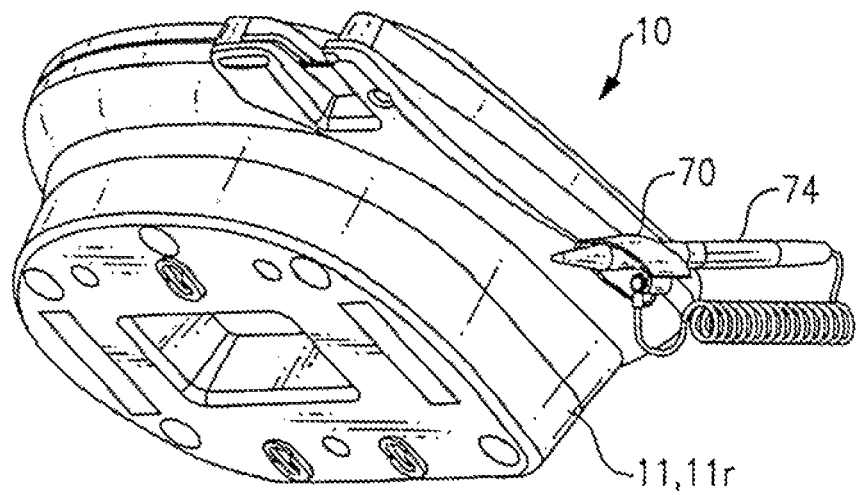
Figure 1C:
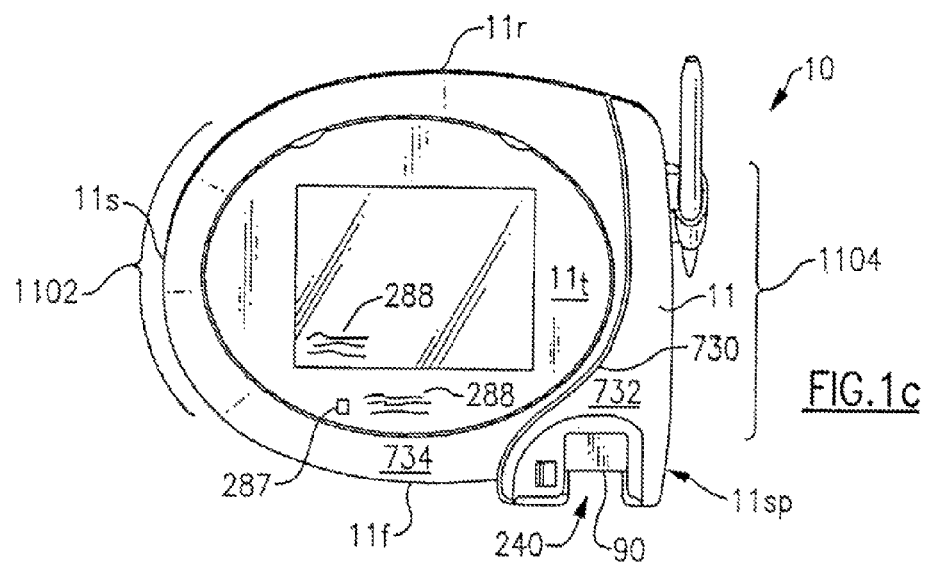
FIG. 1c is a top view of an exemplary transaction terminal according to the invention.
Figure 1D:
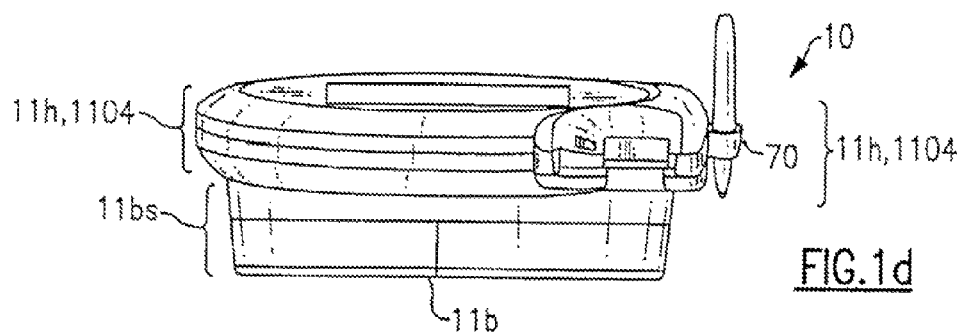
FIGS. 1d and 1e are side views of an exemplary transaction terminal according to the invention.
Figure 1E:
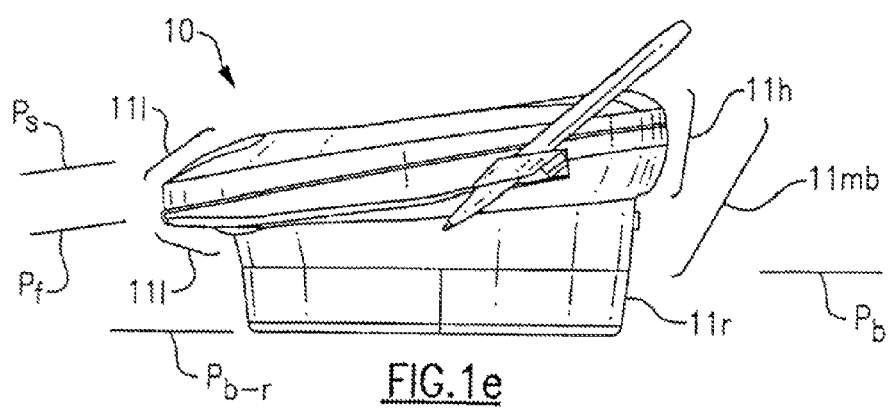
Figure 1F:
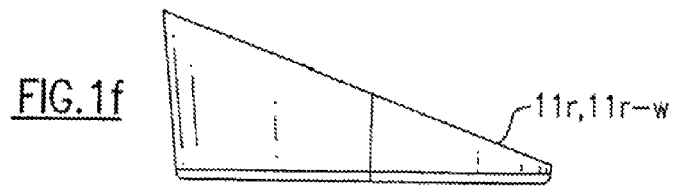
FIG. 1f is a side view of a wedge style user according to the invention.
Figure 1G:
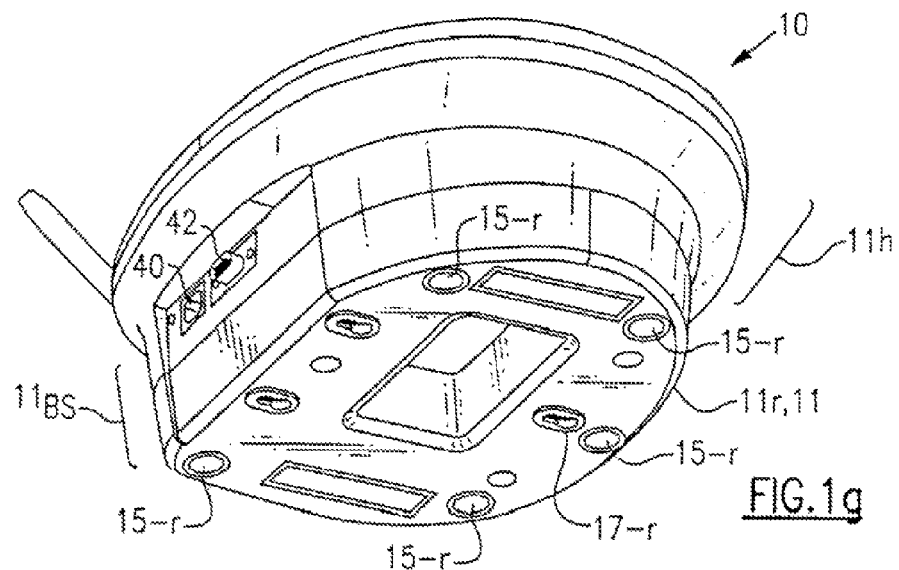
FIG. 1g is a bottom perspective view of a transaction terminal according to the invention.
Figure 1H:
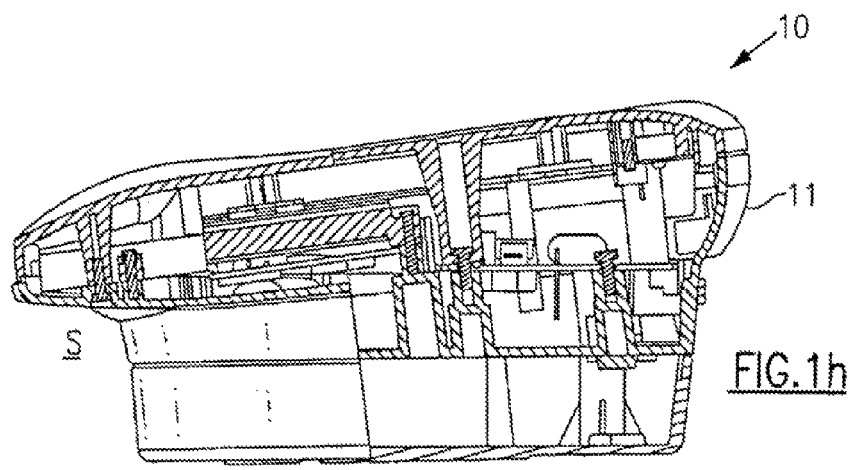
FIGS. 1h and 1i are cutaway side views of an exemplary transaction terminal according to the invention.

Perspective views of a transaction terminal according to the invention, which may be adapted for reading card information, for secure receipt of personal identification (PIN) information, for signature capture, and numerous other functions are shown in FIGS. 1a, 1b, and 1g. Card 90 which is processed by transaction terminal 10 may be, for example, a credit card, a debit card, customer loyalty card, an electronic benefits card, a company-sponsored benefits card, an identification card, etc.

Transaction terminal 10 includes a rugged housing 11 having a top 11a, a bottom 11b, a front 11f, and sides 11s. Housing 11 further includes a base portion 11bs and an enlarged head portion 11h extending forwardly from base 11b to define a lip 11L. Integrated in the top 11T of terminal 10 is a touch screen 20, which will be described herein, comprises a display 234 and a touch sensitive overlay 23 disposed over display 234. Disposed in housing lip 11L and opening toward front 11F of housing 11 is an insert-style card reader 240. Housing 11 further includes a detachable riser 11R and a tangle-resistant stylus 30 disposed in a specially configured holder apparatus 40 adapted for attachment either on housing 11 or on another member separate from housing 10. Terminal 10 further includes I/O connection ports 40 and 42 for allowing communication with other computer systems such as cash registers, or other host computer systems, e.g. server system, or hub computer systems as will be described later herein.

Figure 2A:
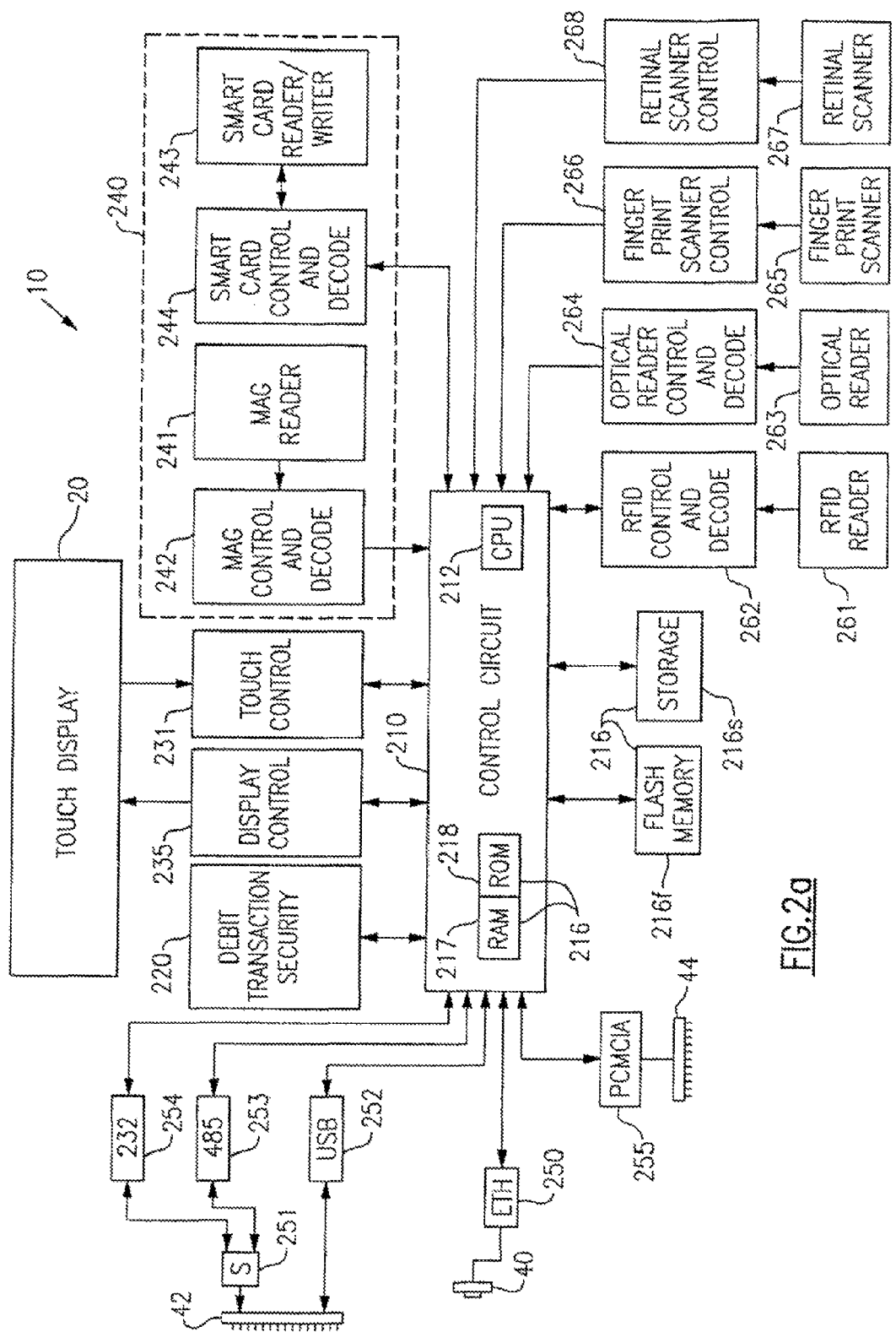
FIG. 2a is a functional electrical block diagram of an exemplary transaction terminal according to the invention.

A high level electrical block diagram of terminal 10 is shown in FIG. 2a. Terminal 10 includes a control circuit 210 which typically comprises at least one IC microchip. For example, an Intel 133 MHz or 206 MHz SA-1110 Strong-arm CPU is suitable for use in circuit 210, although faster and less expensive CPU IC's will be preferred when they become available. In addition to having a central processing unit, CPU 212, control circuit 210 further includes a memory 216 typically having at least RAM 217 and ROM 218 memory devices. ROM 218 may be a reprogrammable ROM, otherwise known as a "flash" ROM.

Control circuit 210 may be in communication with other types of memory including "flash" type memory, e.g. a memory device 216F sold under the commercial names "Multimedia MMC," "Smart Media," "Compact Flash," and "Memory Stick." Flash type memory devices are especially useful for storing image data and signature data. Memory 216 which may be included in or in communication with control circuit 210 may also comprise a long term storage device 216s such as a hard drive, a floppy disk, or a compact disc. It has become increasingly common to package memory devices, particularly RAM and ROM devices within a single IC chip including control circuit CPU 212, RAM 216, and ROM 218.

Control circuit 210 is in communication with a number of components, including reader unit 240 which is a preferred embodiment in an insert style (also known as "dip" style) hybrid magnetic stripe and smart card reader/writer. Hybrid reader 240 may be an OEM integrated unit, e.g. a ZU series reader of the type available from Matsushita of Japan, and ST-40 series hybrid reader available from Secure-Tech, or a hybrid reader of the type available from IDTECH. Hybrid reader unit 240 includes a mag stripe reader 241 in communication with magnetic control and decode circuit 242, and smart card reader/writer 243 in communication with smart card control and decode circuit 244. Hybrid reader unit 240 may be disposed in pocket 13 defined in lower section 11LW of housing 11 as seen in assembly view FIG. 4a.

Control circuit 210 in the embodiment of FIG. 2a is also in communication with an RF ID reader unit having a reader 261, with associated control and decode circuit 262. RF ID reader 261 may be, for example a Kronegger miniaturized RF reader, readily connected to PCB 290, having a 25×35 mm footprint and power consumption below 100 ma reader may be mounted just under housing upper portion 261p indicated in FIG. 4L.

Figure 1I:
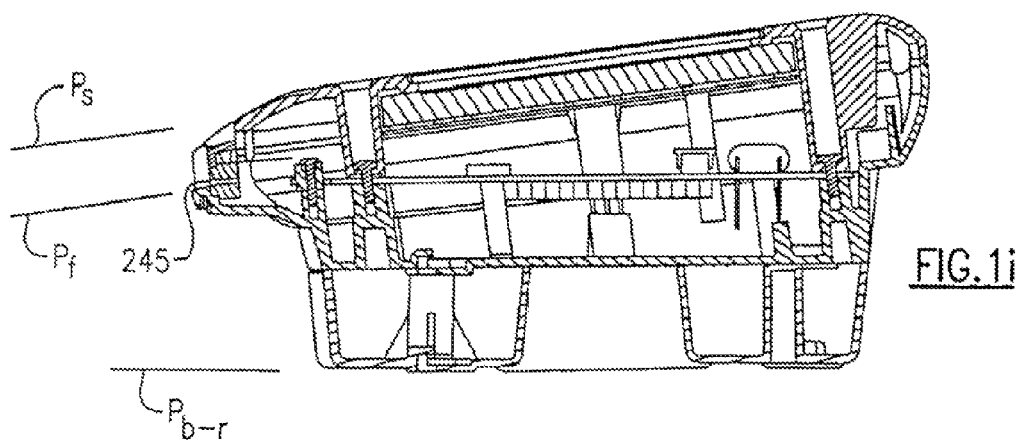
Figure 1L:
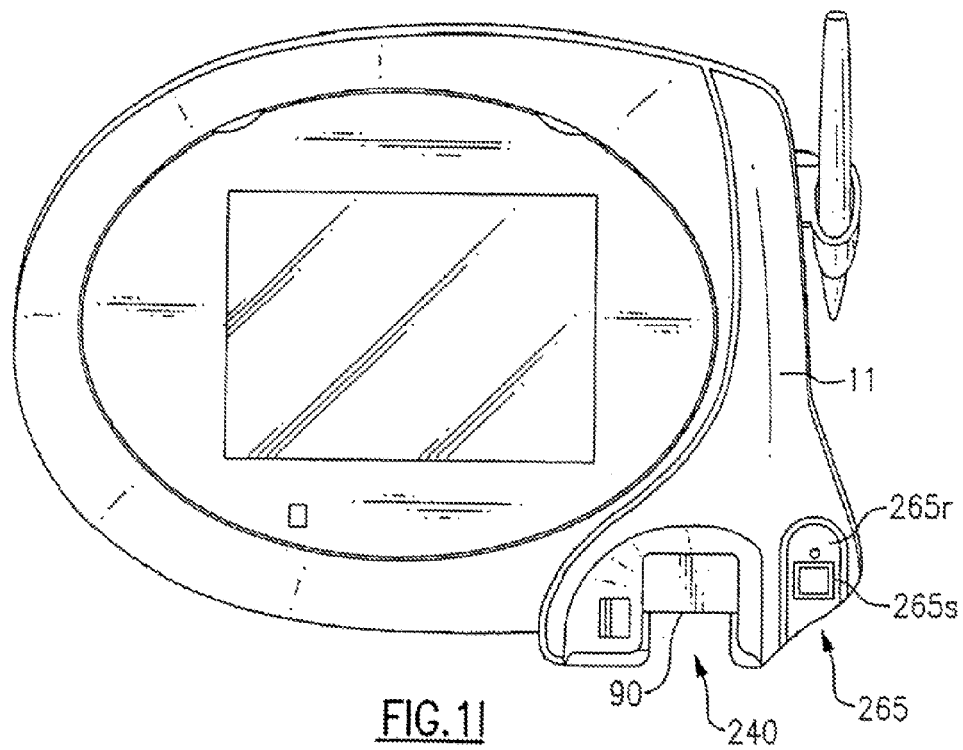
FIGS. 1L and 1m is a terminal according to the invention including an integrated fingerprint scanner.
Figure 1M:
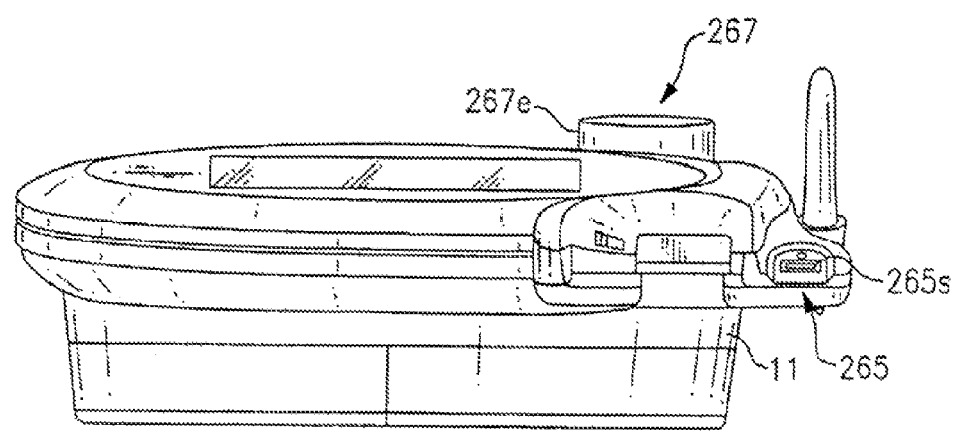
Figure 1N:
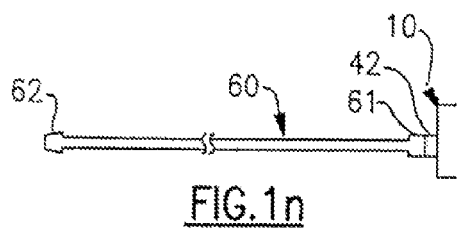
FIG. 1n shows a universal cable of the invention.
Figure 1O:
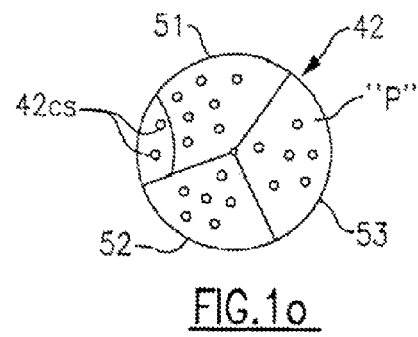
FIG. 1o is a top view of a universal connection of the invention.
Figure 1R:
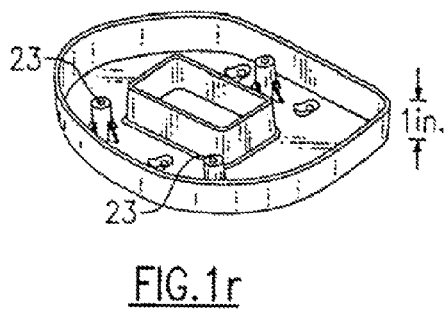
FIG. 1r is a perspective view of a riser.
Figure 1P:
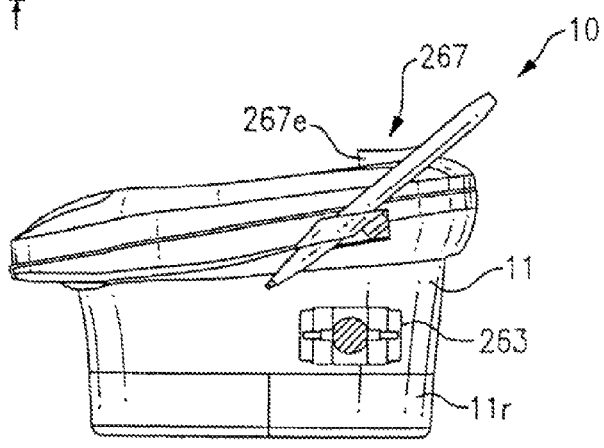
FIG. 1p is a side view of a terminal including an optical reader.
Figure 1S:
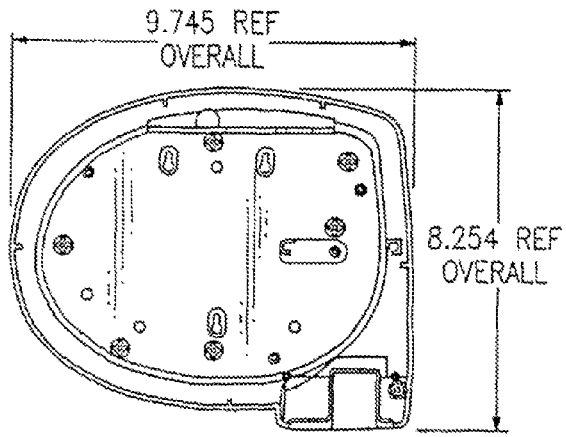
FIGS. 1s-1u are views of terminals in an exemplary embodiment for illustrating dimensional features.

Another user interface data input device which may be disposed in communication with control circuit 210 is an optical reader unit having imaging assembly 263 and associated control and decode out circuit 264. Decoding could also be carried out by control circuit 210. A model IT 4000 or IT 4200 optical reader module with decode out circuit of the type available from Hand Held Products, Inc. may be selected to provide the function indicated by blocks 263 and 264. Assembly 263 could also be a linear assembly. Embodiments of transaction terminals according to the invention including an optical reader unit having 263 are shown in FIGS. 1p and 1q. Assembly 263 is readily installed in side 10s of base 10bs. More particularly housing 11 can include an imaging assembly aperture for accommodation of imaging assembly 263. The aperture may accommodate assembly 260 by allowing light to pass through to the imaging assembly aperture in the case assembly is mounted entirely inside housing 11 or may accommodate assembly 263 by allowing a part of assembly 263 to extend into the exterior of housing 11 in the case assembly 263 is mounted in such a manner that it is disposed partially inside and partially outside of housing 11. The height of the integrated portion of base 10bs may be increased as shown so that e.g. a credit or debit or identification card is readily placed in the field of view of reader 236.

Figure 10A:
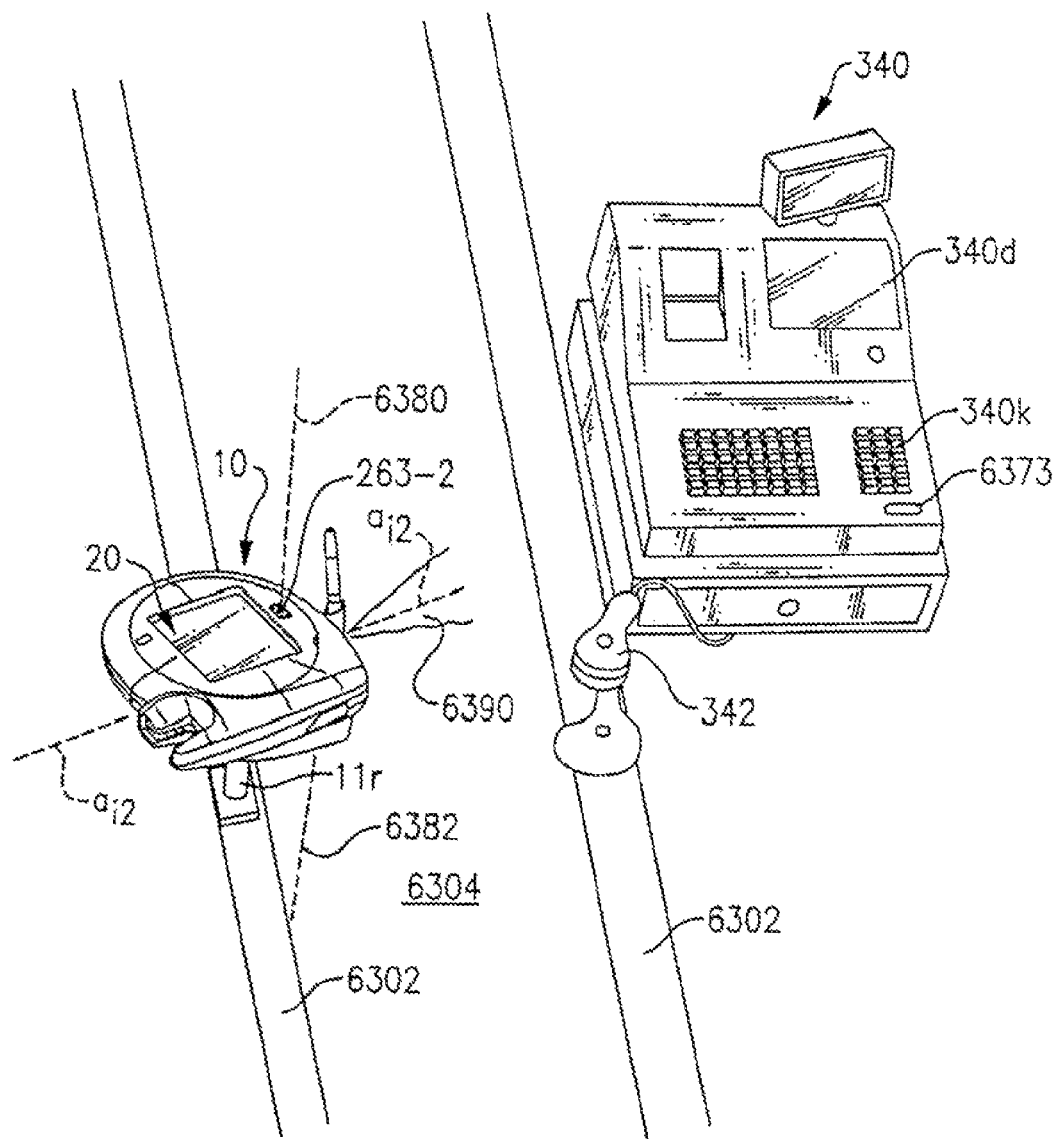
FIG. 10a is a perspective view of a transaction terminal in a retail store application.
Figure 10B:
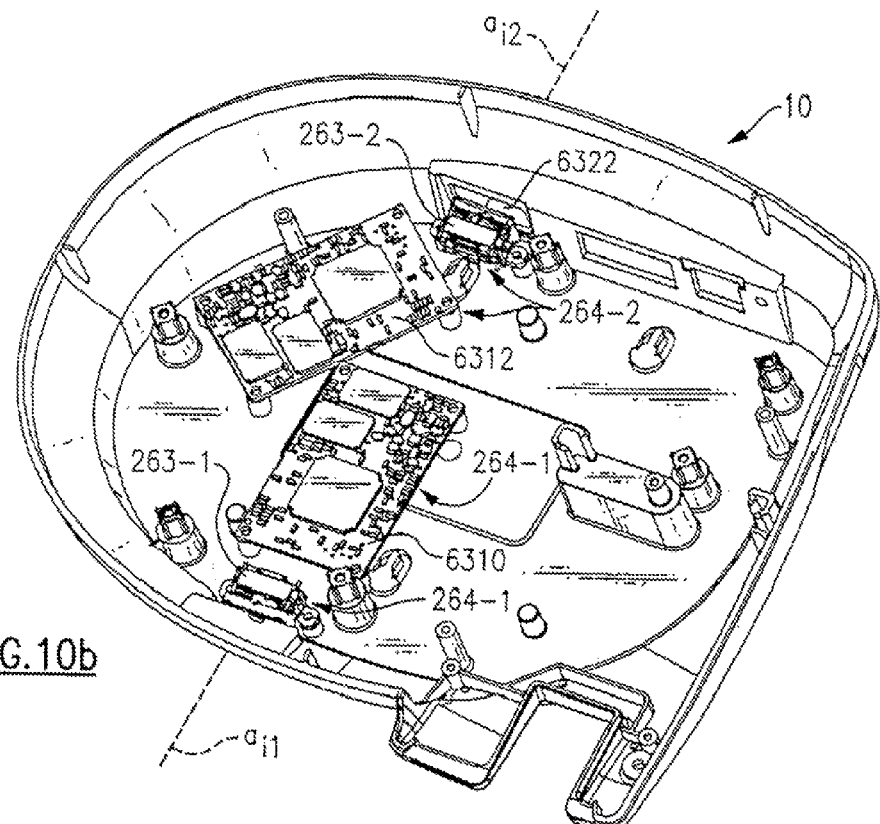
FIG. 10b is an internal perspective view of a transaction terminal including two imaging procedures.

Referring to the application depicted in FIG. 10a-10d it is advantageous to incorporate plural imaging assemblies 263 into transaction terminal 10. Transaction terminal 10 of FIGS. 10a-10d include front and rear imaging assemblies 263-1 and 263-2 as seen in FIG. 10b. Front imaging assembly 263-1 including imaging axis $a_{i1}$ is employed in the capture of images corresponding to objects (including objects bearing decodable indicia) disposed forward of transaction terminal 10, while rear imaging assembly 263-2 having imaging axis $a_{i2}$ is employed in the capture of images corresponding to objects (including indicia-bearing objects) disposed rearward of transaction terminal 10.

In a typical use of transaction terminal 10 as depicted in FIG. 10a, wherein transaction terminal 10 is installed on a counter top 6302 having a conveyor 6304, a front of transaction terminal 10 generally faces a customer while a rear of transaction terminal 10 generally faces a store clerk, who stands proximate cash register 340. Disposing first imaging assembly 263-1 to image objects disposed forward of transaction terminal 10 renders first imaging assembly 263-1 well-suited for use by a customer. Similarly, disposing second imaging assembly 263-2 to image objects disposed rearward of transaction terminal 10 renders second imaging assembly 263-2 well-suited for use by a store clerk.

During operating programs executed by control circuit 210, a customer may actuate first imaging assembly 263-1 to e.g. read a bar code from a customer loyalty card to determine a customer number, to capture an image corresponding to a fingerprint or a face of a customer, etc. A store clerk may actuate second imaging assembly 263-2 e.g. to read a bar code from a driver's license or other identification card to determine a customer's age, to read a bar code from a product, or to capture an image for any reason. Further aspects of the invention relating to a store clerk's actuation of second imaging module 263-2 will be described in greater detail herein.

Figure 10C:
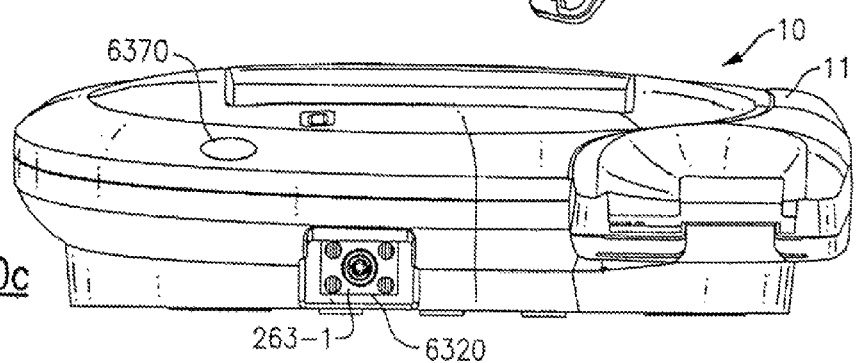
FIG. 10c is a front view of an imaging module having a front imaging module.
Figure 10D:
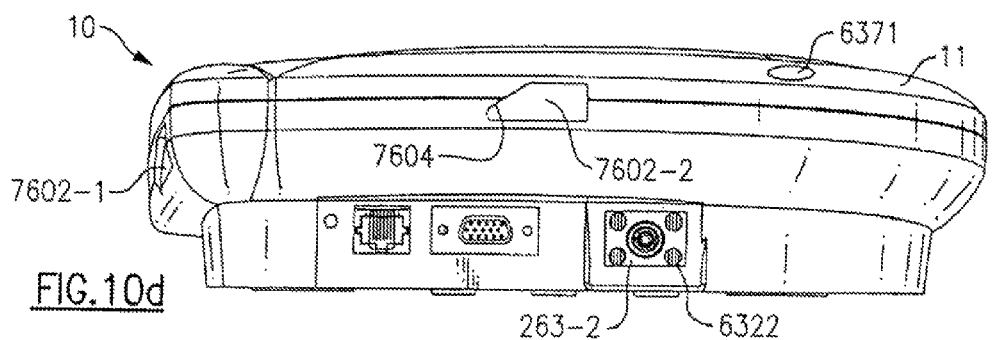
FIG. 10d is a rear view of an imaging module including a rear imaging module.

Referring to FIG. 10b an internal perspective view of a transaction terminal 10 having front and rear imaging assemblies is shown. Imaging assemblies 263-1 and 263-2 in the embodiments of FIGS. 10b, 10c, and 10d are provided by IT4000 imaging modules available from Hand Held Products, Inc. of Skaneateles Falls, N.Y., as are substantially described in U.S. application Ser. No. 10/092,789, filed Mar. 7, 2002, entitled "Optical Reader Imaging Module" incorporated herein by reference and U.S. application Ser. No. 10/093,136 filed Mar. 7, 2002, entitled "Optical Reader Comprising Multiple Color Illumination" also incorporated herein by reference. IT4000 imaging modules are shown in greater detail in the exploded views of FIGS. 10g-10j. Imaging module 263 includes a support 6380 having a containment 6381 containing image sensor chip 6332, and a retainer section 6382 retaining a lens assembly 6340 shown as being provided by a lens barrel. Image sensor chip 6332 can be a color image sensor chip of the type described in U.S. application Ser. No. 09/904,697 filed Jul. 13, 2001, entitled "An Optical Reader Having a Color Imager", incorporated herein by reference. Lens assembly 6340 may include fixed optics configured so that imaging module 263 has a best focus receive distance of less than two feet (e.g. 3 in., 7 in., 9 in.). Lens assembly 6340 can also include adjustable optics varying the best focus distance of module 263, or fixed optics such that a best focus receive distance of module 263 is more than two feet. A first circuit board 6314a carrying image sensor chip 6332 and aiming LEDs 6318 is mounted to a back end of support 6380 while a front circuit board 6314b carrying illumination LEDs 6316 is mounted to a front end of support 6380. An optical plate 6326 carrying aiming and illumination optics is disposed forward of second circuit board 6314b. Supporting the various components of imaging module 263 are a plurality of conductive support posts 6384. Imaging module 263 can include mounting wings 6380w for aiding in the installation of imaging module 263 in a device housing. Imaging module 263 has a form factor of about 2.0 cm by 1.2 cm by 1.2 cm. Imaging module 263 can also be of a type comprising a 1D image sensor or a laser sweeping scan engine.

Control circuit 210 can include one of the systems for controlling a plurality of imaging modules that is described in U.S. application Ser. No. 10/161,950 filed Jun. 4, 2002, entitled "Optical Reader Having a Plurality of Imaging Modules", incorporated herein by reference. The separate control and decode circuits 264-1 and 264-2 can be incorporated in control circuit 210, if control circuit 210 is sufficiently fast and powerful. Control circuit 210, as is indicated in FIG. 10f can also be in communication with two separate control and decode circuits 264-1 and 264-2, each having an individual processor and memory. Control and decode circuit 264-1 (which may be termed a capture and decode circuit) captures images via actuation of module 263-1 while control and decode circuit 264-2 captures images via actuation of module 263-2. Control and decode circuit 264-1 and control and decode circuit 264-2 present decoded out messages and/or image data, such as frames of image data, to control circuit 210. Control and decode circuits 264-1, 264-2, may subject a captured image to a decoding algorithm of one of the types described herein U.S. application Ser. No. 09/904,697, filed Jul. 13, 2001, entitled "An Optical Reader Having a Color Imager", previously incorporated herein by reference. Each of the control circuits 264-1 and 264-2 can take the form of the exemplary single imaging module electrical circuit described in U.S. application Ser. No. 10/161,950, filed Jun. 4, 2002, entitled "Optical Reader Having a Plurality of Imaging Modules", and incorporated herein by reference. It will be seen that transaction terminal 10 can be configured so that imaging modules 263 such as module 263-1 and module 263-2 include overlapping fields of view and can be controlled according to one of a control method described in the previously incorporated U.S. application Ser. No. 10/161,950.

Physical form views of circuit 264-1 and circuit 264-2 are shown in FIG. 10b. Circuit 264-1 is incorporated in printed circuit board 6310 while circuit 264-2 is incorporated in printed circuit board 6312. Control circuits 264-1 and 264-2 could also be incorporated in a circuit board of the respective imaging modules 263-1 and 263-2, as is generally described in U.S. application Ser. No. 09/411,936 filed Oct. 4, 1999, entitled "Imaging Module for Optical Reader" incorporated herein by reference.

Referring to FIG. 10c a front view of a transaction terminal 10 including a front imaging module 263-1 is shown. A front view of front imaging module 263-1 is visible through a front aperture 6320 of housing 11. A rear view of transaction terminal 10 is shown in FIG. 10d. A front view of rear module 263-2 is visible through rear aperture 6322. Light transmissive windows (not shown) protecting and containing imaging modules 263-1 and 263-2 can be disposed to cover apertures 6320 and 6322. Installing transaction terminal 10 on riser 11r provides sufficient clearance between transaction terminal 10 and the counter top 6302 so that objects including decodable indicia-bearing objects can readily be placed in a field of view of both first imaging module 263-1 and second imaging module 263-2.

Referring to further aspects of terminal 10 shown in FIG. 10d, terminal 10 includes first and second broad surfaces 7602-1 and 7602-2 for receiving holder apparatus 70 as described previously in connection with FIG. 3e. Preferably both of surfaces 76-1 and 7602-7 can be flat and can be specifically dimensioned to correspond to a rear surface 76 of holder 70 (FIG. 3e). As indicated by profile edge 7604, surfaces 7602-1, 7602-2, and 76 can be keyed to assure prompt and proper orientation of surface 76 onto surface 7602-1 or 7602-2. Surface 7602-1 is formed on a right side of housing 11 (from a front end view) so that terminal 10 can be adapted for easy access of stylus 74 by right-handers (the majority of users). Surface 7602-2 is formed on a rear of housing 11 so that terminal 10 can be adapted for easy access of styles by both right and left-handers. Holder 70 can be detachably attached to surface 7602-1 or 7602-2 with use, e.g. of adhesive or double stick tape.

It has been mentioned that during the course of operation of terminal 10 it may be advantageous for a user to actuate module 263-1 or module 263-2. In general, a module 263-1, 263-2 can be actuated to capture an image (which is then archived and/or subjected to decoding) by generating a "trigger signal". A trigger signal can be generated by any one of at least three methods: (1) Manually, by manual actuation of a trigger or trigger button; (2) Automatically, by moving a detectable decodable image or optics into the field of view of module 263-1, 263-2, or (3) Automatically, by realization of a predetermined event or condition.

Referring to the first method for generating a trigger signal (manual actuation of a trigger button), transaction terminal 10 can be equipped with at least one manual trigger or trigger buttons. Trigger button 6370 (FIG. 10c) can be disposed on housing 11 toward a front of housing 11 for actuation of first imaging module 263-1, while trigger button 6371 (FIG. 10d) can be disposed toward a rear of housing 11 for generation of a trigger signal for actuating a second imager module 263-1. A manual trigger button or buttons can also be displayed on touch screen 20. Further, a manual trigger button for generating a trigger signal for actuating either of module 263-1 or 263-2 need not be located on transaction terminal 10. A manual trigger button can be located remote from transaction terminal. For example, cash register 340 (which is in communication with terminal 10 as described with reference to FIGS. 3f and 3g) can be configured so that cash register 340 generates a trigger signal for actuation of imaging module 263-1, 263-2 when a manual trigger button of cash register is actuated. Cash register 340 can be configured so that when a certain button of keyboard 346 or a dedicated trigger button 6373 is actuated, cash register 340 sends a trigger signal to transaction terminal 10 (possibly in the form, e.g. of a one bit signal, or of one or more program instructions such a script program instructions) to actuate an imaging module e.g. 263-2 so that circuit 264-2 captures an image and subjects the image to a decode attempt.

Referring to a second method for generating a trigger signal (automatic, in response to a decodable indicia or object being presented to module 263-1, 263-2), control circuits 264-1, 264-2 can be configured so that a trigger signal for actuating imaging module 263-1 and 263-2 is actuated in the manner described in U.S. application Ser. No. 09/432,282, filed Nov. 2, 1999, entitled "Indicia Sensor System for Optical Reader" incorporated herein by reference. In the incorporated U.S. application Ser. No. 09/432,282, a control circuit for an optical reader is described which, without actuating illumination sources such as LEDs 6316, captures image data and monitors for indicia including light-to-dark transitions being moved into a field of view of an image sensor. When a criteria indicating that a decodable indicia has been presented, the control circuit generates what can be considered herein a trigger signal to commence a full decode operating mode characterized by actuation of at least illumination LEDs such as LEDs 6316, full frame image capturing, and launching of at least one decode algorithm. When LEDs 6316 and/or LEDs 6318 are actuated, both a customer and a store clerk will likely observe the illumination being emitted, whether by module 263-1 or module 263-2.

Accordingly, it would be advantageous to configure transaction terminal 10 so that erroneous actuations (which may result from unintentionally moving an object into a field of view) of LEDs 6316, 6318 are minimized. Erroneous actuations LEDs and/or LEDs 6318 can be distracting. To minimize erroneous actuation of LEDS 16, 18 transaction terminal 10 can be mounted vertically so that imaging axes $a_{i1}$, $a_{i2}$ are directed vertically. Alternatively imaging modules 263-1 and 263-2 can be disposed in transaction terminal 10 so that imaging axes $a_{i1}$, $a_{i2}$ are directed substantially vertically. For example, rear imaging module 263-2 can be disposed in housing 11 so that imaging axis $a_{i2}$ extends upwardly from terminal 10 along axis 6380, or downwardly along axis 6382. Disposing an imaging module 263-2 rearward of touch screen 20 as shown in FIG. 10*a* renders a field of view of module 263-2 easily accessible by a store clerk.

Referring to a third method of generating a trigger signal (automatically, on the realization of predetermined event or condition), a system including transaction terminal 10 can be configured in one specific embodiment so that a trigger signal is generated when a certain type of product is purchased pursuant to a POS transaction. The purchase of certain "age proof required" products (e.g. alcohol, tobacco, R rated videos) require that customer prove his/her age prior to purchase. In accordance with the invention, a lookup table (LUT) can be incorporated in cash register 340 (or elsewhere in POS network 300 including in terminal 10) correlating product codes with flags indicating whether the product is an age proof required product. An updated version of the proof-of-age LUT may periodically downloaded to cash register 340 or terminal 10. A product code can be determined by reading a bar code symbol such as the UPC code of a product, typically using a "store clerk" bar code reader 342 in communication with cash register 340. It will be understood that a "store clerk" bar code reader 342 in communication cash register 340 can be a bar code reader incorporated in transaction terminal 10 as has been described herein. In accordance with the invention, cash register 340 can be configured to generate a trigger signal when cash register 340 receives from a bar code reader 340 a decoded out message comprising a product code corresponding to a "proof-of-age" product as determined with reference to the lookup table (LUT). Cash register 340 when receiving a decoded out message having a product code corresponding to a "proof-of-age" product, may transmit a trigger signal (possibly in the form, e.g. of one or more program instructions or a one bit signal) to control circuit 210 of transaction terminal 10 to cause control circuit 210 to actuate imaging module 265-2 so that a control circuit (e.g. 210 or 262-2) associated with imaging module 263-2 repeatedly captures images and subjects the captured images to decoding without further manual actuation of any actuation device. When imaging module 263-2 is actuated to repeatedly capture images and subject captured images to decoding, LEDs 6316 and/or 6318 of imaging module 263-2 are actuated as part of the image capture process. LEDs 6316 may be red LEDs which project light that is highly visible to a customer and a store clerk. Thus, in accordance with one embodiment of the invention, LEDs 6316 are automatically actuated to emit red light in area 6390 (or about one of axes 6380, 6382) when cash register 340 receives a decoded out message corresponding to a "proof-of-age" product. The red light or another visible light emitted by LEDs 6316 provides a visual feed back indicating to a customer and a store clerk that proof-of-age is required for purchase of the product just subjected to bar code decoding by reader 340. The store clerk may then place customer driver license or other customer identification card in a field of view of module 263-2 to decode a bar code on the identification card indicating the customer's date of birth. After a customer identification card bar code is read, transaction terminal 10 may communicate with cash register 340 so that cash register 340 displays on cash register display 340*d* the customer's date of birth or an appropriate text message indicating that the customer is or is not of sufficient age to purchase the product. Further, in accordance with the invention, control circuit 210 when receiving a trigger signal may display a prompt message on touch screen 20, such as "PLEASE HAND IDENTIFICATION CARD TO STORE CLERK" in order to prompt a customer to giver his/her identification card to the store clerk for birth date verification using imaging module 263-2 which, by the time the prompt message is observed, has already being actuated to illuminate area 6390, to repeatedly capture image data, and to repeatedly subject captured images to decode attempts.

It will be appreciated that significant functionality is added to terminal 10 when terminal is equipped with an optical reader. When terminal 10 includes a 2D reader control circuit 210 can store frames of image data into memory e.g. memory 216*f*. Optical reader 263 can be controlled for use in capturing frames of image data comprising handwritten signatures. If control circuit 210 determines that a signature capture mode using touch screen 20 fails, control circuit 210 may display a prompt prompting a user to dispose a signature bearing substrate in the field of view of imaging assembly 263. Circuit 210 may further display on screen 20 a button for actuating image capture, then capture a signature when a user actuates a control button. By storing the image representation including a signature representation into memory 216. The symbol decoding functionality of reader unit including assembly 263 coupled with the image capture functionality of assembly 263 renders terminal 10 operable to execute numerous types of user-interactive methods which are useful for fraud prevention and other purposes. U.S. application Ser. No. 09/788, 179, entitled "Identification Card Reader" filed Feb. 16, 2001, and assigned to the assignee of the present invention describes numerous methods for determining whether a card holder is the person he purports to be utilizing an optical reader having image capture and decode capability and numerous other methods relating to identification and fraud prevention. Applicants hereby expressly incorporate herein U.S. application Ser. No. 09/788,179 in its entirety by reference. It is seen from FIG. 1*q* that terminal 10 may include a card holding tray 19 for holding an identification card in the field of view of assembly 263 such as the identification card reader card holder described in detail in the above mentioned U.S. application Ser. No. 09/788,179 application.

Still further, control circuit 210 may be in communication with a fingerprint scanner unit having a scanner 265 including an active surface referred to as a sensor 265*s* (FIGS. 1L and 1*m*) and associated control circuitry 266. A fingerprint scan unit may be provided by, for example, by a Bioscrypt, Inc. OEM module fingerprint scan unit, a BERGDATA OEM module fingerprint scan unit or an ULTRA SCAN Corp. Series 400 OEM Fingerprint Scan unit. Transaction terminal 10 may capture an electronic fingerprint representation and send the electronic fingerprint representation to a non-integral computer system such as a computer system of Network 380, and Network 380 may perform the identification. Also Network 380 may periodically download a database of relevant electronic fingerprint authorizations for use by control circuit 210 in performing fingerprint identification functions. Transaction terminals according to the invention comprising integrated fingerprint scanning units are shown in FIGS. 1L, 1*m*, and 1*q*. Scanner 265 may include finger receiving recess 265*r* integrally formed in housing 11. Scanner sensor 265*s* may be disposed under a window formed in bottom surface of recess 265*f*. The window can be considered part of the scanner sensor. A fingerprint scanning unit according to the invention can also comprise an insert-style finger scanning unit.

A finger scanning transaction terminal 10 having an elongated finger recess is described with reference to FIGS. 9*a*-9*n*.

Figure 9A:
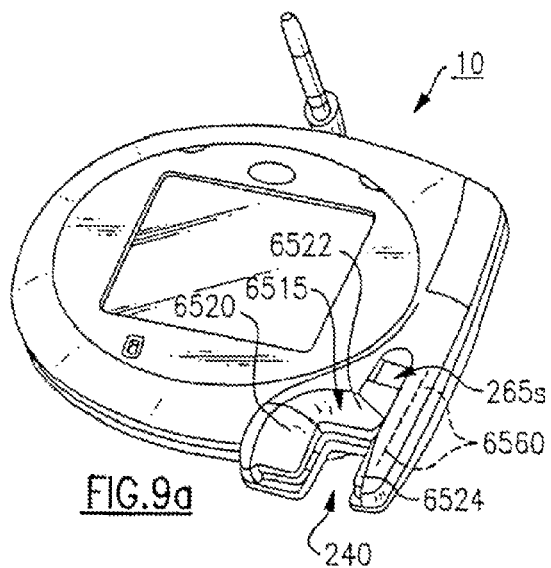
FIGS. 9a-9b are perspective views of a transaction terminal including an elongated finger recess.
Figure 9B:
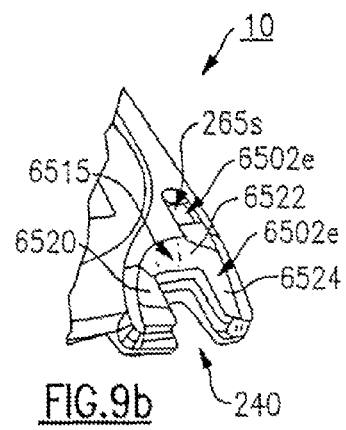
Figure 9C:
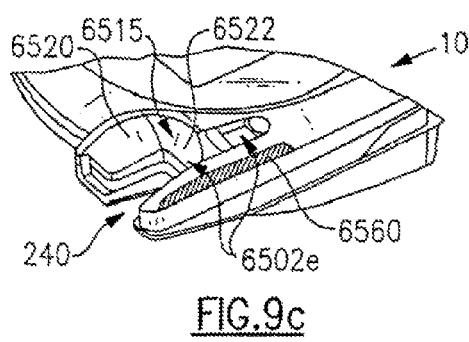
FIG. 9c is a perspective view of a transaction terminal including a finger recess and an outer surface region including printed matter.
Figure 9D:
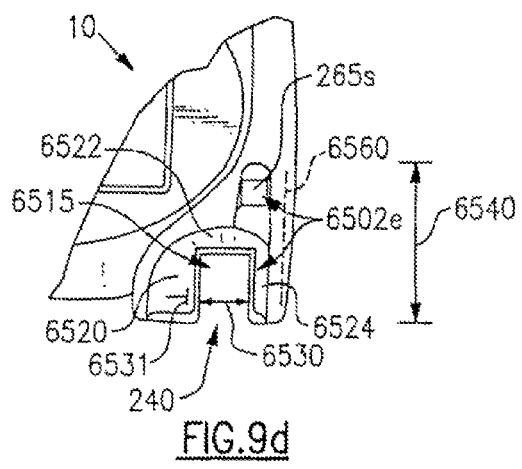
FIG. 9d is a top view of a transaction tell final including an elongated finger recess.
Figure 9E:
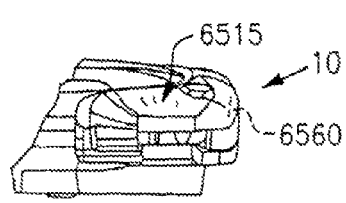
FIG. 9e is a front view of a transaction terminal including an elongated finger recess.
Figure 9M:
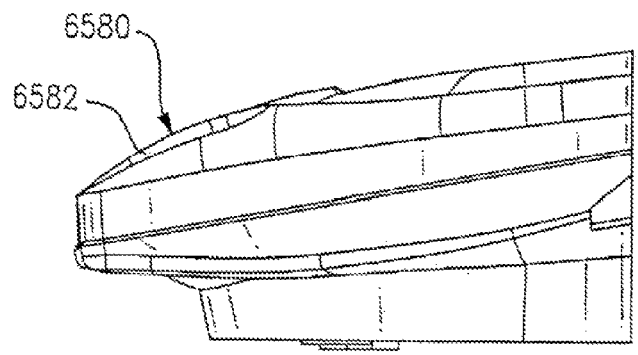
FIG. 9m is a side view of a transaction terminal having an apex ridge.
Figure 9L:
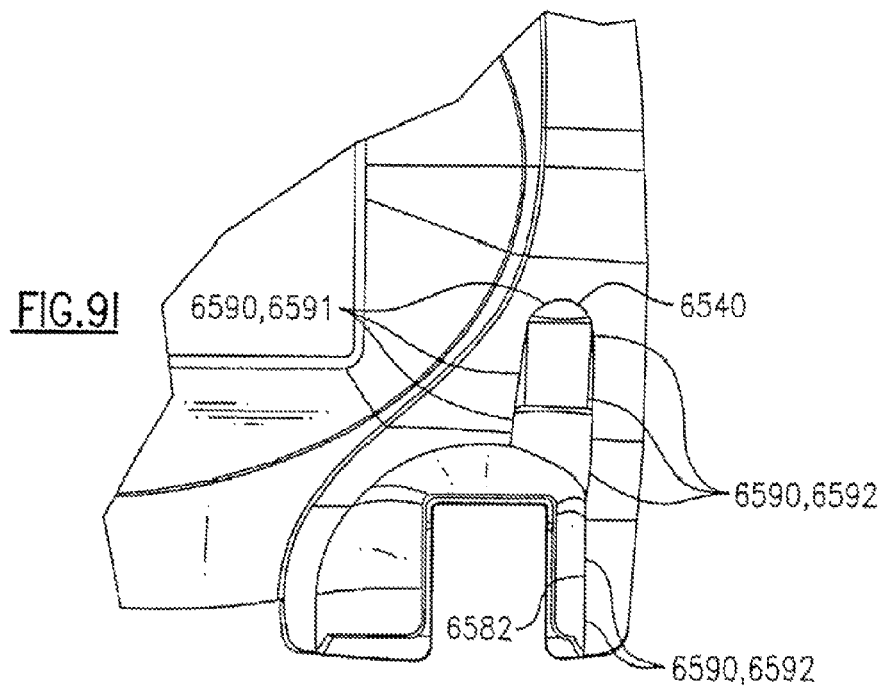
FIG. 9L is a top view of a transaction terminal having an elongated border outline thereof labeled.
Figure 9I:
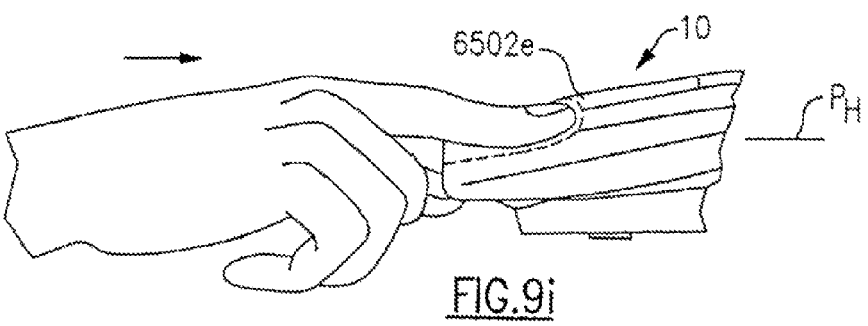
FIG. 9i is a side view of a transaction terminal having a "two knuckle" elongated finger recess.
Figure 9J:
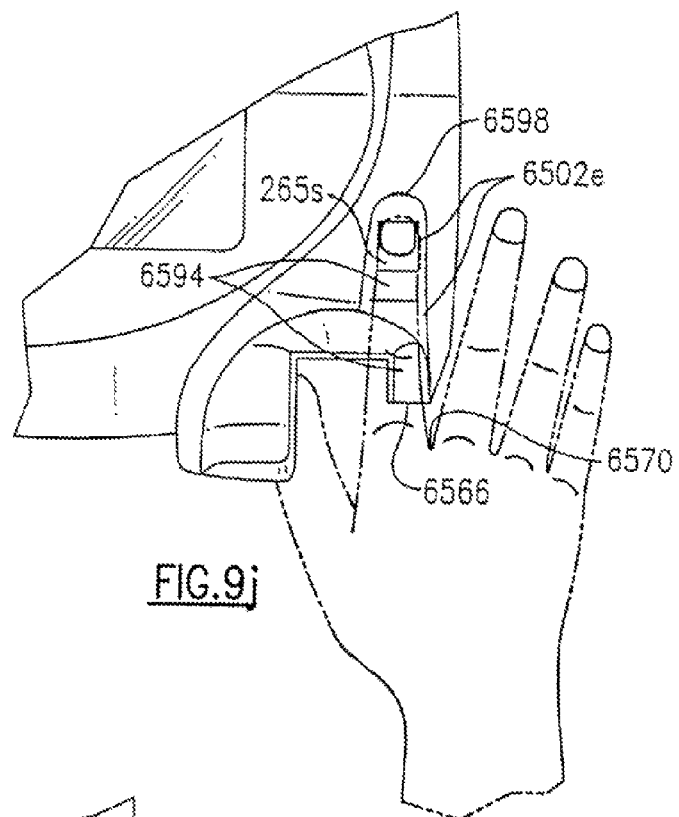
FIG. 9j is a top view of a transaction terminal having a two knuckled elongated finger recess.
Figure 9K:
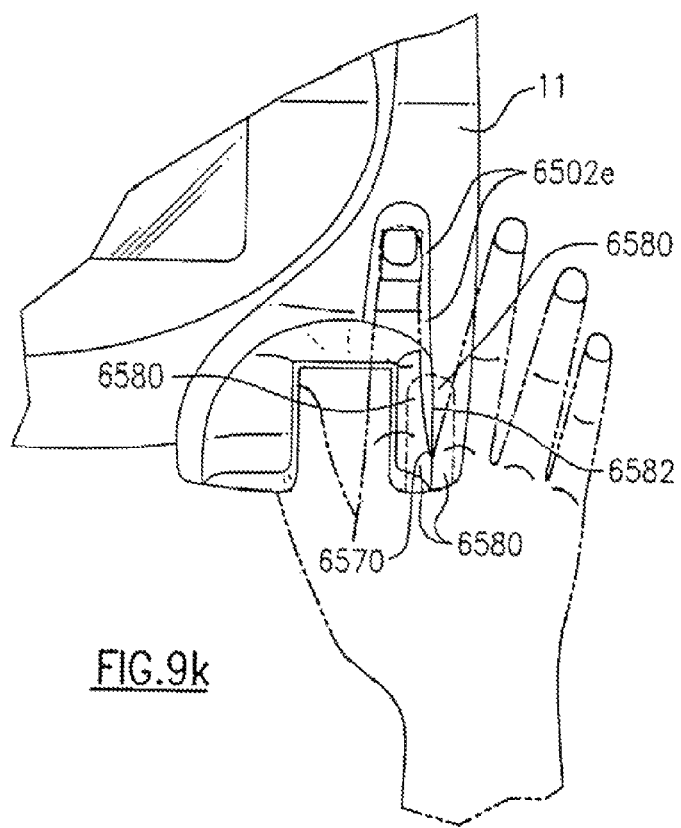
FIG. 9k is a top view of a transaction terminal having a web-receiving elongated finger recess.
Figure 9N:
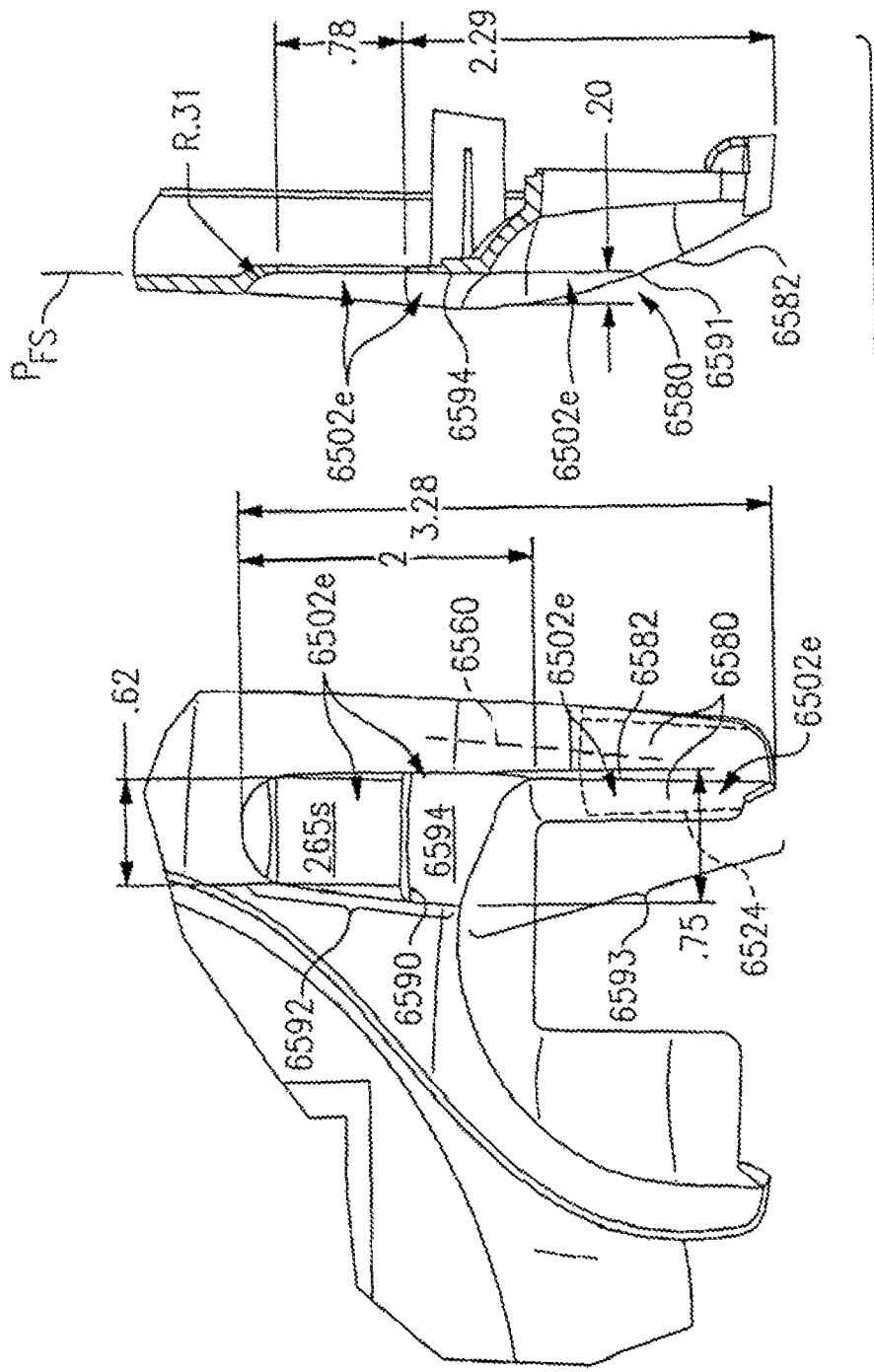
FIG. 9n are top and cross-sectional views including exemplary dimensional data, of a transaction terminal having an elongated recess.
Figure 11A:
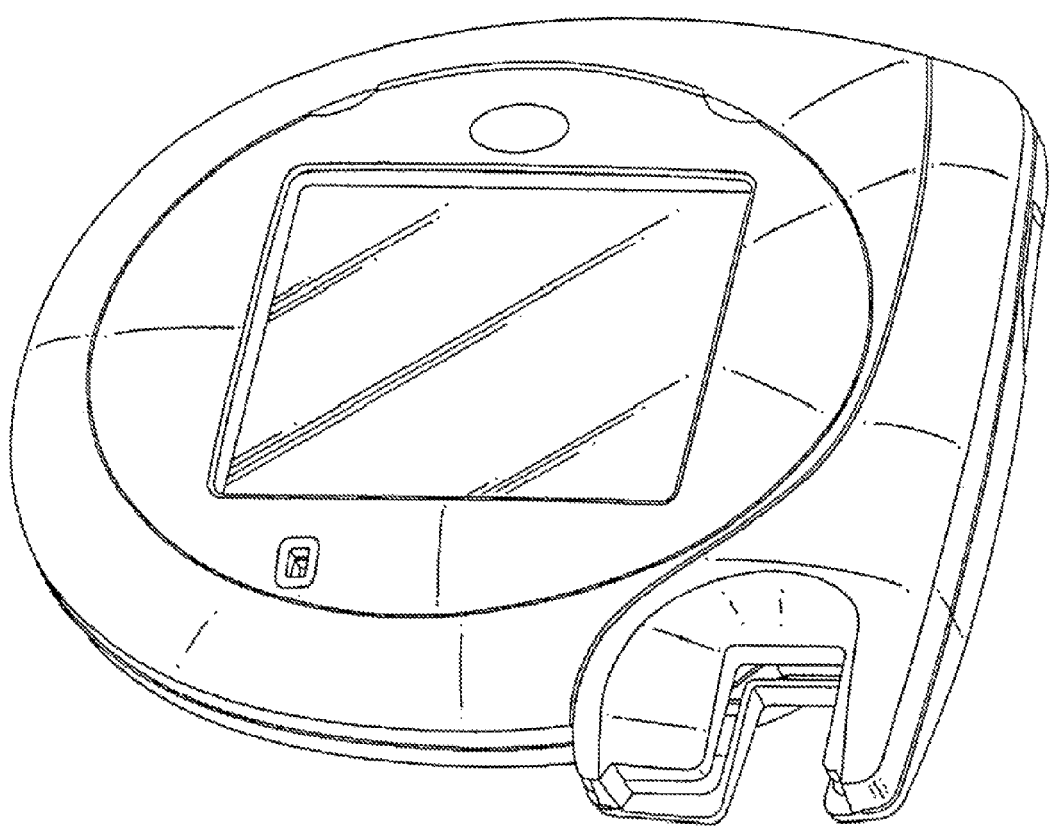
FIGS. 11a-11g are various additional views of a transaction terminal.
Figure 11B:
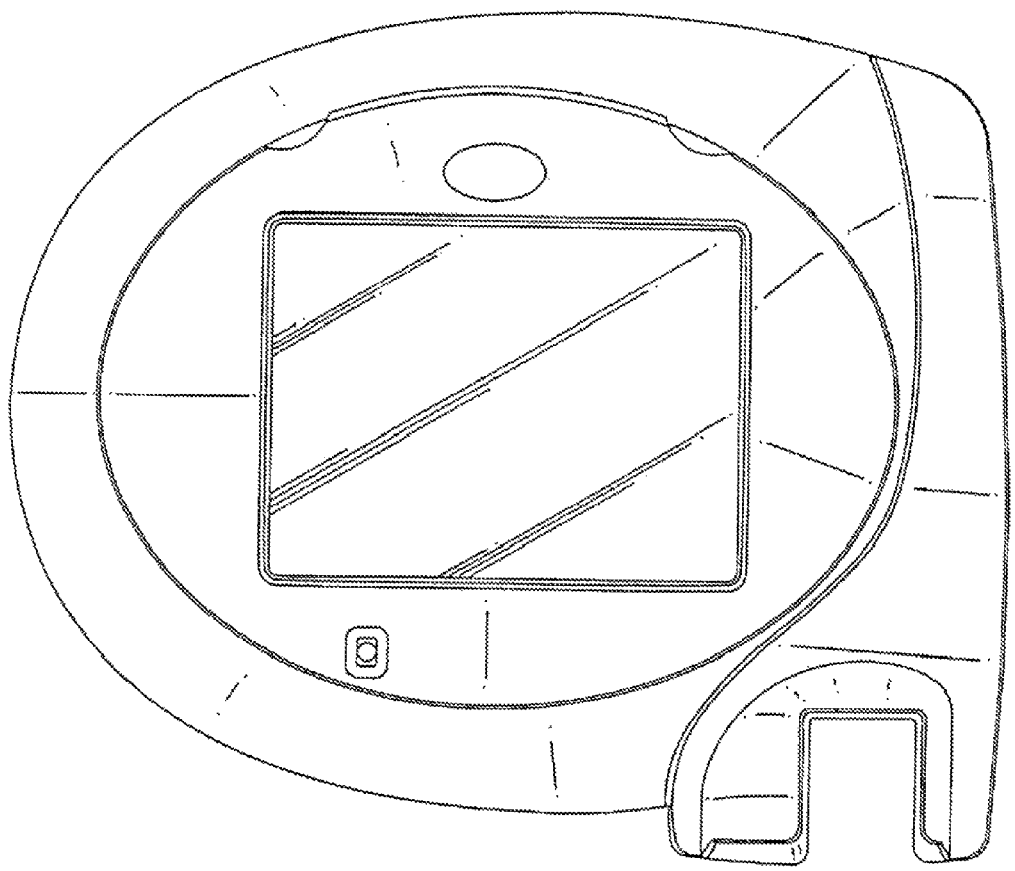
Figure 11C:
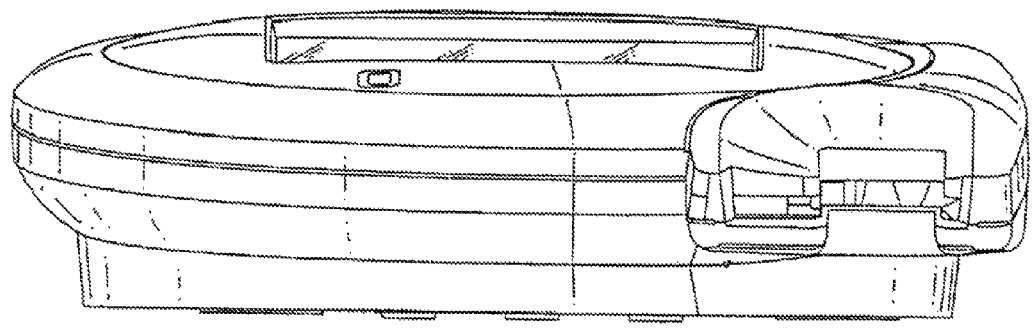
Figure 11D:
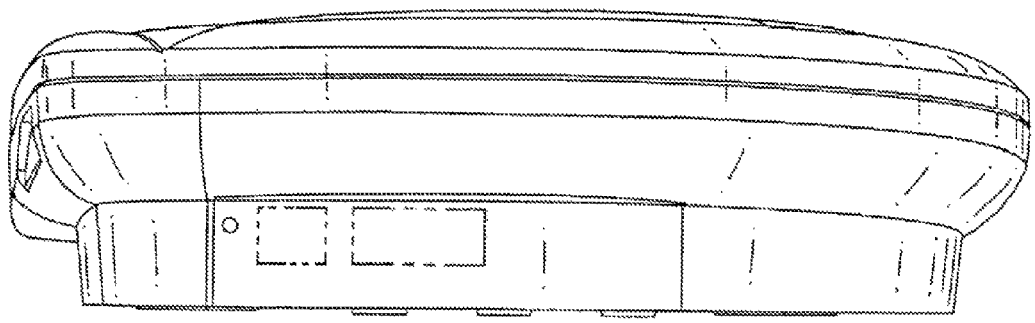
Figure 11E:
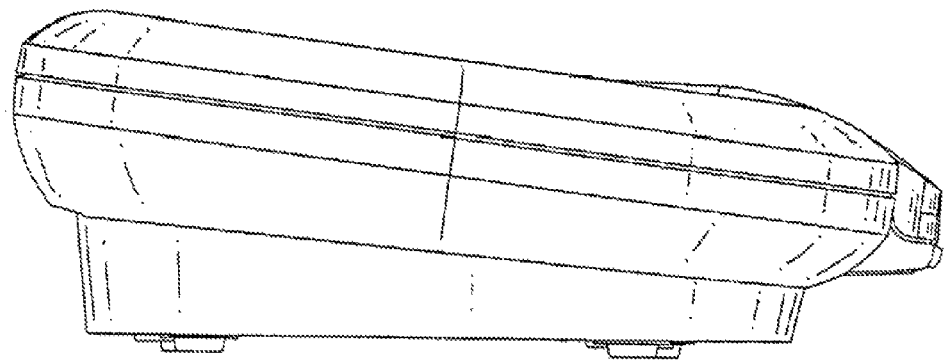
Figure 11F:
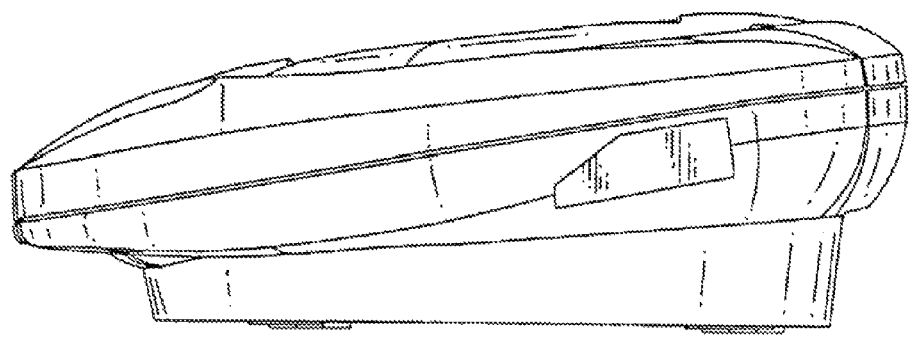
Figure 11G:
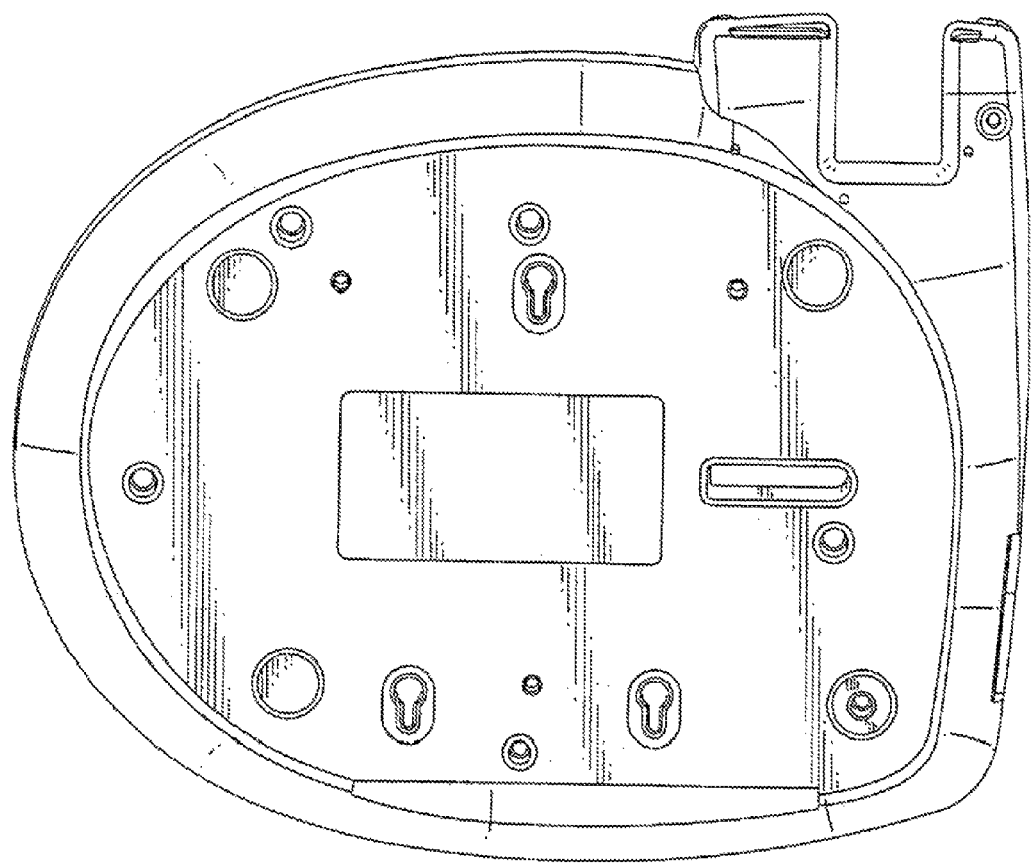

The invention of FIGS. 9*a*-9*n* is better understood with reference to the prior art finger receipt system of FIGS. 11*b* and 11*c*. Prior art finger receipt system 6507 includes a finger recess 6502 of length 6504, wherein length 6504 is about 1.000 inches (about the average length of an adult human index finger to the first knuckle). Prior art finger receipt system 6507 also includes a flat region 6510 higher than a surface of scanner 265*s* disposed in finger recess 6502. During finger scanning of an index finger, a user rests at least his middle finger, possibly a ring finger, and a pinky on flat region 6510 of raised height.

Figure 12A:
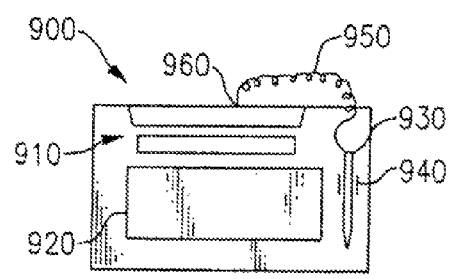
FIG. 12a illustrates a prior art transaction terminal.

The inventors noted a number of problems with finger receipt system 6507 as shown in FIG. 12*b*. First, the short length of recess 6502 encourages some users to move an index finger toward recess 6502 at a substantially vertical angle of approach as is depicted in FIG. 12*c*. A vertical loading of a finger onto recess 6502 may result in an inadequate imaging (such as capacitive imaging) of a finger print during finger scanning. Further, raised surface 6510 may operate to tilt a finger within recess 6502 laterally, also deleteriously affecting finger imaging. The single prior art system of FIGS. 12*b* and 12*c* is an example reference and should not be taken to be a complete summary of all of the problems of the prior art which the present invention is designed to overcome, nor is it implied that all prior art finger receipt systems include all of the features shown in FIGS. 12*b* and 12*c*.

Referring now to the transaction terminal of FIGS. 9*a*-9*n*, transaction terminal 10 includes an elongated finger recess 6502*e* which is partially defined by a card cavity 6515 of insert reader 240. In the embodiments described with reference to FIGS. 1*a* and 9*a*, for example, insert reader 240 includes a card cavity 6515 defined by side 6520, rear 6522 and side 6524 interior sidewalls of insert reader 240. A card cavity as defined herein, may or may not include a card cutout section 6530 as best seen in FIG. 9*d*. A card cavity 6550 includes a cutout section 6530 if an open space is defined by opposing sidewalls of a card reader 240 throughout an entire height of a card reader 240. For comparison, the embodiment of FIG. 9*g* includes a card cavity because it includes at least one interior sidewall 6524, but is not considered to have a cutout section because the interior sidewalls of reader 240 do not extend an entire height of the reader 240 as in the remaining embodiments of insert readers 240 described herein. Card cavities aid in the lateral alignment of a card within slot 245 as a card 90 is inserted into slot 245. Card cavities 6515 among other advantages allow a user to discern the approximate center of a slot from a substantially vertical viewing perspective. Card cavities having cutout sections 6530 allow a card 90 to be fully inserted into reader 240. Full insertion of card 90 is often required for mag stripe reading. Standardized mag stripe cards have mag stripes extending an entire length of a card. A mag stripe reader 241 can be mounted under surface 6531 as best seen in FIG. 4*a*. The integration of finger recess 6502*e* and cavity 6520 in accordance with the invention reduces material and space consumption of terminal 10 relative to what the consumption would be if recess 6502*e* and cavity 6515 are provided separately.

With further reference to the finger receipt system of FIGS. 9*a*-9*f*, elongated finger recess 6502*e* partially delimited by a sidewall 6524 of a card cavity 6515 has a length 6540 of at least about 1.75 inches. The length of 1.75 inches is based on the average adult human finger index length tip-to-second knuckle distance of about 2.00 inches. Preferably, the finger receipt distance should be selected to be at least 2.00 inches so that finger receipt system substantially receives an index finger up to the second knuckle. In certain embodiments, which will be described thereon, elongated finger recess 6502*e* is sized to a length longer than an average fingertip-to-web distance.

An elongated finger recess 6502*e*, if extending generally coextensively with a planar surface of scanner sensor 265*s* encourages a user to insert her finger in the recess in a position such that a user's fingertip lies flush on sensor 265*s* to the end that sensor 265*s* develops high quality image signals corresponding to a fingertip. In addition to the types mentioned previously herein, fingerprint scanner including sensor 265*s* may be of a type available from Bioscrypt, Inc., Mississauga, Ontario such as a sensor of a Bioscrypt MV1200 OEM module. Sensor 265*s* typically develops image signals via capacitive imaging. Elongated finger recess 6502*e* may have a first knuckle locator 6590 (FIG. 9*n*) as are common in finger scanners available from Bioscrypt.

"Horizontally oriented finger loading of a finger, wherein a finger is loaded into recess 6502*e* in an orientation generally horizontal to the plane or sensor 265*s* (which in the specific embodiment shown is generally horizontal to horizontal plane $P_H$) is depicted in FIG. 9*i*. For comparison, a short length recess may encourage a vertically oriented finger loading as depicted previously in FIG. 12*c*. Sidewall 6524 partially defining both elongated recess 6502*e* and cavity 6515 may include substantially vertical extending wall portions. Preferably, however, sidewall 6524 is sloped as best seen in FIG. 9*b* so that sidewall 6524 provides support to a finger in contact with sidewall 6524 in both lateral and vertical directions. Sidewall 6524 can include a concave profile. It is understood, however, that sidewall 6524 need not be configured to contact a finger. Sidewall 6524 need only provide space to accommodate a finger.

FIGS. 9*j*-9*k* show various embodiments of transaction terminals having an elongated finger recess in use. As is depicted in FIGS. 9*j*-9*k*, a user may dispose his index finger in elongated finger recess 6502*e* with his middle finger in a flared, somewhat laterally pointing direction without a first knuckle (9*j* and 9*k*) or without substantially any part (9*j*) of his middle finger substantially contacting an outer surface regions 6560 of housing 11, to be described herein.

The embodiment of FIG. 9*j* includes an elongated finger recess length of about 2.5 inches. Such a length for recess 6502*e* is highly advantageous in that sized to such a length, recess 6502*e* is assured of receiving an average sized adult finger so that a second knuckle is substantially completely received in recess 6502e. In the embodiment of FIG. 9j, a bottom floor surface 6594 extends forward a planar sensor 265s disposed proximate a distal end 6598 of recess 6502e. Specifically in the embodiment of FIG. 9j, floor surface 6594, throughout its entire length, extends substantially coplanar with sensor 265s so that an overall length of recess 6502e (from rear end 6598 to front end 6566 defined by a front edge of floor surface 6594) is at least about 2.5 inches.

FIGS. 9j and 9k illustrate typical and accepted use of a transaction terminal having an elongated finger recess according to the invention. Nevertheless, while outer surface region 6560 coextensive with elongated finger recess 6502e in the embodiment of FIGS. 9a, 9d, and 9e does not include a concave profile, outer surface region 6560 in the embodiment depicted in FIGS. 9a, 9d, and 9e, is sloped downwardly in a lateral direction to provide a clearance, unlike system 6507, allowing a user to position his middle finger substantially in a common horizontal plane with his index finger and sensor 265s when his index finger is received in elongated finger recess 6502e. Further, the embodiments of FIGS. 9a, 9d, and 9e are configured so that a user can rest his middle finger on surface 6560 during finger scanning to improve hand stability if he wishes to do so. In the embodiment of FIG. 9c, outer surface region 6560 of housing proximate recess 6502e includes printed matter or another type of marking in the general shape of a middle finger. The printed matter marking of FIG. 9c invites a user to place his middle finger on surface region 6560 so that the stability and orientation of an index finger in elongated recess 6502e is improved. In the embodiments of FIGS. 9f and 9h, outer surface region 6560 of housing 11 is specifically adapted to support a user's middle finger while encouraging a user to position his middle finger in a position that is substantially in a common horizontal plane with the user's index finger (and sensor 265s) received in finger recess 6502e. In the embodiments of FIGS. 9f and 9h, outer surface region 6560 includes a sloping sidewall having a concave profile. The concave profile surface region 6560 of FIGS. 9f and 9h encourage a user to place his middle finger, including one or two interior knuckle portions of his middle finger, against surface 6560 during finger scanning. Recesses 6502e and 6560 in the embodiments of both FIGS. 9f and 9h are adjoined at their respective front ends.

It has been mentioned that elongated finger recess 6502e should preferably have a length of at least an average two knuckle length (of at least about 1.75 in.).

Examples of what may be termed "two knuckle" elongated finger recess are shown in FIGS. 9i and 9j. In both of FIGS. 9i and 9j, elongated finger recess receives an average finger to about but not substantially longer than a two knuckle distance. In a highly useful variation of the invention depicted in FIG. 9k elongated finger recess 6502e is sized about as long or longer than an average finger tip to web spacing (that is, longer than about 2.5 inches) and housing 11 is configured so that a web 6570 defined between index and middle fingers of a user is received at a web receiving area 6580 of housing 11. Web receiving area 6580, in the embodiment of FIG. 9k, is defined at the interface between surface 6524 and surface 6550 toward a front of housing 11. Housing 11 should be shaped so that web receiving area 6580 is lower than a plane of sensor 265s, or at least not substantially higher than sensor 265s to the end that horizontal finger loading in elongated finger recess 6502e is encouraged. Accordingly, web receiving area 6580 can slope downwardly from the rear to the front of transaction terminal 10 as seen in FIG. 9m. If sidewall 6524 of cavity/finger recess and the sidewall defining surface 6560 slope laterally downwardly from an apex ridge 6582 partially included in web receiving area 6580, then web receiving area 6580 encourages a comfortable spreading between the index and middle fingers of a user, and therefore comfortable finger scanning with use of terminal 10.

In a further aspect of the invention, described with reference to FIG. 9L, housing 11 is contoured so that a border outline 6590 outlining a substantial portion of a finger recess 6502e is defined by housing 11. In the embodiments of FIG. 9L border outline section 6591 of a left side of border outline 6590, extends approximately a (human average) two knuckle distance. Border outline section 6592 of a right side of border outline 6590 (which is defined by apex ridge 6582 extends longer than a finger-tip-to web average spacing. A long, uninterrupted or substantially uninterrupted border outline 6590 extending generally coextensively with a plane of sensor 265s, particularly one extending at least a finger tip to web average spacing distance on at least one side of an elongated finger recess 6502e further encourages a user to place her finger in recess 6502e in a horizontal loading orientation as depicted in FIG. 9L.

Border outline 6590 described with reference to FIG. 9L is defined entirely by contours of housing 11. It will be understood, however, that border line 6590 could in the alternative or as a supplement be defined by printed matter markings (e.g. stickers, paint, molded-in colors, etc.) formed on housing 11.

Referring to FIG. 9h a transaction terminal 10 is shown having a spaced-apart insert card reader 240 and elongated finger recess 6502e. The transaction terminal 10 of FIG. 9h demonstrates that the features of the invention relating to elongated finger recess 6502e do not have to be incorporated in an embodiment wherein an elongated finger recess is partially defined by a card cavity 6515, although the space and material conservation advantages of forming recess 6502e integral with card cavity 6515, as have been described herein, are appreciated.

In FIG. 9n, dimensional information relating to one specific embodiment of a transaction terminal 10 having an elongated finger recess 6502e is presented. In the embodiment of FIG. 9n, elongated finger recess 6502e includes a length of about 3.28 inches a width of about 0.75 inches. Elongated finger recess 6502e in the embodiment of FIG. 9n is longer than an average human index fingertip-to-web spacing distance. Transaction terminal 10 in the specific embodiment of FIG. 9n includes a 6580 web receiving area 6580 (dashed in) adapted to receive a web 6570 of a user's hand. Web receiving area 6580 includes a part of apex ridge 6582 which is defined between the laterally down sloping surfaces of wall 6524 (sloping downward right to left) and the laterally down sloping surface of outer surface region 6560 (downward sloping left to right). Apex ridge 6582 encourages a comfortable spreading between an index finger and a middle finger of a user. Because elongated finger recess 6502e has surfaces contacting a large portion of an index finger, elongated finger recess 6502e encourages a stable receipt of an index finger therein. As best seen in the side cutaway view associated with FIG. 9n, web receiving area 6580 partially defined by apex ridge 6582 gradually slopes downward from rear to front. At point 6591 a plane $P_{FS}$, of sensor 265s intersects apex ridge 6582. Accordingly, it is seen that a part of apex ridge 6582 within web receiving area 6580 is defined above a plane $P_{FS}$ of sensor 265s and a part of apex ridge 6582 within web receiving area 6580 is defined below a plane $P_{FS}$ of sensor 265s. Such shaping of apex ridge 6582 encourages a substantially horizontal loading orientation of an index finger in recess 6502e. Referring to further aspects of the elongated finger recess 6502e of FIG. 9n, the elongated finger recess of FIG. 9n includes a rear region 6592 and a forward region 6593. Rear region 6592 is partially defined by a substantially planar surface of sensor 265s and interior walls having a floor surface 6594 extending forwardly from sensor 265s. Floor surface 6594 extends substantially coplanar with a surface of sensor 265s, though walls of defining recess 6502e can be slightly concave shaped to accommodate a shape of a finger. Rear region 6592 including sensor 265s and substantially coplanar forwardly extending floor surface has an overall length of about 2.00 inches or about an average two knuckle finger (tip to second knuckle) distance. Forward region 6593 extending forwardly from rear region 6592 is partially defined by sloping sidewall 6524 which preferably has a slightly concave cross section so that it is well-suited to accommodate a finger. In addition to partially defining elongated finger recess, sidewall 6524 partially defines card cavity 6515, which is useful at least in that it helps a user to align a card 90 within a slot of card reader 240.

Transaction terminal 10 can also include a retinal scan unit including scanner 267 associated control circuit 268. A scan unit including scanner 267 and control circuit 268 may be provided by components from an Icam 2001 retina scan unit available from Eye Dentify Corp. Control circuit 210 may perform identifications based on captured retinal scan signatures by transmitting captured electronic retinal signatures to a nonintegrated computer system for identification, e.g. to Network 380, or by downloading a database of signatures from e.g. Network 380 for identification by circuit 210. A retinal scanning transaction terminal 10 is shown in FIGS. 1m, 1p, and 1q showing a terminal having a retinal scanner 267 including a retinal scanner eyepiece 267e integrally formed in terminal housing 11.

Transaction terminal 10 further includes a touch pad screen 20 including a display 234 and a touch pad overlay 230. Touch pad screen or "touch screen" 20 displays information to a user such as prompt information, a virtual keypad, and advertising messages, etc. Touch screen 20 also serves as a means to input data. Touch screen 20 serves as both a virtual keypad and signature capture platform. Touch pad screen 20 may comprise an LCD display 234 in combination with a touch screen overlay 230. Display 234, e.g. may be a 5.7", ¼ VGA (320× 240) resolution color or monochrome LCD screen of the type available from Nan Ya Corporation. Display 334 may be driven by an on-chip LCD controller available on a microchip including circuit CPU 212 if circuit is appropriately selected, or in association with dedicated control circuit 235 as shown in FIG. 2a. Referring to assembly view of FIG. 4a LCD display 234 may be mounted on LCD bracket 17 which is mounted to housing lower section 11LW.

Touch screen overlay 230 may be, for example, a Nissa NIS/RC-872 overlay with parallel interface. Touch screen overlay 230 typically operates in association with touch screen controller 231. Touch screen control circuit 231, like LCD circuit 235 can be integrated in an IC comprising elements of control circuit 210. In the embodiment shown in assembly view FIG. 4a, display 234 includes a side-mounted back light unit 236. For increasing the uniformity of illumination, display 234 could include a top-mounted backlight 236 which would occupy positions along top edge 234e of display 234. Display 234 is disposed in housing 11 so that the side mounted back light unit 236 is housed in terminal 10 on a side of terminal 10 opposite reader unit 240. Increasing the distance between backlight unit 236 and mag stripe reader 241 reduces the effect of electromagnetic interference from backlight unit 236. In the specific embodiment described, backlight unit 236 is powered by inverter 237 which converts DC power output by power system 238 into high voltage AC power for powering backlight 236.

Figure 8A:
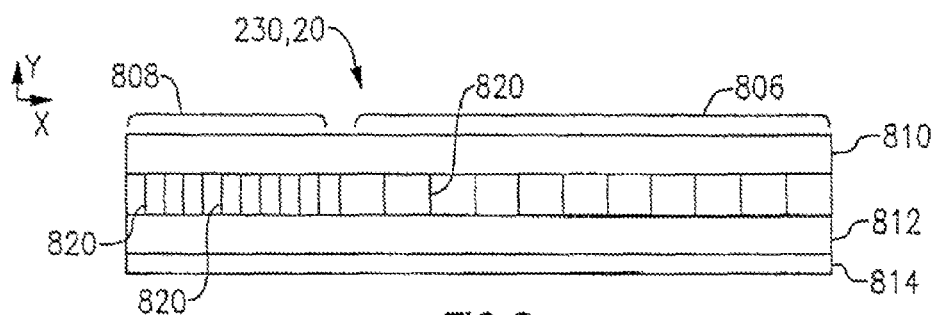
FIGS. 8a-8b are function lay-out diagrams of a touch screen overlay.
Figure 8B:
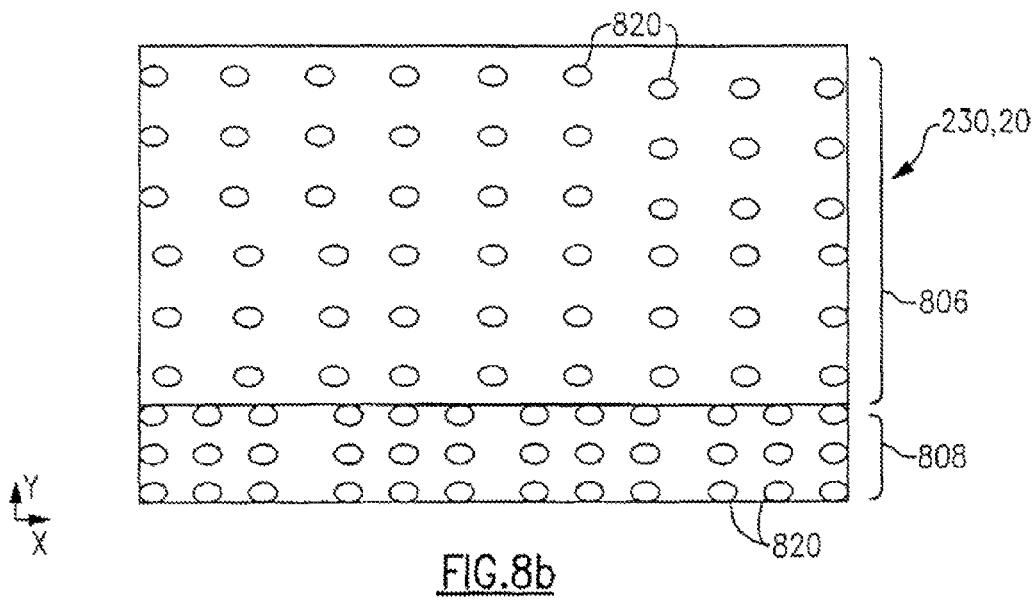

As shown in FIGS. 8a and 8b and in accordance with a further aspect of the invention, touch screen 20 and more specifically overlay 230 of touch screen 20 may be configured to be divided into zones 806 and 808, wherein zone 808 is optimized for stylus data entry and zone 806 is optimized for entry of information by actuation by a user's finger. Overlay 230 as best seen in a conceptual schematic diagram of FIG. 8a comprises a series of layers 810, 812, and 814, which vary in number depending on the selection (make and model number) of touch screen overlay 230. Touch screen overlay 230 includes a top layer 810, which, as will be described, preferably comprises a single uniform sheet of light transmissive material.

The inventors found that the optimal configuration for touch screen overly 230 varies depending on the intended actuation mechanism for touch screen 20. In certain applications, touch screens are designated for actuation by a finger, in other application stylus 74 and in other applications, such as in terminal 10, both. Touch screen overlays comprise support mechanisms known as "microdots" 820 which are interposed between two layers of overlay 230 as best seen in FIG. 8a. The inventors found that the positioning of microdots 820 which optimizes overlay 230 for receipt of finger-entered data is not the same positioning which optimizes overlay 230 for stylus-entered data. Notably, the inventors found that in order to optimize touch screen 20 for finger-entered information, microdots 820 should be spaced to a larger average spacing distance than in a touch screen optimized for stylus-entered data.

In the invention described with reference to FIGS. 8a and 8b touch screen 20 is divided into two zones, a finger entry zone 806, and a stylus entry zone 808. Preferably stylus entry zone 808 is located forwardly of finger entry zone 806 in terminal 10 as seen in FIG. 8b so that a user can readily view a virtual keyboard displayed in finger actuated zone 806, or other display messages of touch screen 20 in zone 806 while entering signature information into stylus entry zone 808. In finger actuation entry zone 806, as shown by FIGS. 8a and 8b, microdots 820 are spaced to an average spacing distance that is larger than in stylus entry zone 808, wherein microdots 820 are spaced closer together than in zone 806.

Preferably, the remaining characteristics of overlay 230 remain as they would have been in the absence of the described microdot spacing variation. That is, layers 810, 812, and 814 of touch screen overlay 230 remain single unitary sheets of light transmissive material. Zones 806 and 808 could also comprise separate and x-y dimension spaced apart sections of layering material. However, such a configuration, among other disadvantages would not allow a person entering signature information to exceed the bounds of signature zone during the course of entering signature data and still have the signature data received.

Prior to the invention shown and described with reference to FIGS. 8a and 8b, touch screen overlays 230, sometimes referred to as "panels" were known to be available only in configurations having uniform "dot pitches", or "resolutions".

Commercially available "high resolution" or "fine pitch" touch screen overlays 230, such as are exemplified by a Nissha RTC-A1 touch screen overlay, are configured to receive inputted data substantially only via stylus 74. High resolution touch screens require a substantially concentrated point contact by an input source for registration of data entry. Accordingly, high resolution touch screens having high resolution touch screen overlays generally do not register data when a user attempts to enter data by finger contact.

"Low resolution" or "course pitch" touch screen overlays 230, such as are exemplified by a Fujitsu N010-0518-T401 register data entry either by a stylus 74 or by a finger. A problem with use of low resolution touch screens, however, is that such touch screen 20 sometimes erroneously registers unwanted data. For example, as described hereinabove, if a user unintentionally contacts low resolution touch screen 20 with a finger or another part of her hand during the signature entry process, a low resolution touch screen 20 may erroneously register a data entry. The problem of erroneous data entry with use of a low resolution touch screen can be substantially reduced by configuring terminal 10 to include a raised surface at least along one edge of terminal 10 bordering touch screen 20, as described herein relative to FIG. 4e-4k. Nevertheless, problems of erroneous data entry may persist. The combination of a high resolution touch screen overlay and a display is referred to herein as a "high resolution touch screen". The combination of a low resolution touch screen overlay and a display is referred to here as a "low resolution touch screen".

In accordance with another aspect of the invention, control circuit 210 may be configured to execute a signature data entry program which monitors data received from touch screen 20 to determine if data is entered outside of a signature entry area 2008 (see FIG. 4g) of touch screen 20 during the course or receiving signature data. If a control circuit 210 determines that data is received from outside a signature entry area 2008, control circuit 210 displays a prompt message which prompts a user to maintain her entry of data to a signature area 2008. The user then completes the signature entry process, and terminal 10 can capture a complete or substantially complete signature in spite of receiving some data outside of area 2008.

A flow diagram illustrating operation of a signature entry feature is described with reference to the flow diagram of FIG. 4m. At block 2030 control circuit 210 displays on touch screen 20 a signature capture screen 2002 as shown in FIG. 4g. Signature capture screen 2002 includes a signature entry area 2008 and text messages including "PLEASE SIGN HERE", "CLEAR," and "DONE," 2010, 2012, and 2014. The CLEAR and DONE text messages 2012 and 2014, respectively, are control buttons which are actuated by finger or stylus contacting of the displayed messages. If a user presses CLEAR button 2012 control circuit 210 stops display of the signature entry screen 2002 and reverts to a previous operating mode or erases from display 20 data corresponding to signature data entered prior to the time clear button 2012 is actuated. When a user has completed entry of a signature, a user presses DONE button 2014. Touch screen overlay 230 of touch screen 20 continuously reports to control circuit 210 the X,Y coordinates of data point entries made into touch screen 20.

Figure 4B:
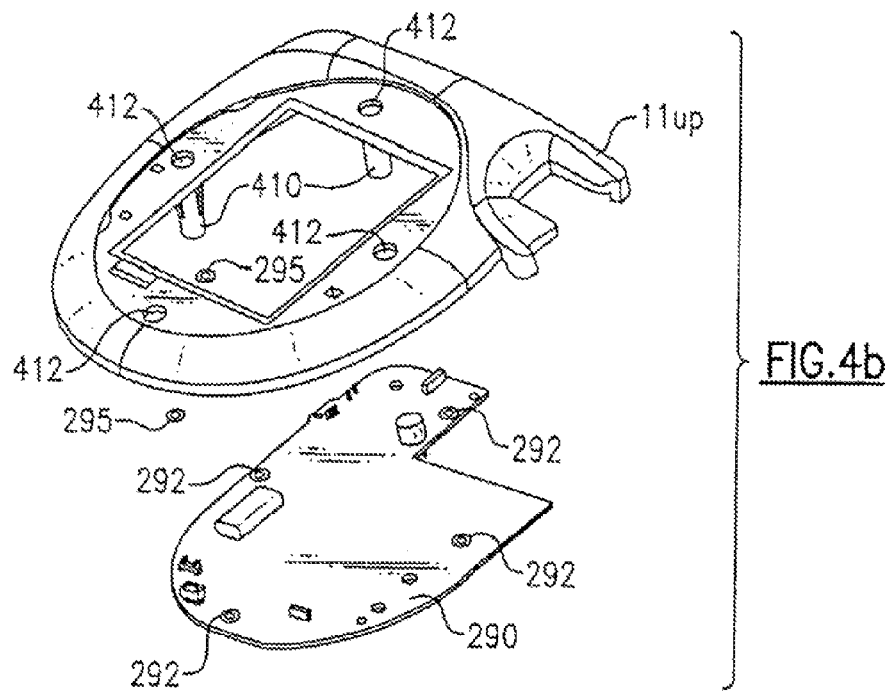
FIGS. 4b and 4c are detailed assembly diagrams illustrating a break-in detection feature according to the invention.
Figure 4C:
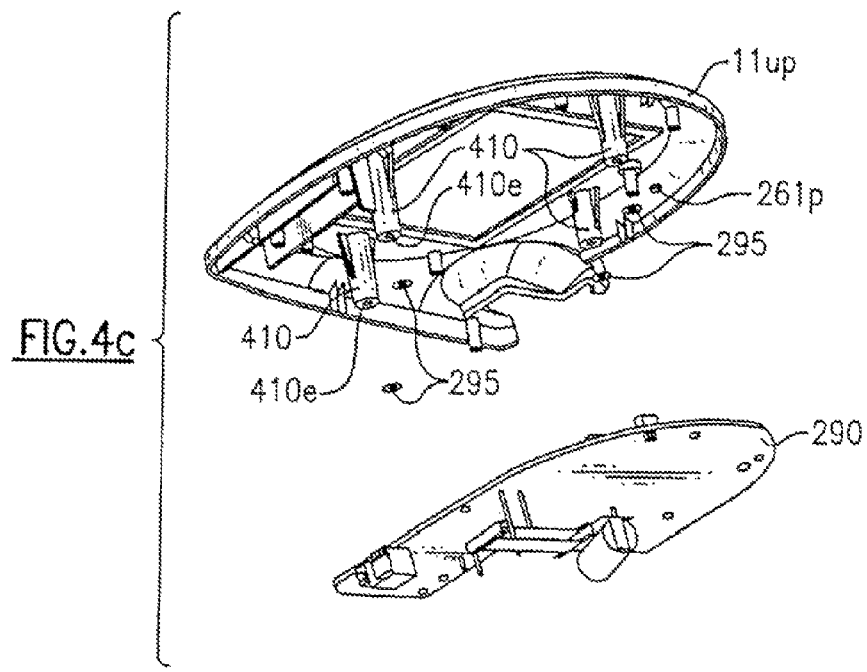
Figure 4M:
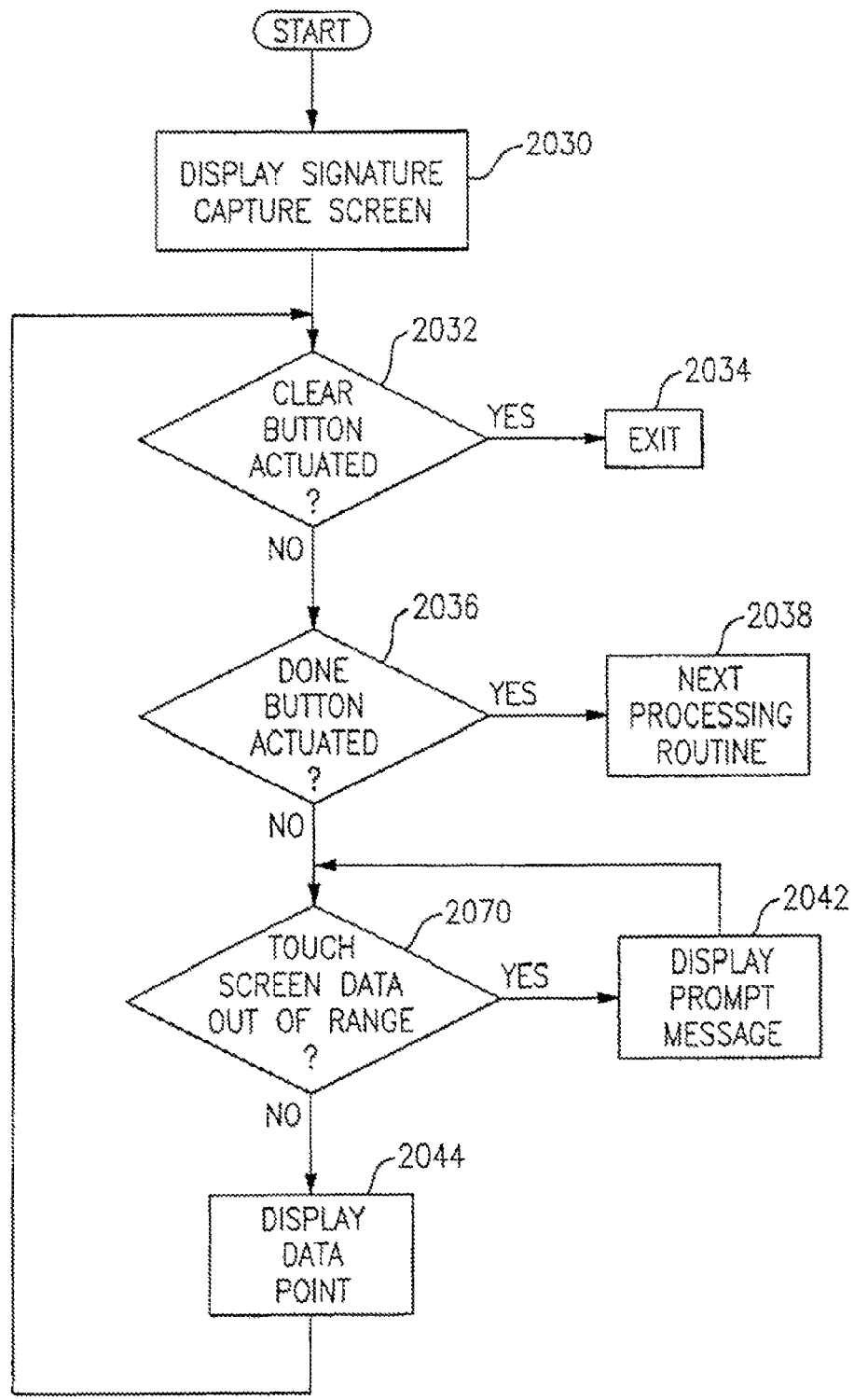
FIG. 4m is a flow diagram illustrating operation of transaction terminal during signature entry mode of operation.

Continuing with reference to the flow diagram of FIG. 4m, control circuit 210 at block 2032 monitors X,Y entry data from touch screen 20 to determine if CLEAR button 2012 has been actuated, and exits the signature capture mode (or erases signature data, block 2034) if CLEAR button 2012 has been actuated. At block 2036 control circuit 210 monitors touch screen coordinate data to determine whether DONE button 2014 has been actuated. If DONE button 2014 is actuated, control circuit 210 proceeds to block 2038 to execute a next processing routine for processing of the entered signature data. Such a next processing routine may include, e.g. compressing, transmitting, recognizing, authenticating, and/or encrypting of the entered signature information.

At block 2040 control circuit 210 determines if the X,Y coordinate data received from touch screen 20 is out of range. More specifically, control circuit memory 216 has stored therein coordinate data representing signature capture area 2008. At block 2040 control circuit 210 determines if X,Y coordinate data received from touch screen 20 is included in X,Y coordinate data representing signature entry area 2008. If a user during signature entry, intentionally or unintentionally contacts with a finger or other hand part, a portion of touch screen 20 outside of area 2008 in a manner sufficient to register a data entry, touch screen 20 will likely report back to control circuit 210 a data entry coordinate point that is the average of the point of contact by the user's hand and the point of contact by stylus 74. Control circuit 210 will recognize such a coordinate value as being outside of signature capture area 2008 if the point of contact by the user's hand is sufficiently spaced apart from area 2008. If control circuit 210 at block 2040 determines that the coordinate data is in range control circuit 210 proceeds to block 2044 to display the data point. If control circuit 210 determines at block 2040 that the coordinate data is out of range control circuit 210 proceeds to block 2042.

At block 2042, control circuit 210 may display a text message on touch screen 20 advising a user to remove his/her hand from touch screen 20. An example of such a text message is shown in FIG. 4L. In the example of FIG. 4L, control circuit 210 displays the text message "SIGNATURE ONLY PLEASE", 2048 superimposing the message 2048 on recorded and displayed signature data 2049. Control circuit 210 could also display prompt message 2048 on another area of touch screen 20. By retaining display of the entered signature data up to the last valid data point during the output of the prompt message, the feedback system allows a user to discern precisely the extent to which presently entered signature data has adequately been registered, and allows a user to discern the point at which she should continue with stylus entry of signature data.

In the specific example of FIG. 4L, the prompt message displayed is "Signature Only, Please". Other messages are possible, e.g. "Please Do Not Contact Screen Outside of Signature Zone," etc. Further, the display on screen 2002 of a prompt message 2048 can be coupled with an actuation of a light source and/or an acoustic output. For example, control circuit 210 may cause one or more of (1) flashing or other control of display backlight 236 (FIG. 4a), (2) flashing or other control of LED 287L, (3) actuation of audio output 276 to emit a beep or voice message (e.g. a voice message advising a user to maintain data entry to within area 2008) when control circuit 210 determines at block 2040 that data received from touch screen 20 is out of range (is invalid).

With further reference to FIG. 4m, it is seen that control circuit 210 continuously executes a control loop to display prompt message 2048 (block 2042) until at block 2040 control circuit 210 determines that coordinate data received from touch screen 20 is in range (indicating that a hand part has been removed from a non-signature capture area of screen). When control circuit 210 determines that received coordinate data is in range, control circuit 210 proceeds to block 2044 to plot, or display a data point on screen 20, and additional data points if the received data remains in range. Accordingly, the feedback system described with reference to FIG. 4m warns a user as soon as there is an error in data entry, encourages a user to quickly rectify the problem, and allows terminal 10 to capture a complete or substantially complete signature in spite of there being a problem with data entry during a signature entry procedure.

Another user-prompt feature which can be incorporated in transaction terminal 10 is described with reference to FIG. 4n. Transaction terminal 10 can include a manual insert style mag stripe reader, or can be configured so that when operating in a mag stripe card reading mode of operation control circuit 210 displays the prompt message 2410 as shown in FIG. 4*n*. Specifically, control circuit 210 can display the prompt message "INSERT CARD AND REMOVE QUICKLY" when operating in a mag stripe card reading mode. The inventors tested a version of transaction terminal 10 substantially as described, which in a card reading mode displayed the prompt message "INSERT CARD". In a sample of 53 persons, 42 (79%), left card 90 in reader 240. When the transaction terminal 10, was reconfigured to display message 2410 as shown in FIG. 4*n* during a card reading mode, the problem of persons leaving a card 90 in slot 345 during a card reading mode was substantially eliminated. Prompt message 2410 prompting a user to remove a card quickly substantially improves card reading.

Referring to further components of terminal 10, terminal 10 may include secure circuit block 220, to be described in greater detail herein in communication with circuit 210 for preventing theft of electronically stored information such as PIN information.

Still further, transaction terminal 10 includes at least one and preferably more than one communication interface for providing communication with an external computer system such as a cash register 340 or a computer system 350 and 360 of a POS network to be described herein. In the specific embodiment shown in the block diagram of FIG. 2*a* terminal 10 includes an Ethernet interface 250, a USB interface 252 an RS485 IBM Tailgate Interface 253, an RS 232 interface 254. Referring to FIGS. 3*f* and 3*g*, including multiple interfaces in terminal 10 yields important advantages. When transaction terminal 10 is in communication with cash register via cable 60, to be described herein it is common to concurrently connect terminal 10 via line 61 (typically an Ethernet line) directly to retailer server 350. Accordingly, data and instructional communications which are beyond the capacity of cash register 340 (which is often a legacy system) to support can be carried out via direct link 61 between server 350 or (if terminal 10 is properly equipped) another computer system e.g. HUB 360, Network 322.

Terminal 10 can also include such interfaces as a PCMCIA interface 255 in communication with a PCMCIA slot connector 44. Slot connector 44 may receive, for example, an RF communication card, a flash memory card, an optical reader PCMCIA card or other commonly available PCMCIA cards. PCMCIA slot connector 44 may be disposed to be accessible from the outside of housing 11 or else PCMCIA slot connector 44 may be accessible from the interior of housing 11 only. An RF or other wireless type of interface may also be provided in hard-wired communication with control circuit 210, e.g. an IR interface 277, shown in FIG. 2*b*. Electrical circuitry associated with the above types of components are more commonly being packaged in a packaged IC that comprises elements of control circuit 210.

In accordance with the invention, several interfaces can be physically packaged to terminate at housing 11 of terminal 10 in a single electrical connector port 42. As will be discussed in greater detail herein transaction terminal 10 is commonly connected in communication with a cash register 340 which is PC based or PC compatible. Cash registers commonly comprise at least one of four major types of communication connector ports: PC USB, IBM retail USB, RS232 or RS485 physical connector ports, each having a different PIN configuration. In accordance with the invention, terminal 10 includes a universal connector port 42 which includes a plurality of pins, wherein at least a first pin or group 51 of pins P are in communication with a first type of interface (e.g. USB), at least a second pin or group of pins 52 are in communication within a second type of interface (e.g. RS 232). Universal connector port 42 of terminal 10 may include additional groups of pins in communication with additional types of interface. For example, a third group of pins 53 may be in communication with a third type of interface (e.g. RS485) certain types of interfaces may be adapted so that pins "P" of universal port 42 are shared. For example, RS 232 and RS 485 interlaces can be adapted so that pins of the interfaces are shared with use of switching circuitry 272 as will be described herein.

When terminal 10 comprises universal connector port 42, a supplier of terminal 10 supplies along with terminal 10 a cable 60 for connection with universal connector 42 which is available in one of N varieties, where N is the number of interfaces that universal connector port 42 is in communication with within terminal 10. Thus, if universal connector port 42 is connected to four different interfaces (RS 232, RS485, IBM retail USB, PC USB), then a supplier 10 will make available cable 60 in one of four varieties. Each variety of cable 60 will have a proximal end connector 61 which interfaces with universal connector 42. Thus, if universal connector is a 15 socket connector, the proximal end of each variety of cable will include a proximal end connector 61 having 15 pins. The varieties of cables will differ in the connector of distal end 62. The first variety of cable will have distal end connector 62 in accordance with the standard connector form of the first type of interface, the second variety of cable 60 will have a distal end connector 62 in accordance with the standard connector format of the second type of interface and so on. A customer will order the appropriate variety of cable from a supplier depending on the type of interface terminal that will be interfaced within a cash register or other host computer system. In the alternative, a supplier may supply each of several cable varieties to a customer and the customer may chose the appropriate cable, and may switch cables if terminal 10 is required to communicate with a different interface. It can be seen that the product supply system including universal connector port 42 and associated customer selected cable 60 greatly reduces the size requirements of terminal back end 11*rr*. The universal connector and cable product supply system also significantly reduces the cost of terminal 10 without compromising functionality, since it reduces the number of physical connector ports that have to be integrated during assembly at terminal back end 11*rr*.

In a further aspect of the universal connector port feature of the invention, control circuit, 210 polls the contents of designated interface identifier, or "cable select pins" 42*cs* pins of connector 42. When the various cables 60 are made, conductors of cable 60 are wired so that the two conductors of cable 60 which supply the interface identifier pins of interface 42 supply the identifier pins with a unique signature indicative of the interface to which distal end 62 of cable 60 is interfaced with. For example, it will be seen that a set of cables 60 can be configured so that a first variety of cable supplies interface identifier pins of connector 42 with a signature of 00 indicative of an interface of a first type, a second variety supplies a signature of 01 indicative of an interface of a second type, a third variety of cable 60 supplies a signature 10 indicative of an interface of a third type, and a fourth variety of cable supplies a signature 11 of a fourth type when distal end connector 62 is connected to a device.

More specifically, cable 60 can be made to provide a signature indicative of the cable type by manufacturing cable 60 of each variation in a complementary fashion with the voltage supply to connector 42 so that the lines of cable 60 interfacing with cable select pins 42*cs* of connector 42 return a high logic value to control circuit 210, unless the lines interfacing with cable select pins 42cs are connected within the length of cable or connector 61 to ground. Therefore, by grounding out one line that interfaces with a cable select pin 42cs, a logic 0 is returned to the cable select pin 42cs. By grounding out both lines of cable 60 interfacing with cable select pins 42cs, two low data points (i.e. a 00 signature) is returned to cable select pins 42cs. Accordingly, it can be seen that circuit 210 can be made to automatically identify the interface to which cable 60 is connected to, and can automatically adjust controls of I/O interface, of related circuit terminal 10 accordingly.

Figure 2B:
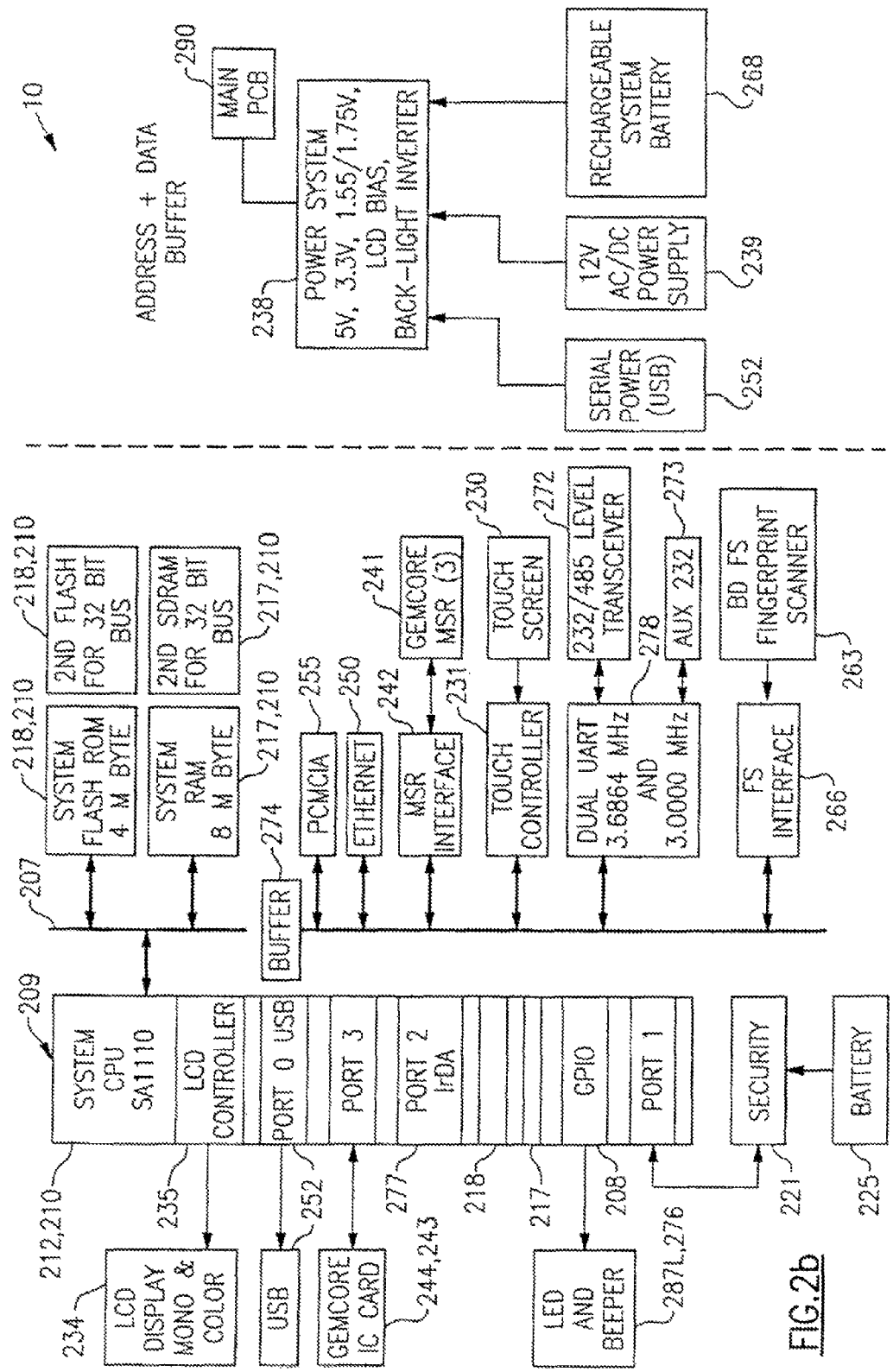
FIG. 2b is an exemplary chip system architecture diagram of an exemplary transaction terminal according to the invention.

Additional features of the invention in an exemplary embodiment are understood with reference to the system architecture of FIG. 2b. Referring to interface-related features, RS 232 and 485 interfaces 254, 252 can share a common asynchronous receiver-transceiver as seen by DUART 278. A switching function indicated in FIG. 2a by block 251 for switching the path between connector 42 and interfaces 254, and 253 can be provided by 232/485 level transceiver 272, which may be provided by a Linear Technology Model LTC 1387 Single 5U RS232/RS485 Multiprotocol Transceiver. Continuing with reference to FIG. 2b, IC chip 209 carrying CPU 212 can package certain interface circuitry such as USB interfacing circuits 252 and an IRDA interface 277. General I/O port 208 may provide output to indicator 287L and audio output 276 the latter, of which a programmer user may configure for operation with use of script programming or other programming, which will be described herein. In the exemplary embodiment, IC chip 209 is in communication with system BUS 207 which includes address and data buffer 274. In the exemplary embodiment system RAM 217 and system ROM 218 are provided. Additionally chip 209 including CPU 212 includes limited on-board RAM 217 and ROM 218. Terminal 10 in the embodiment of FIG. 2b is powered by a multiple voltage power system circuit 238 which distributes power to PCB 290. System 238 distributes power originating from, for example, a serially interfaced device, as indicated by USB box 252, an AC/DC power supply 239, e.g. a wall outlet plug-in power pack, and/or a rechargeable battery 268.

Figure 3A:
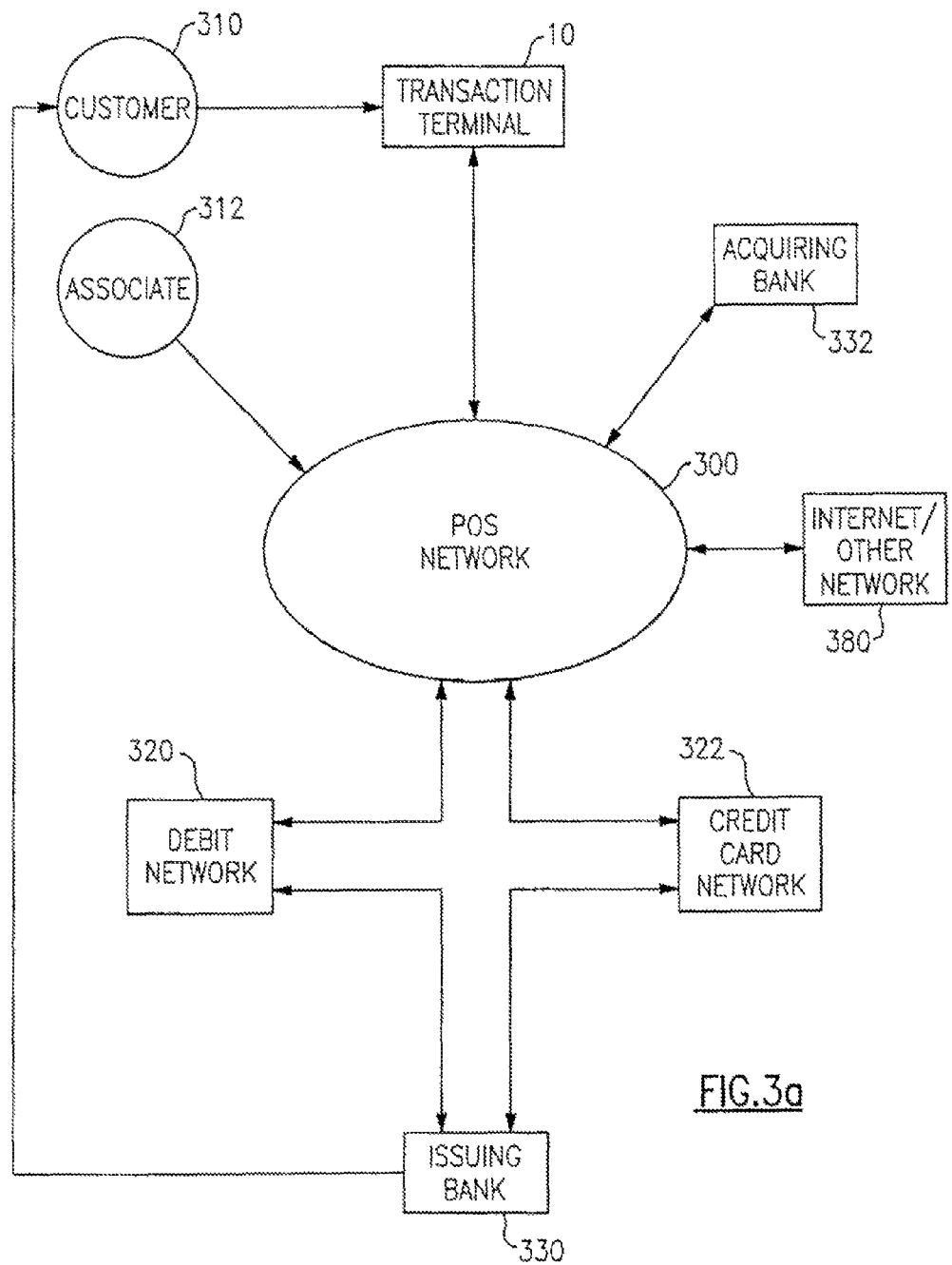
FIG. 3a is a flow diagram illustrating a flow of events in a typical POS transaction.

With reference to the transaction cycle flow diagram of FIG. 3a, an environment in which transaction terminal 10 may operate in accordance with the invention is described in greater detail.

Typically, transaction terminal 10 is disposed in a retail store Kiosk, or customer service desk. When a customer makes a transaction using a credit card or a debit card, an electronic benefits card (EBC) or customer loyalty card, a customer, at STEP 1, inserts a card into insert reader to read the card. A customer may, in addition, be prompted by terminal 10 to enter PIN information into terminal 10, and may be prompted to write a signature on the terminal 10 so that terminal 10 can capture a signature.

About the time that a customer inserts a card into terminal 10, a sales associate, at STEP 2, enters the sales amount into POS network 300, to be described in more detail wherein, using e.g. a keypad 340K of cash register 340, or a bar code reader 342 or 263. In the alternative, the dollar amount can be entered into transaction terminal 10 at STEP 2. At STEP 3, transaction terminal 10 communicates a customer's card information data determined from a reading of the card and other transaction data to POS network 300. Transaction terminal 10 may also communicate PIN information of a customer to POS 300 as part of STEP 3. Also, a transaction terminal may communicate a captured signature to POS network 300 as part of STEP 3. More typically however, a signature may be captured by terminal 10 and transmitted to POS network 300 after authorization is complete as will be described herein. Signature data may be achieved for use in a signature recognition system by a retailer for recognition by a computer system of retailer POS Network 300 or as a third party, e.g. at a computer at 380. Transaction terminal 10 may also store signature data for later processing, which may be performed on a batch basis. Transaction terminal 10 may also archive other transaction data.

Figure 3B:
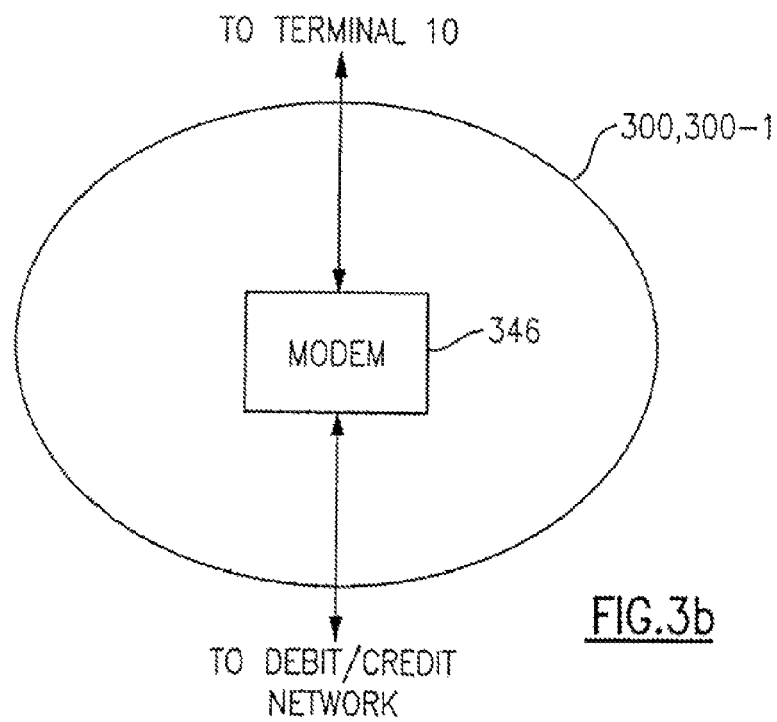
FIGS. 3b-3e show various embodiments of possible POS networks.

POS (Point-of Sale) Network 300, as is indicated in FIG. 3a, can take on a variety of forms. In any one of the layouts described, transaction terminal 10 can be considered part of POS network 300 once it is connected to POS network 300. In one simple form, as is indicated by FIG. 3b, POS Network 300 can comprise a modem 346 (e.g. cable or dial-up) or other communication device which provides communication debit network 320 or credit card network 322. Credit network 322 and debit network 320 may be the same network.

Figure 3C:
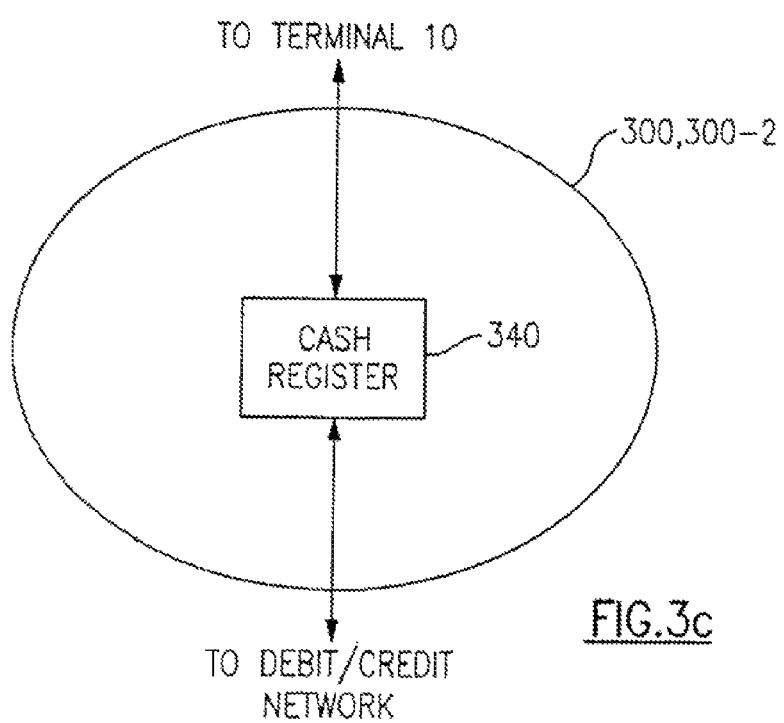
Figure 3D:
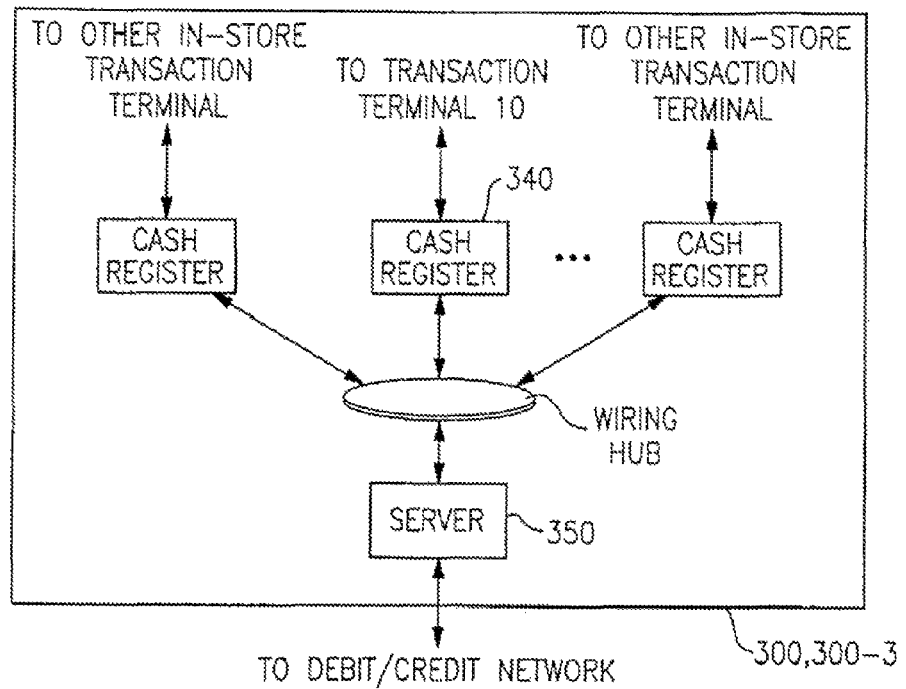
Figures 3F, 3G:
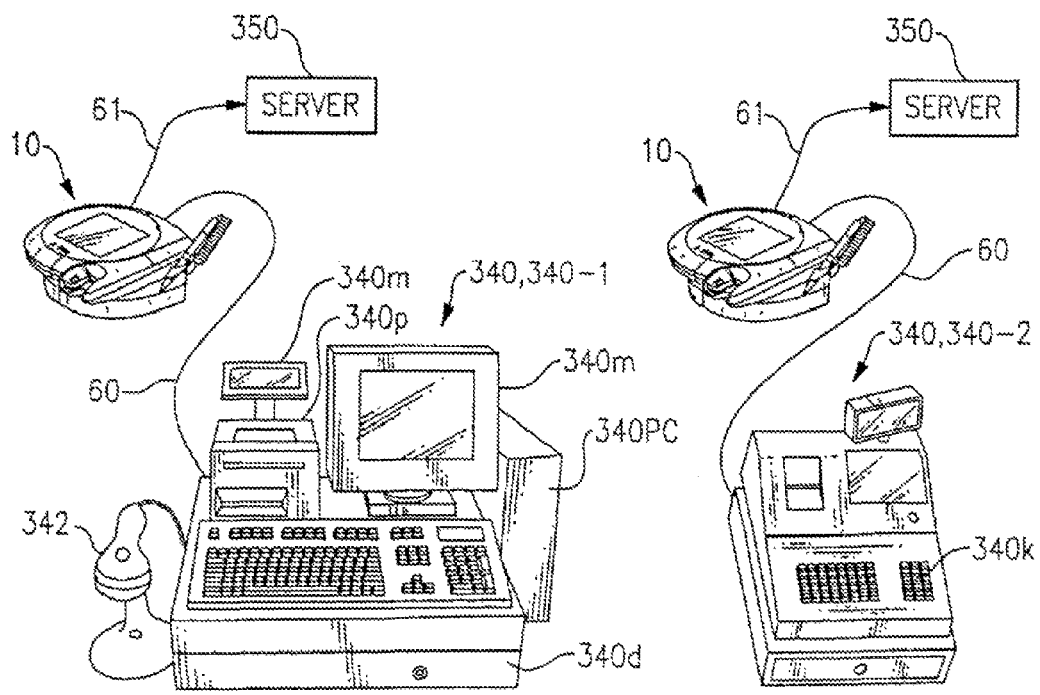
FIGS. 3f-3h illustrate alternative cash registers which may be disposed in communication with a transaction terminal of the invention.
Figure 3E:
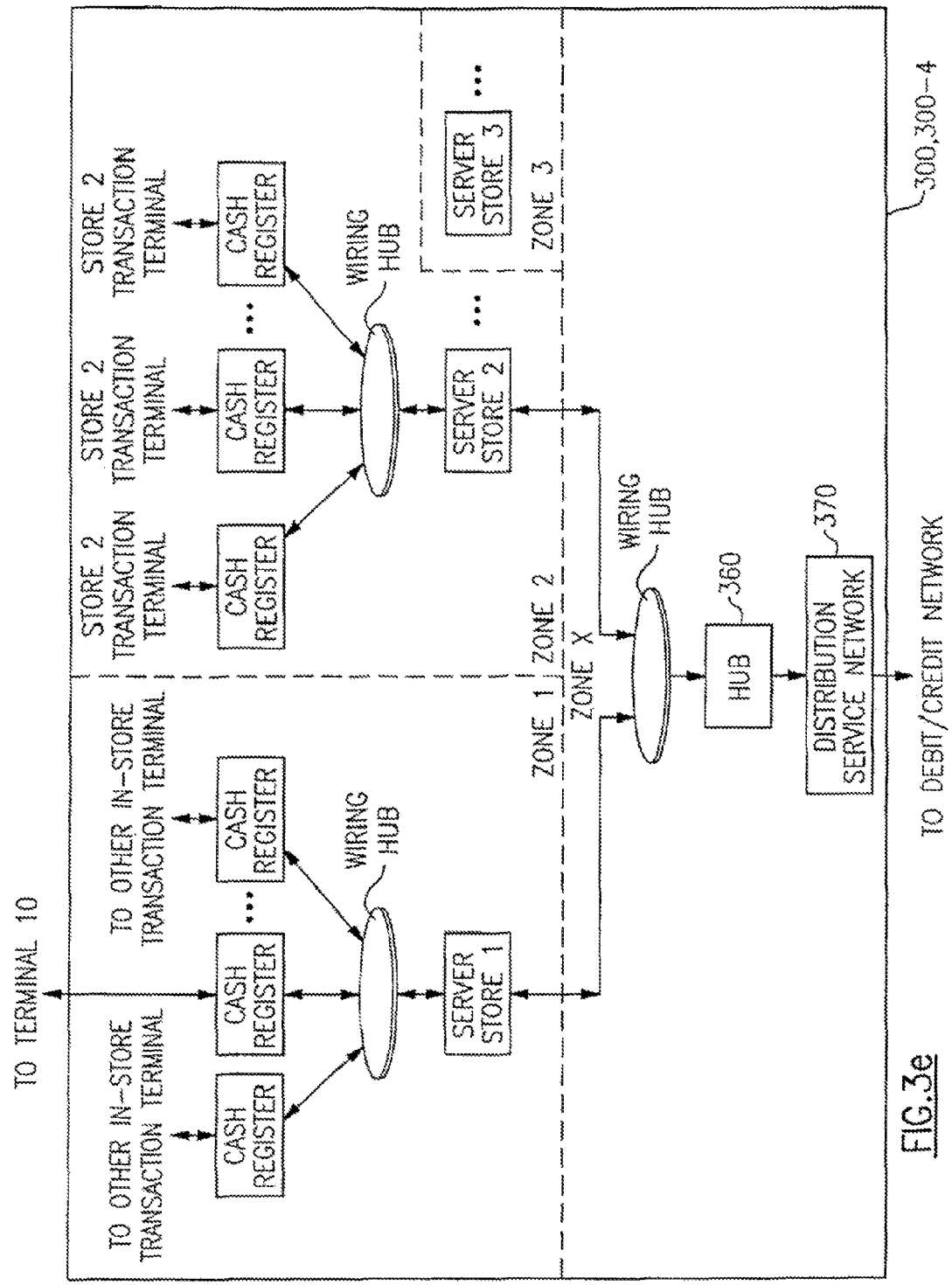

In another embodiment as indicated in FIG. 3c, POS network 300 and 300-2 may comprise a cash register 340. Cash registers are currently available in two popular forms. A PC POS system cash register 340 and 340-1, as shown in FIG. 3d, typically includes a personal computer housed in a standardly known PC housing 340PC and multiple interfacing or associated components including bar code reader 342, keyboard 340K, cash register drawer 340D, printer 340P, and monitors 340M. A dedicated POS Cash register, as shown in FIG. 3g includes the functionality of a PC and typically includes several of the above components (keyboard, monitor, printer, drawer) except that the components are housed in an integrated housing. Cash registers are equipped with communication interfaces e.g. dial-up or cable modem interfaces, USB interfaces, Ethernet interfaces including wireless and non-wireless, which enable communication with external computer systems, including Terminal 10 and POS Network 300. In one embodiment, POS Network 300 comprises a cash register only and cash register 340 is adapted to communicate directly with a debit network 320 or credit card network 322.

Another embodiment of POS network 300 and 300-3 is shown in FIG. 3c. In the embodiment of FIG. 3c transaction terminal communicates with one cash register 340, while cash register 340 is one of several cash registers that is in communication with server 350, in an in-store local area network (LAN). In the embodiment of FIG. 3c in-store server 350 is in communication with debit network 320 and credit card network 322.

In yet another embodiment of POS network described with reference to FIG. 3e, POS Network 300 and 300-4 includes at least one computer system hub 360 which is under the control of a retailer yet located off-site with respect to transaction terminal and other in-store devices such as cash registers or other transaction terminals and servers. Hub 360 may be in communication with, and may be adapted to monitor and control financial data transaction emanating from a plurality of in-store servers. Hub 360 may be controlled by a retailer that operates several stores at several different locations e.g. Store 1, Store 2, and Store 3. Further, there may be more than a layer of hubs. A retailer may operate a local hub which receives transactional data from each of several in-store servers located at several different stores located in a given municipality. Several of these local hubs, in turn, may transmit transactional data to a regional hub. Several regional hubs may transmit transactional data to a centralized national hub. Several national hubs, in theory, can transmit transaction data to a single world-wide hub operated by a retailer having retail stores worldwide. It is seen that hubs and the layering of hubs provide a means for retailers to monitor transactions conducted throughout several retail stores. Hub 360 is often owned and operated by a retailer who owns or operates a retail store in which transaction Terminal 10 is located. However, Hub 360 may also be owned by a third party service provider, and the retail store owner may subscribe to a processing service provided by the third party. Such third-party operated hubs operated in the interest of a retailer shall herein be considered to be operated by a retailer. POS Network 300-4 of FIG. 3e is divided into zones. Zone 1 delineates the hardware components typically located in a first store, zone 2 delineates the network component typically located in a second store, zone 3, refers to components which are typically located at a third store, while zone x refers to components which are typically located off-site with respect to any store.

As indicated in the embodiment of FIG. 3e a POS Network 300 can also be considered to include various computer systems operated by parties other than a retailer or for example, a POS Network can include a Distribution Network 370. Distribution Network 370 refers to the computer systems operated by distribution service providers who receive transactional data from a retailer (e.g. from a computer system, a POS terminal such as terminal 10, a hub, a server, and a cash register) and evaluate the availability of several debit or credit card networks and route the data to one selected debit or credit card networks 320 or 322 based on an established criteria. Some transactions are processed without being routed through distribution networks and others are, normally dependent on the selection made by a retailer.

In a further aspect of POS Network 300, POS Network 300 can be in communication with another computer Network 380, which may be the Internet (World Wide Web). Connecting POS Network 300 to another Network 380 allows POS Network 300 to readily access information from a wide variety of computer databases, which information is pertinent to financial transactions. For example, by way of communication with Network 380, POS Network 380 can access such information as drive, license identification information, consumer credit rating information, consumer criminal record information, sales history information, consumer demographic data, and other consumer information. Aspects of the invention relating to access of information from Network 380 will be discussed in greater detail herein.

Continuing with reference to the transaction cycle flow diagram of FIG. 3a, at STEP 4, POS Network 300 routes transaction data either a debit network 320 or a credit card network 322 depending on the card type (debit or credit). Debit network 320 is a network of computer systems operated by a debit card agency. Credit card network 322, a network of computer systems operated by a credit card supplier, such as Visa or MasterCard or a retailer issued credit card. After a transaction is approved by an Issuing Bank, Network 300 notifies POS Network 300 of such approval.

At STEP 5 debit card or credit card network 320 and 322 transmit the transaction data to a computer system (or a network of computer systems) operated by an Issuing Bank 330. Issuing Bank 330 provides a number of important functions in relation to the transaction processing cycle. Issuing bank (1) makes sure that a customer's account has sufficient funds; (2) charges a customer's account for a transaction; (3) charges a customer's account for any applicable fees in relation to the transaction, and distributes the funds to appropriate parties (e.g. Distribution Network operators); and (4) monitors for card holder fraud, (5) may automatically preliminarily authorize small dollar transactions, and (6) may preliminarily authorize transactions based on risk calculations which cannot be authorized because of technical problems (e.g. Network 322 is down); (7) capture and store a data record of the transaction.

At STEP 6, Issuing Bank 330 debits a customer's account, and may, as part of STEP 6, initiate action to obtain payment of the debt (if credit card transaction from a customer). For example, Issuing Bank 330 may send a bill to a customer's home mailing address notifying a customer of an amount of a debt. As part of STEP 6, Issuing Bank 330 may automatically notify a customer of a debit via email communication to a customer's email address, or may post a notice on the Issuing Bank's website so that the notice is read when a customer opens his account information from the Issuing Bank's website.

At STEP 7, POS Network 300 sends transaction data to a computer system a network of computer systems operated by an Acquiring Bank and Acquiring Bank 332 appropriately credits a retailer's account by the amount of the transaction less any fees. Acquiring Bank (1) credits a retailer's account (2) charges the retailer any applicable fees and distributes these fees to appropriate entities involved in the transaction (e.g. Distribution network operators), (2) monitors for collection fraud, and (4) supplies information and customer service to a retailer, in part through communication with POS Network 300. Typically, STEP 7 is a batch process performed e.g. after business hours, whereas STEPS 1 through 6 described herein are all performed automatically after a transaction is initiated, within seconds of one another (except the nonelectronic mailing step described as part of STEP 6). In some instances STEP 7, is carried out with manual data entry and human observation of financial data records.

Some further aspects of possible transactions involving Terminal 10 can be understood with reference to the following examples, EXAMPLE I and EXAMPLE II, wherein the term "host" in Example I and Example II is used to refer to a computer system or network of computer systems interposed between a cash register and a debit/credit networks 320 and 322 as described above with reference to FIG. 3a, e.g. a "server," or a "hub," or a network comprising a plurality of servers and/or hubs.

EXAMPLE I

Debit Transaction and Authorization

The purchaser may initiate the transaction or be prompted by the POS device. Electronic Benefits Transfer (EBT) using magnetic stripe cards or smart cards is similar to a debit transaction. Rules and exact procedures vary by State. Note: "Off-line debit" processes as if it were a credit card transaction. Ordering of steps:

(A) Associate 312 initiates a new sale and begins scanning items;
(B) Purchaser 310 selects their payment option=debit;
(C) Terminal 10 saves customer selection=debit;
(D) Purchaser 310 inserts their card on the terminal MSR/SCR;
(E) Terminal 10 stores the credit card track data;
(F) Terminal 10 request PIN;
(G) Purchase 310 enters PIN;
(H) Terminal 10 encrypts PIN block and stores the result;
(I) Terminal 10 waits for POS 340 terminal request;
(J) Associate 312 completes the sale;
(K) POS 340 sends sale total to Terminal 10, waits for reply;
(L) Terminal 10 displays total and prompts the purchase for "cash back";
(M) Purchaser 310 responds to cash back prompt, "yes"+ amount or "no"; Terminal 10 requests confirmation and displays new total;

(N) Terminal 10 replies to POS 340 with track data, PIN block and "debit" flag;
(O) POS 340 sends the amount(s), card data, PIN block, terminal ID, etc. to host 300;
(P) Host 300 adds merchant data and forwards to authorization Network 320;
(Q) Network 320 translates PIN block encryption to Zone key (Each network switch and processor translates the incoming PIN block to the encryption algorithm and key of the next zone);
(R) Network 320 examines card Bank ID Number (BIN) and routes to issuing bank;
(S) Issuer 330 checks account balance, account status, and fraud data;
(T) issuer 330 verifies PIN;
(U) Issuer 330 replies "yes" or "no" for authorization or an error code;
(V) Network 320 sends issuer response to retailer host;
(W) Host 300 routes the issuer/network response to a POS terminal 340;
(X) POS 340 notifies associate of issuer response;
(Y) POS 340 sends message to Terminal 10 authorized or declined.
(Z) If authorized, the transaction is complete from the Terminal 10 point of view.
Note: All PIN-based payments are encrypted. Responses are not encrypted or secure.

End of Example I

EXAMPLE II

Credit Transaction and Authorization

The following describes typical credit card transaction flow in U.S. networks for transactions initiated on a connected POS terminal.

The purchaser may initiate the transaction or be prompted by the POS device.

(A) Associate 312 initiates a new sale and begins scanning items;
(B) Purchaser 310 selects their payment option=credit;
(C) Terminal 10 saves customer selection=credit;
(D) Purchaser 310 inserts their card on the terminal MSR/SCR;
(E) Terminal 10 stores the credit card track data, waits for POS terminal request;
(F) Associate 312 completes the sale;
(G) POS 340 sends a message to the Terminal 10="send data";
(H) Terminal 10 replies to POS with track data and "credit" flag;
(I) POS 340 sends transaction amount, card data, terminal ID, etc. to host along with merchant data;
(J) Host 300 adds merchant data and forwards to authorization to network;
(K) Network 320 examines card Bank ID Number (BIN) and routes to issuer;
(L) issuer 330 checks account balance and fraud data;
(M) Issuer 330 replies "yes" or "no" for authorization or an error code;
(M) Network 320 sends issuer response to retailer host;
(N) Host 300 routes the issuer/network response to the POS terminal;
(O) POS 340 notifies associate of issuer response;
(P) POS 340 sends message to Terminal 10, authorized or declined.
(Q) Purchaser 310 signs signature on touch screen 320;
(R) Signature saved at terminal 10 and/or transmitted to POS for further processing (e.g. signature recognition).
(S) If authorized, the transaction is complete from the Terminal 10 point of view.

Note: In the United States, credit transactions are not encrypted. Responses are not encrypted or secure. Credit transactions that are processed in Canada are encrypted and use MACing for data integrity.

End of Example II

Referring to further aspects of the invention, housing 11 of terminal 10 includes a number of important features which will now be described in greater detail. Housing includes a top 11*t*, a bottom 11*b*, a first side 11*s*, a second side 11*s*, a back end 11*rr*, and a front 11*f*. As best seen in FIG. 1*e*, top 11*t* which being substantially flat is angled downward slightly from back 11*rr* housing to front 11*f*. Because touch screen 20 is disposed substantially flush with top 11*t* of housing 11 the angling of top 11*r* enables a user to more readily observe indicia of housing when terminal 10 is disposed on a flat surface, e.g. a counter top. Housing 11 further includes a head 11*h* including housing top 11*t* and a base 11*bs* including bottom 11*b*.

Referring to aspects of bottom of housing 11*b* with reference to FIGS. 1*j* and 1*k*, bottom 11*b* of housing 11 includes at least three and preferably four or five feet 15, typically comprised of rubber adhesively attached material which stabilizes housing 11 on a counter top. The at least three feet 15 define a plane $P_B$ on which housing 11 may rest. Housing 11 may further include detachable riser 11*r* also including at least three and preferably five feet 15-*r*. Detachable riser 11*r* operates to increase the height of transaction terminal 10 where a height increase makes use of terminal 10 easier. As best seen in FIG. 1*e*, head 11*h* of housing 11 extends forwardly from base 11*bs* to define a lip 11L, and mold support section 11*sp* of housing 11 which supports hybrid reader 240 is defined in the lip 11L of housing 11. It is seen that if housing 11 is fixed mounted on an edge of a table top so that lip 11L extends outwardly from the edge, the riser 11*r* may be unnecessary since a user's hand will not encounter substantial interference from counter top when inserting a card 90 into reader 240. However, if transaction terminal 10 is to be mounted or rested away from an edge of a counter top, attachment of riser 11*r* to housing main body 11*mb* will improve the accessibility of reader 240 to a user, and will prevent the table top from substantially interfering with a user's hand when a user inserts a card 90 into insert reader 240. Attachment of riser 11*r* will also benefit access to a reader by a user's hand where terminal base 11*bs* is mounted flush on a vertical wall, beam, or post. Thus, it is seen that attachment of riser 11*r* improves the accessibility of reader 240 under certain mounting or placement conditions while attachment of riser 11*r* reduces the size of terminal 10 under other mounting or placement conditions. The "feet" of terminal as will be referred to herein shall refer to feet 15*r* of integrated housing bottom 11*b* when no riser is attached to housing main body 11*nb*, and to the to feet 15-*r* of riser 11*r* when riser 11*r* is attached to main body 11*mb*. Riser 11*r* may be made detachably attachable to housing main body 11*mb* by way of a pin and key-slot arrangement as shown in FIGS. 1*j* and 1*k*. Riser 11*r* may include headed pins (not shown) which are fitted into hole sections 17*h* of key slots 17 formed on bottom, and the riser 11*r* may be detachably engaged on body 11*mb* by sliding the headed pins into slot section 17*s* of key slots 17. As indicated in the embodiment of FIG. 1*r*, riser 11*r* may also be of a type that is bolted into integral bottom 11b of terminal by driving bolts through bolt holes 23 of riser 11r. Other fasteners for detachably attaching riser 11r to main body 11mb can of course be used, such as clips and adhesives (e.g. double sided adhesive pads).

As seen in FIGS. 1g and 1j, key slots 17 and 17r are useful in detachably mounting terminal 10 in a mounted mode of operation to mounting (e.g. walls, posts, retailer mounting apparatuses, horizontal surfaces) members having pins (not shown) for receiving key slots 17 and 17-b, so that at any time terminal 10 can be detached and used on a horizontal surface such as a countertop in an unmounted mode of operation.

As shown in FIG. 1f risers need not be made of a uniform height. Wedge shaped riser 11r-w, for example, is useful in certain applications. Wedge riser 11r-w may be detachably attached to terminal main body 11mb and then terminal 10 including main body 11mb and wedge riser 11r-w may be mounted to a vertical member such as a wall, a vertical beam, or a post. The mounting method results in plane $P_R$ of reader slot 245, and plane $P_S$ of screen 20 being moved to a position that is closer to the parallel position with respect to the horizontal plane. Many users will find insert reader 240 easier to use if it is oriented in a plane tilted forwardly toward the horizontal plane relative to the vertical plane.

Figure 1T:
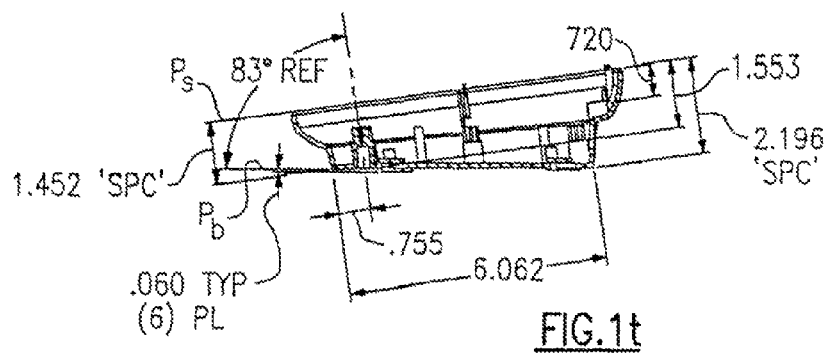
Figure 1U:
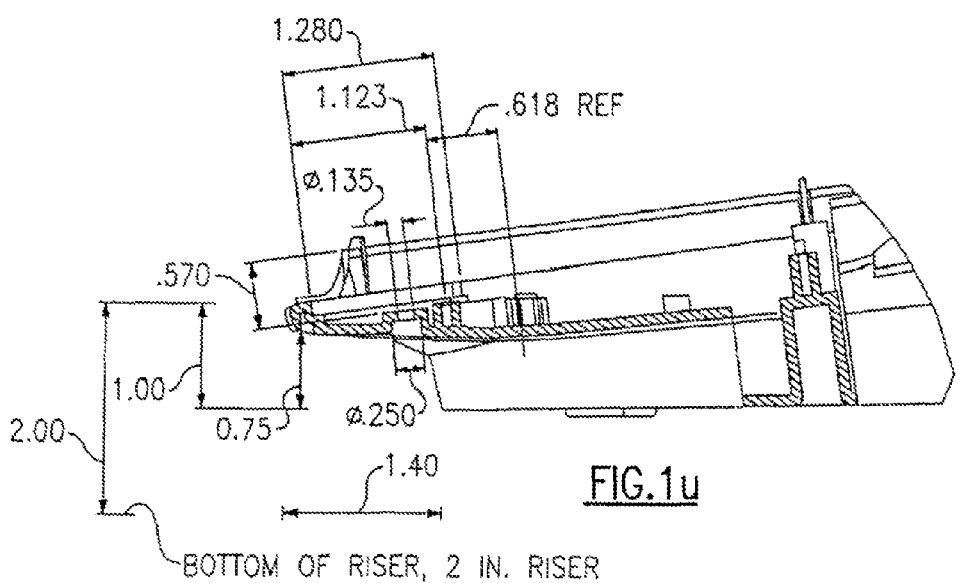

Dimensional information relating to terminal 10 in one exemplary preferred embodiment is summarized in FIGS. 1r, 1s, 1t and 1u wherein dimensional information is given in inches. In an exemplary embodiment as seen in FIG. 1u, feed path slot 245 is positioned about 1 inch off ground level and 2 inches off ground level with riser 11r attached, which in the exemplary embodiment of FIG. 1r includes a height of about 1 inch. The inventors found that with such a height range of slot 245, preferred angles for angling feed slot plane, $P_f$, are between about 2° and 12° with a most preferred angle being about 7°. The inventors found that at angles greater than this range, at the height range of between about 1 and 2 inches, card 90 became difficult to insert into reader 240 though the difficulty can be alleviated by mounting terminal on an edge of a counter or by increasing its height. At angles less than the above range, the benefits of angling, discussed fully herein, though substantial, were determined to be outweighed by the design and assembly costs attendant to such angling. Because the options for angling of plane $P_s$ are not limited by card insertion concerns, it is seen that plane $P_s$ can normally be angled at a steeper angle than plane $P_f$. However with such inconsistent angling, the benefits yielded by essentially coplanar positioning of plane $P_f$ and plane $P_s$ to be described more fully herein would not be yielded.

Figure 7A:
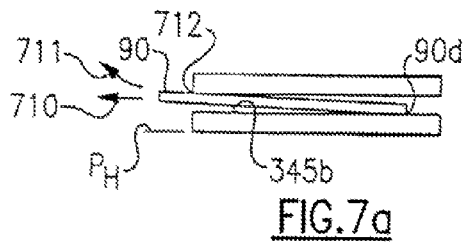
FIGS. 7a-7b are functional diagrams illustrating a brooming effect of the invention.
Figure 7B:
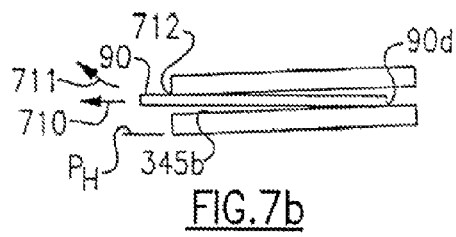

Additional advantages of the positioning of slot 245 according to the invention are described with reference to FIGS. 7a and 7bm wherein 7a is a functional diagram of slot 245 disposed parallel to horizontal plane $P_H$, FIG. 7b is a functional diagram of slot 245 disposed at a slight angle with respect to horizontal plane $P_H$, and arrows 710 and 711 indicate the general direction of card 90 when it is removed from feed slot 245. It is seen by observation of either embodiment, the positioning of slot 245 substantially in horizontal plane $P_H$ yields the possibility of a "fulcrum and brooming effect" as will be described herein A fulcrum and brooming effect is yielded when card 90 is pivoted about a fulcrum 712 defined by slot top edge 712. When card 90 is pivoted about fulcrum 712 distal end 90d of card 90 imparts a force against bottom 345b of slot 3455. Therefore, when card 90 is pulled out card 90 will operate as a broom to sweep debris, moisture, particulate matter out of slot 90.

It is seen further with reference to FIG. 7b that the fulcrum and brooming effect will be enhanced when slot 345 is positioned at a slightly downward angle with respect to the horizontal plane. If terminal 10 is positioned below a user's elbow level, as it often will, user's natural tendency will be to be to pull card up and out as indicated by arrow 711 or possibly, straight out horizontally as indicated by arrow 710. The fulcrum and brooming effect is yielded in both embodiments when a user pulls card out and up as indicated by arrow 711. In addition, it is seen from FIG. 7b that the fulcrum and brooming effect can be yielded with slot 345 disposed at a slight downward angle even when card 90 is pulled straight out in the horizontal direction indicated by arrow 710. Further, disposing slot 345 at an angle increases the force supplied by card end 90d on slot bottom 345b when the fulcrum effect is present to enhance the cleaning action of the card. Still further, the brooming effect cleaning action of card 90 in the embodiment of FIG. 7b is multiplied by gravitational pull forces provided by the angling of feed slot 345.

In a further aspect of transaction terminal 10, it is noted that in the embodiment described with reference to FIG. 4a mag stripe reader 241 is disposed to make contact with a mag stripe of card 90 substantially at a top front edge of slot 345. That is, mag stripe reader 241 is disposed to make contact with a card substantially at a fulcrum 712 of slot 345 as described hereinabove. Such positioning of mag stripe reader 241 increases a contact force between card 90 and mag stripe reader 241, and therefore increases the reliability of card reading. Contact between card 90 and mag stripe reader 241 is improved if slot 345 is angled down slightly with respect to a horizontal plane as shown and described with reference to FIG. 7b. Mag stripe reader 241 in the embodiment of FIG. 4b is a manual insert type mag stripe reader.

An important aspect of the invention is the positioning of insert hybrid slot reader 240 in terminal 10 in relation to other components of terminal 10. Insert reader 240 is disposed in the front of terminal 10 and is accessible from the front of terminal 10. Accordingly, when a card is inserted reader 240, a user's view of screen 240 is not obscured as in the case of the prior art transaction terminal 700 of FIG. 13a having rear disposed, top opening-swipe style reader 710 and a display 720. Reader 240 is also disposed in lip 11L of terminal head 11h which extends forwardly from base 11bs of terminal 10. Therefore, a space s is defined by reader housing 11 as indicated by FIG. 11h for accommodating a person's hand while a card is inserted into reader 240 of terminal 10. Still further insert reader 240 is disposed so that a plane P of teed slot $P_f$ of insert reader 240 is substantially parallel to a plane $P_s$ of screen $P_s$. Accordingly, indicia of screen 20 and indicia of card 90 are easily viewed at the same time from the single vantage point of a user. In the embodiment shown in FIG. 1i it is seen that a plane $P_f$ of feed slot $P_f$ is substantially parallel to plane $P_{b-r}$ of feet 15-r, and plane $P_s$ of screen 20, but that slot 245 is closer to a parallel relationship with touch screen plane $P_s$ than it is to base plane $P_{b-r}$ (i.e. slot plane $P_f$ is essentially parallel to screen plane $P_s$, and slightly angled with respect to feet, or base plane $P_{b-r}$). It will be seen that slot plane $P_f$ could also be disposed in terminal 10 to be essentially parallel with base or feet plane $P_{b-r}$ and slightly angled with respect to screen plane $P_f$, or slightly angled with respect to both base plane $P_{b-r}$ and screen plane $P_s$. It is preferred in the embodiment shown to dispose slot plane $P_f$ essentially parallel with screen plane $P_s$ so as to discourage the build up moisture of dust, debris, and other particulated matter (angling slot downward encourages a percentage of particulate to be forced out of slot 345 by gravity and the fulcrum and grooming effect described herein) and to reduce the number of positions at which specular reflections on either card or screen are observed. Whatever the orientation of slot plane $P_f$ in relation to screen plane P_s and base plane P_{b-r}, P_b it is important, in the embodiment shown in FIGS. 1a-1e that screen plane P_s be slightly angled with respect to base plane P_{b-r}, and P_b. Configuring terminal 10 so that screen plane, P_s, is angled with respect to base plane P_{b-r}, and P_b assures that screen 20 is readily viewed when base 11bs is situated or mounted on a horizontal counter top. Still further, referring to mounting features of insert reader 240 insert reader 240 is disposed proximate right side 11s of terminal 10 in lip 11s so that reader 240 is readily accessible by a user's right hand, allowing a user to readily center his head toward center of screen 20 while inserting card 90 into reader 240. The positioning of insert reader 240 as shown in addition renders reader 240 resistant to degradation resulting from environmental effects. It is seen that in prior art terminal 900 having slide or "swipe" reader 910 opening toward a top of terminal 90, dust and debris, which are prevalent in many retail environments, can readily enter top-opening slot 910 and become trapped therein to negatively impact the functioning of terminal 900 reducing the product life of terminal 900. The orientation of insert reader 240 substantially parallel to the horizontal plane results in a reduction in the volume of moisture (as may be caused by cleaning) dust and debris and other a particulate matter from the retail environment which enter reader 240. As indicated previously, angling slot 245 downward with respect the horizontal plane further reduces particulate and moisture build-up in slot 245 because such angling further reduces the amount of particulate that can enter slot 245 and encourages a percentage of particulate and moisture that does enter slot 245 to be forced out of slot 245 by gravity.

Figure 6A:
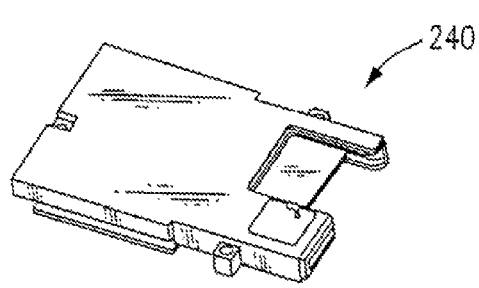
FIGS. 6a-6d are various perspective views or a hybrid reader unit which may be incorporated in a transaction terminal according to the invention.
Figure 6C:
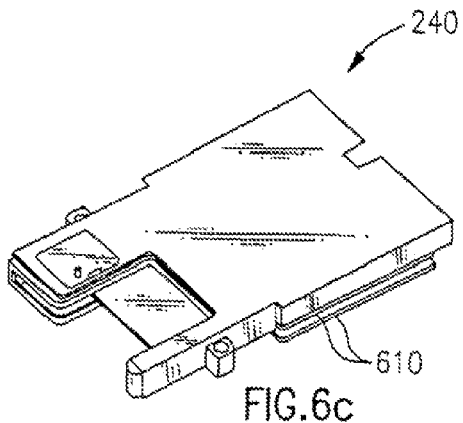
Figure 6D:
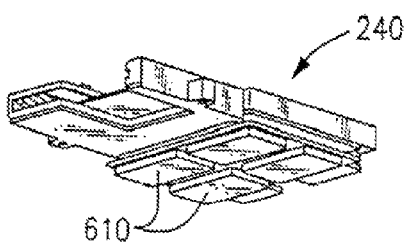
Figure 6B:
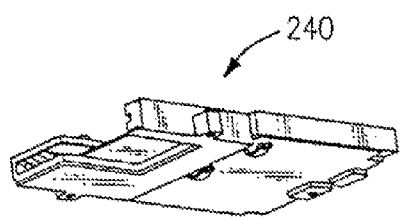
Figure 4D:
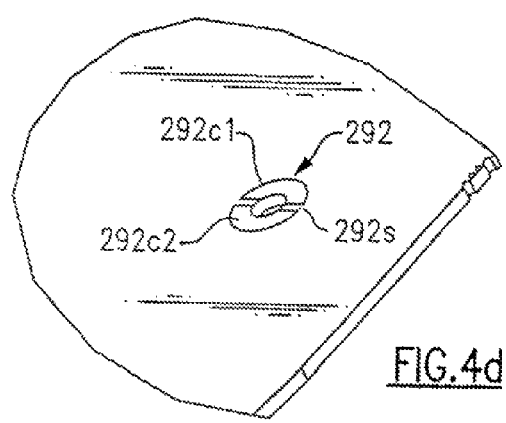
FIG. 4d is a partial exploded perspective view of a main PCB of an exemplary transaction terminal according to the invention.

As best seen FIGS. 6a-6d, hybrid reader unit 240 may comprise a packaged modular form factor. Reader unit 340 may be packaged in a form that does not include SAMS IC chips 610, as indicated by FIGS. 6a and 6b, and may, in the alternative be packaged in a form that does include SAMS chips 610, as best seen in FIGS. 6c and 6d. SAMS (Security Access Module System) is a system in place in some transaction cycles for support mainly of customer loyalty card applications and cash card applications. SAMS IC chips 610 are necessary for support of SAMS. As part of SAMS, SAMS IC chips 610 must, from time to time be removed from devices in which they are installed and replaced. In accordance with the invention as best seen in FIGS. Ij and Ik, transaction terminal housing 11 may include a SAM access door 612 for allowing access to SAM IC chips 610 without requiring disassembly of housing making body 11MB (which all be discussed would trip a security circuit). Housing 11 as seen in FIGS. Ij and Ik may include SAM access door 610 detachably attachable or pivotally attached to housing bottom 11b.

Referring to further advantages provided by housing 11, the enlarged head portion 11h of housing, which extends forwardly rearwardly, leftwardly and rightwardly with respect to a base portion of housing 11, defines an elongated hand grip. A user may grip outwardly protruding head portion 11h during use of transaction terminal 10. Gripping of the grip defined by head portion 11h is especially useful during signature capture, or card reading, wherein it is particularly important to maintain terminal 10 in a stable position. A as shown in FIGS. 1c and 1d a right hander may grip with his left hand, left side 1102 (or another part) of head portion 11h during signature capture, while a left hander may grip with his right hand right side 1104 of head portion 11h during signature capture. It is noted further from top view of FIG. 1c that head portion 11h is rounded on all sides thereof. The rounded form makes terminal 10 more robust on drop testing by spreading out the forces applied to housing 11, and by creating buffers spaced between certain critical components of terminal 10 mounted in an interior of housing 11.

Referring to further aspects of terminal 10 relating to housing 11, terminal 10 further includes stylus holder apparatus 70 which is described in detail with reference to FIGS. 1-3 and 5c-5f. Holder apparatus 70 is a one-piece stylus mounting apparatus, including both a well 72 for holding a stylus 74 and a connection device 73 for connecting a systems cord. By contrast, in prior art transaction terminal 700 shown in FIG. 7 stylus 730 is held in holder 740 while stylus cord 750 is connected to prior art terminal on a connection point 760 away from holder apparatus 740. Providing a one-piece stylus holder apparatus 70 which both includes a holder which holds pen stylus 74 and which includes a proximately disposed connection device 73 for cord 75 greatly is particularly advantageous when one-piece holder apparatus 70 is adapted to be detachable with respect to housing 11. It is seen, if holder e.g. 72 and connection device 73 are provided at different spaced-apart locations on housing 11 as in terminal 900, positioning of holder 72 at a position away from terminal 10 (such as mounting it on a wall, a counter top, a beam, and a cash register) would be disadvantageous because the cord 75 would assume a stretched-out state. If cord 75 is in a stretched out state, entry of a signature by a user is rendered difficult. Providing a holder apparatus 70 which includes both cord connection device 73 and a proximally located pen holder 72 yield a significant advantage if holder apparatus 70 is made non-integral and selectively attachable with respect to housing 11. Where holder apparatus 70 is adapted to be nonintegral and selectively attachable with respect to housing 11 holder apparatus 70 can be moved into a variety of positions (e.g. mounted to a wall, counter top, cash register, etc.) in the general area of terminal 10, and in anyone of those variety of positions, cord 75, connected to connection device 73 remains in an untensioned state when pen stylus 74 is held by holder 72. The detachability of holder apparatus 70 allows apparatus 70 to be moved if there is interference with cord 75 by an object in processing with terminal 10.

Figure 5A:
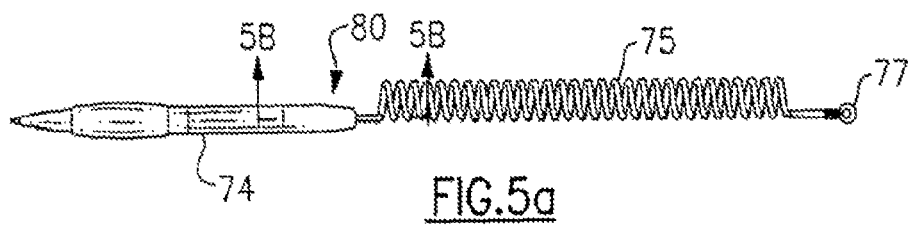
FIG. 5a is a side view of an exemplary stylus and cord according to the invention.
Figure 5B:
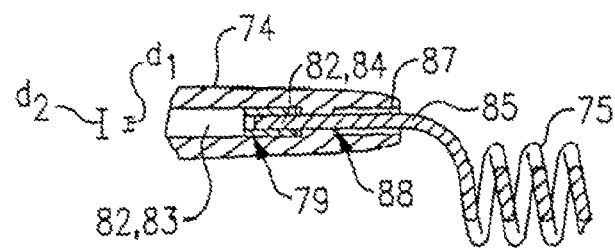
Figure 5C:
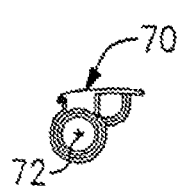
FIGS. 5c, 5d, and 5f are perspective views of a stylus holder assembly according to the invention.
Figure 5D:
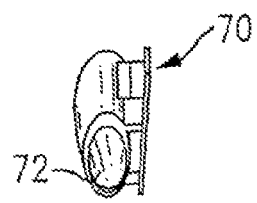
Figure 5E:
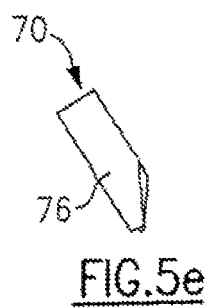
FIG. 5e is a side view of a holder assembly according to the invention.
Figure 5F:
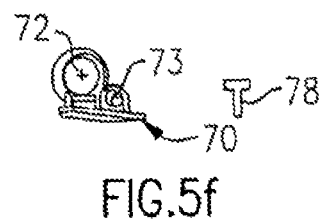

In the present invention, holder apparatus 70 may be made selectively attachable to housing 11 with use of a double-stick adhesive pad (referred to as double stick tape) of one of the many types available from 3M, for example, or with other types of fasteners. In FIG. 5e it is seen that holder apparatus 70 includes broad surface 76 for receiving double-stick tape (not shown). When double-stick tape is applied to holder apparatus 70, holder apparatus 70 may be tape mounted to any one of a variety of positions selectable by a user including positions on housing 11 and away from housing 11 (e.g. wall, cash register, etc). Because cord connector 73 is integral with holder apparatus 70 and proximally located with well 72, cord 75 of stylus 74 will be untensioned when held by holder 72 wherever holder apparatus 70 is mounted. Holder apparatus 70 could also be selectively mounted with e.g. other adhesives or a mechanical fastener such as a screw, bolt, or key slot faster such as fastener 17 as shown in FIG. 1j. Holder apparatus 70 including connection device 73 may include another holder member for holding stylus 74 in place of well-style holder. For example, holder apparatus 70 can include a groove or slot (not shown) which holds a pen stylus by friction forces. Connection device 73 of holder apparatus 70 can take on difference to forms as well. In the embodiment of FIG. 5f connection device 73 is provided by a set screw bore which receives a set-screw 78. Ring eyelet 77 of cord 75 is disposed about set screw 78 and set screw 78 is threaded into threaded bore 73 to secure eyelet 77 against holder apparatus 70. Connection device 73 could also comprise, for just one example, a hole formed on holder apparatus 70 which accommodates cord 75, wherein cord 75 is prevented from slipping out of the hole by means of a knot formed in the cord having a diameter larger than the hole diameter.

Referring to further aspects of stylus 74, a connecting arrangement for connecting stylus-end 79 of cord 75 to cord-end 80 of stylus 74 is described in detail with reference to FIG. 5a. In one embodiment for connecting cord 75 to pen stylus 74, distal end 80 of pen stylus 74 is made to include a stepped bore hole 82 and stylus end 79 of cord 74 is made to include an enlarged cord end. More specifically, stepped bore hole is made to include at least two different diameters, d1 and d2, to define an enlarged bore section 83 and a narrowed bore section 84. Cord 75 is configured complementarily with stepped bore 82 to have a distal end 79 of an enlarged diameter that is greater than the diameter, $d_1$, of the narrowed bore section 84, but less than the diameter, $d_2$, of the enlarged bore section so that enlarged distal end 79 is retained by narrowed bore section 84. Cords major body 85 should have a diameter sufficiently less than narrowed section 84 of stepped bore 82 so as to allow free rotation of cord 75 within narrowed section 84. Configuring cord 75 to have an enlarged section 79 which is accommodated by an enlarged section 83 of bore hole 82 formed in stylus and retained by a narrowed section 84 of the bore hole 82 that has a diameter sufficient to allow free rotation of the cord major body 85 allows cord 75 to rotate freely within pen stylus 74, and thereby prevents against the twisting of "kinking up" of cord 75. Stepped bore hole 82 may further include a third bore section 87 formed outwardly with respect to narrowed bore section 87. Third bore section 87 preferably includes a diameter slightly larger than narrowed bore section 84. It will be seen that third bore section 87 operates to alleviate substantial tension forces and stresses which would be supplied by narrowed bore section 84 on cord 75 at distal end 82 of narrowed bore section 84 in the absence of third section 87. Cord 75 can be configured to have an enlarged cord section 79 by means of e.g. a cap, or a crimped-on metallic member as is shown in FIG. 5b.

In a still further aspect of housing 11, the colors and/or patterns exhibited by the exterior of housing 11 can adapted to aid a user in orienting card 90 in relation to slot 345. As best seen in the top view of FIG. 1c housing top 11t preferable includes stripe 730 which divides housing into a first reader zone 732 and a second nonreader zone 734. Stripe 730 encourages a user to move a card toward reader zone 732 of terminal 10 when moving card 90 in proximity with terminal 10. Further in accordance with the invention, reader zone 732 in one embodiment is preferably manufactured to exhibit a different color than nonreader zone 734 so that reader zone 732 further stands out in relation to nonreader zone 734 to further encourage a user to move a card toward reader zone 732 as opposed to nonreader zone 734 when moving a card toward terminal 10. Zone 732 may made to exhibit a darker color than zone 734.

Importantly, housing 11 when manufactured to exhibit multiple colors should be made to exhibit different colors without substantially weakening the structural support and protection provided by housing 11. Housing 11, which may comprise a polycarbonate ABS blend, can be made to exhibit different colors as between zone 732 and zone 734 without substantial degradation of containment advantages provided by housing 11 by utilization of a two-shot molding process during the manufacture of housing upper section 11up, wherein a first shot of the two-shot molding process defined the color of zone 732 and a second shot of the two part molding process defined the color of zone 734.

In yet another aspect of the invention, housing 11 can be made to exhibit colors or patterns in accordance with the colors and/or patterns for terminal that are desired by the buyer-retailer of terminal 10. The inventors discovered that the most desirable colors and patterns for housing 11 vary greatly between different retailers. Some retailers may desire bright colors for terminal 10 in an effort to attract attention to terminal 10. Other retailers may desire subtle colors for terminal 10 in an effort to reduce psychological stresses which are sometimes associated with the expenditure of personal funds. Still other retailers may desire pattern and colors for terminal 10 that are in accordance with its company trademarks and or advertising campaigns. Other retailers may desire that terminal 10 carry advertising of a third party business which will subsidize at least in part the cost of terminal 10.

Figure 7C:
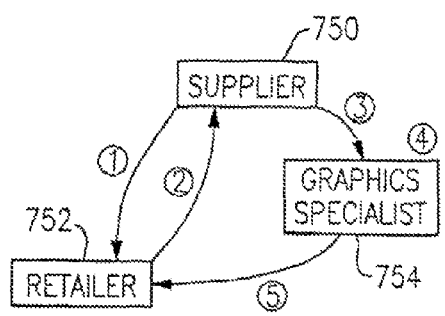
FIG. 7c is a business model diagram illustrating a method for marketing ad supplying a terminal according to the invention.

Accordingly, the inventors have adopted a business method for marketing and supplying terminal 10 that is explained with reference to the business model diagram of FIG. 7c. At step 1, a supplier 750 (who may be a manufacturer of terminal 10) informs a retailer and buyer of terminal 10 that terminal 10 can be made to exhibit customizable patterns and/or colors. At step 1, supplier may advertise to retailer that a limited number or unlimited number of design/color options are available to retailer. Step 1 may be accomplished through information published on an internet website of a supplier 750. At step 2, retailer 752 communicates his pattern and/or color request to supplier 750 such as though a telephone call or by a request entered in the supplier's website. At step 3, a supplier 750 relays the request of the retailer including address information to a graphics forming business entity 754 that specializes in forming graphics on Ruggedized material. The graphics forming business entity may be owned by supplier 750. The graphics forming business entity may be an organization such as Immersion Graphics Corp. who specialize in an immersion graphic formation process. The graphics forming business entity may have a stock supply of terminal 10 or else terminals 10 may be shipped from supplier 750 to entity 754 on an as needed business. At step 4, the graphics forming business entity 754 forms a graphic on a built terminal 10 in accordance with the method which it specializes in. At step 5, graphic forming business entity 754 ships the graphic-carrying terminal 10 to retailer 752 in accordance with the information previously received from supplier 750 regarding the retailer at step 3. Step 5 may be executed by shipping the finished product back to supplier 750 who then routes the product to retailer 752.

Figure 2C:
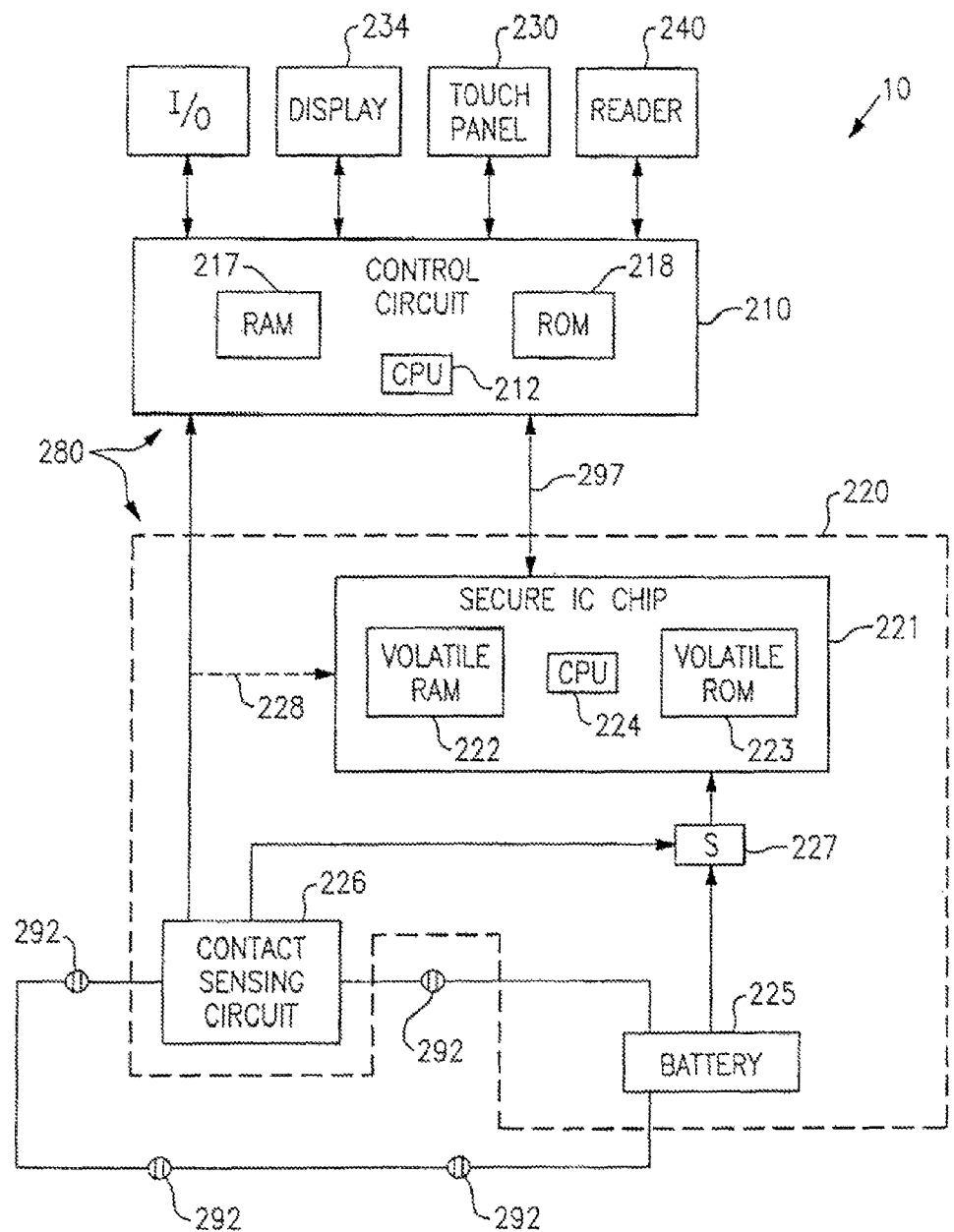

Referring to further aspects of the invention, terminal 10 may be equipped with a variety of security features, which may take on a variety of forms. Referring to a first security feature, housing 11 is adapted so that if an unscrupulous party attempts to break into housing 11 to steal secure information from a storage device of terminal 10, the secure electronically stored information is automatically destroyed. Referring again to electrical block diagram 2a of FIG. 2a, terminal 10 includes a security circuit block 220, an embodiment of which is shown in greater detail in FIG. 2c. As shown in FIG. 2c security circuit block 220 may include in one embodiment, an integrated circuit chip 221 having volatile memory. In the embodiment shown, chip 221 has both a volatile RAM 222, a ROM 223, and includes a CPU 224. Secure chip 221 preferably includes submicron electrical connections rendering it extremely difficult to read information from chip 221 using electrical probes.

Transaction terminal 10 is adapted so that certain information previously designated as secure information is stored in a designated IC chip. Such information may include, for example, encryption keys or other information which may be designated as secure such as card identification numbers, signature information, fingerprint information, and retinal signature information, decoded-out message data decoded from e.g. an optical or RF card reader. In accordance with applicable banking standards (ANSI ISO), PIN information, when entered into a POS device such as transaction terminal 10 should be encrypted at terminal 10, as will be explained. From time-to-time, encryption keys stored in terminal 10 may be updated and replaced with new encryption keys. As will be described in further detail herein, transaction terminal 10 is adapted so that when a user enters PIN information in response to a prompt for PIN information displayed by terminal 10, an encryption algorithm stored in ROM 223 of secure chip 221 is called for execution by IC chip CPU 224 to encrypt the pin information in accordance with an encryption key stored in RAM 222. Encryption keys may be stored in other, mechanically and logically secure, preferably erasable, storage locations.

Encryption keys which terminal 10 may use for PIN encryption typically comprise one of two types: "master session" and DUKPT. Master session keys are used by a symmetrical encryption algorithm. The Data Encryption Standard (DES) is the most common form of master session keys. Under a master-session scheme, terminal 10 has a strong "master" key and a second "session" key. Typical implementations use a weaker session key. The session key is used to encrypt PIN blocks. The master key is used to secure replacement session keys. Terminal and the first computer (host) of POS Network 300 that receives and processes the encrypted PIN block must have the same key. POS Network 300, comprised of many "nodes" or computer systems connected by various communications links, translates the PIN from the key used by the sending device (terminal, host, etc.) to the encryption key and scheme used by the next node in the transmission chain. This repeats until the encrypted PIN block arrives at Issuing Bank 333. Accordingly, "security zones" are created which increase the difficulty of an unscrupulous party compromising the system. It also allows each zone to trust only the devices with which it directly communicates. It also greatly simplifies distribution of the symmetric keys. A given node must only deal with two other nodes rather than every node in the chain. Debit card Issuing Bank 333 does not convert the PIN block to clear data. Issuing Bank 330 submits the encrypted PIN block to a security device commonly called a Network Security Processor (NSP). The NSP verifies the PIN validity and returns a "yes" or "no" response. That response is utilized by issuing bank 330 for verifying the validity of the PIN entered on transaction terminal 10.

Derived Unique Key Per Transaction (DUKPT) keys and encryption scheme is common in POS terminals and PIN pads installed since 1997. The advantage of DUKPT and other similar schemes is that each PIN block encryption uses a new ("unique") key whereas the master session encryption uses the same key for all transactions. In DUKPT PIN systems, over 1 million keys can be generated from an initial base key. The "T" in DUKPT can also mean "terminal" since the terminal ID is used to generate the key set, a given base key can create many unique key sets. DUKPT PIN encryption keys are unique and no key can be computed from any other key. So if a given transaction key is compromised, no other transactions are at risk. The base key is not stored in the terminal. The current method of PIN encryption using DUKPT is similar to the master session encryption method described above. Additional data is used and the key is applied to the PIN block only for the current transaction. The node security zones are substantially identical to those described above with reference to the master session described above. In many systems, the terminal's DUKPT PIN block is translated to a master session PIN block at the first intercept computer system which may be e.g. a POS Network computer system of a retailer, or a computer system third party network provider. The conversion allows the simpler master session to be used for relatively secure host/server point to point communications. The computer centers are physically more secure than distributed transaction terminals. Issuing Bank 330 then processes the authentication according to the master session method described above.

With master session keys, all PIN blocks encrypted with a given key can be decrypted if the key is compromised. Since the master session key is stored in a relatively less secure terminal and distributed in publicly accessible locations, the risk of attack is greater. To reduce the risk, most implementations allow for a periodic key exchange where a host system generates a random key value, encrypts it under a strong exchange key, and sends it through POS Network 300 to the terminal 10. All nodes between the originator and the terminal must be able to handle the key exchange. When the new session key arrives at terminal 10, terminal decrypts the new session key from the master key (which also resides in the terminal) uses the key for subsequent PIN block encryptions. DUKPT keys normally do not have to be replaced unless the entire key set is exhausted or the well protected base key is compromised. Further, a data integrating encryption algorithm (e.g. MAC) may be utilized by terminal 10.

With further reference to a tamper-detection security feature of the invention, the selection of an IC chip including integrated RAM, ROM, and a CPU, wherein encryption keys are stored in volatile RAM 222, an encryption algorithm is stored in ROM 223, and the algorithm is executed by integrated CPU 224, yields an important benefit. If the CPU that executed the encryption algorithm were stored on an IC chip separate from the chip including volatile RAM 222, then an unscrupulous party may attempt to intercept the unencrypted PIN data, with use of probes, while it is being retrieved by the CPU from its storage location in RAM. The arrangement above protects against the above potential security breach. An unscrupulous party could not readily, if at all, contact probes onto circuit tracings of packaged secure IC chip 221 comprising RAM 222 and ROM 223.

As indicated in FIG. 2c, IC chip 221 having volatile RAM 222 and ROM 223 is powered by a battery 225 so that information stored in chip 221 is destroyed by disconnecting battery 225 from chip 221. Battery 225 may be a 1400-1800 ma hour battery. Chip 221 may be provided, for example, by a Hitachi H8S/2318 F-2TAT HD64FZ318 IC chip.

Description of a terminal break-in theft prevention scheme is made in further detail with reference to the block diagrams FIGS. 2c and 2d, FIGS. 4b-4c (showing partial internal perspective views terminal 10, and particularly the interface between housing 11 and main circuit board 290 of terminal 10) and FIG. 4a showing an assembly diagram for terminal 10. Main circuit board 290 carries the majority of electrical circuit components of terminal 10. Main circuit board 290 carries all or essentially all of the electrical components described with reference to FIGS. 2a-2c herein including control circuit 210 and secure chip IC 221.

Referring to the assembly diagram FIG. 4a transaction terminal housing main body 11*mb* includes an upper mold 11*up* which is interfaced to lower mold 11*lw* during the assembly of terminal 10. As best seen in FIG. 4b upper mold 11*up* includes four PCB contacting struts 410 each comprising a bolt-retaining hole 412 for accommodating a bolt 416 or screw. Struts 410 are configured to be of such a length so that struts 410 impart a compression securing force to PCB 290 when upper mold 11*up* and lower mold 11*lw* of transition terminal 10 are connected together. With further reference to FIG. 4*a*, PCB 290 includes four open contact washers 292 integrated into circuit board 290. As best seen in the exploded view of FIG. 4*a* open contact washers 292 each comprise an insulation space 292 so that an electrical connection between first conductive section 292*c*1 of open contact washer 292 and second conductive contact 292*c*2 of washer 292 can be made by applying a conductive bridge between the conductive contacts. PCB 290 and upper mold 11*up* are complementary configured so that each of the open contact washers 292 opposes one of the struts 410. When upper mold 11*up* is applied to lower mold 11*lw* (on which PCB 290 is previously mounted) struts 410 impart pressure on PCB 290 at each of the open contact washers 292. In accordance with the invention, contact security washers 295 are interposed between struts 410 an open contact washers 292 at each of the four contact points at the time that upper mold 11*up* is applied to lower mold 11*lw*. Contact security washers 292 serve as conductive bridges between the conductive sections of each of the open contact washers 292. Accordingly, it can be seen that if any attempt is made to remove any part of upper mold 11*up* from lower mold 11*lw* electrical contact between conductive sections 292*c*1 and 292*c*2 of at least one of the open contact washers 292 will almost certainly be destroyed. To increase the likelihood that electrical contact between conductive sections of at least one of the open contact washers 292 will be destroyed by a tampering attempt, contact washers 295 can be fixedly secured to the distal ends 410*e* of struts 410, e.g. by an adhesive bonding material. Securing washers 292 to struts 410 assures that contact between conductive sections of washers 292 will be destroyed if upper section 11*up* is lifted from lower section 11*lw*. The four open contact washers are disposed at spaced apart positions about circuit board 290. Such positioning increases the likelihood that electrical contact between conductive sections of at least one of the open contact washers will be destroyed by an attempt to remove only a part of upper mold 11*up* from terminal 10. Terminal 10 is preferably adapted to that each of the bolts 416 engages a threaded bore hole when driven into terminal 410. Threaded bore holes engaging bolts 416 may be formed on either of both of circuit board 210 and lower mold 11*lw*.

As is indicated by the electrical schematic diagram of FIG. 2*c* open contact washers 292 may be serially connected in a circuit powered by security circuit battery 225 (e.g. by circuit traces etched on PCB 290) and contact sensing circuit 226 may be disposed in communication with open contact washers 292 to sense whether electrical contact between conductive sections 292*c*1 and 292*c*2 of one of the washers is destroyed. If contact between conductive sections of any one of the open contact washers 292 is destroyed, sensing circuit 226 generates a tamper signal. Terminal 10 may be configured so that if terminal in a powered-down mode a tamper signal generated by sensing circuit 226 operates to disconnect secure IC chip 221 from battery 225 as is indicated by switch 227. Terminal 10 may also be configured so that generation of a tamper signal when terminal is in a powered-up mode (wherein secure IC chip 221 is powered by an external power source) results in an erasure instruction being generated that causes the secure (e.g. encryption information) of chip 221 to be erased. The tamper signal causing the erasure instruction to be generated may be communicated from sensing circuit 226 to e.g. control circuit 210 or to secure chip IC 221 as indicated by dashed-in contact 228.

Security circuit block 220 may also be configured so that IC chip 221 is erased by disconnecting power therefrom when there is a security breach whether terminal 10 is in a powered-down mode or powered-up mode. In the embodiment if FIG. 2*d*, DC supply, described with reference to FIG. 2*b* and security battery 225 are both tied to switch 229, (which may comprise a simple diode circuit) that is responsive to losses in DC supply power 238 so that security battery 225 power chip 221 only when there is a loss of supply power. It is seen that in the circuit of FIG. 2*d*, that the power supply to IC chip 15 is disconnected to erase information in RAM 222 when there is a security breach resulting in one or more contacts 292 opening whether terminal is powered up- or powered-down mode. Circuit 220 in FIG. 2*d* includes an isolation circuit 293. Isolation circuit 293, which may be for example, a TISN74CBTLV3126 FET bus switch, isolates circuit 210 from circuit 221. Isolation circuit 293 prevents power from chip 221 from powering circuit 210 when there is a loss of power in circuit 210 and prevents circuit 210 from powering circuit 221 when there is a loss of power in circuit 221. Isolator 293 may have a data pass mode (allowing data flow) and a data isolation mode (isolating the circuit). The data pass and isolation modes of circuit 293 may be made responsive to the voltages produced by meter 294 which senses the voltage input to chip 221 and meter 296 which senses voltage input to control circuit 210.

Referring to further aspects of the invention and relating to the security feature just described, transaction terminal 10 in the assembly view shown in FIGS. 4*a* and 4*b* may include lower and upper cover panels 21 and 22 some features of which are described in U.S. application Ser. No. 09/750,479 filed Dec. 28, 2000 assigned to the assignee of the present invention and incorporated by reference herein. Lower cover panel 21 including open window 21*w* surrounds overlay 230 and covers electrical lead lines carrying data from overlay 230. Lower cover panel 21 is bonded to upper section 11*up* to create a moisture and dirt-tight seal there between, as well as physically protecting the lead lines. Second upper cover panel 22 is placed over lower panel 21. Lower panel 21 can be considered a port of housing main body 11*mb* when installed therein. Upper panel 22 includes a frame 22*f* and a light transmissive protective window 22*w* mounted in frame 22*f*. When upper panel 22 is disposed on lower panel 21 protective window 22 is in close proximity with overlay 230 so that a signature written on window 22*w* will be recorded by overlay 230. The lower surface of upper panel 22 contains an adhesive whereby the upper cover panel can be easily removed when window 22*w* becomes worn or damaged. A warning message 21*m* is printed on lower panel 21 which is clearly discernible when the upper cover panel is removed, warning the user not to write upon touch screen 20 until the upper panel is replaced.

An alternative embodiment of a panel assembly for terminal 10 is described with reference to FIGS. 4*e*-4*k*. In the embodiment of FIG. 4*e* frame 22*f* of upper cover panel 22 includes raised interior walls 2202 of substantial height so that a top surface 2204 of frame 22*f* is substantially higher than a top surface of protective window 22*w* (or other light transmissive surface on which stylus is in direct contact with during use). The surface (such as window 22*w* or another light transmissive surface overlaying touch screen overlay 230 or touch screen overlay surface itself) which is contacted for inputting data into touch screen 20 is herein referred to as the "receipt surface" of touch screen 20 and can be considered part of touch screen 20 when installed. Raised interior walls 2202 of frame 22*f* should be sized to a height or frame 22*f* should be otherwise configured so that top surface 2204 of frame 22*f* is at least 0.100 inches above a receipt surface of touch screen 20 at least along one edge peripheral to touch screen 20. In a preferred embodiment, raised interior walls 2202 are sized so that surface 2204 of frame is about 0.24 inches above a receipt surface of touch screen 20, at least along one edge defining an interior of the frame 22f. Referring to the cross sectional view A-A of FIG. 4f, surfaces 2204-1 and 2204-2 can be slightly crowned, to enhance comfort, and can have a corner heights at corners 2290 of about 0.18 inches. When installed, frame 22f defines part of "housing" 11. Field data summarizing the results of incorporating frames having raised surfaces of varying heights is summarized hereinbelow.

Configuring frame 22f so that top surface 2204 is higher than a receipt surface of touch screen 20 at least along one edge defining an interior of the frame 22f reduces a likelihood of a person's hand coming in contact with the receipt surface of touch screen 20 when writing a signature onto touch screen using a stylus 74. As is discussed elsewhere herein, contact of a hand with touch screen 20 (particularly a "coarse pitch" touch screen) outside of area 2008 during signature capture can result in unwanted data points being rejected by touch screen 20. Referring now to FIG. 4g it is typical to display on touch screen 20 a signature capture area 2008 toward a front portion of touch screen 20, and to display rearward of signature capture area 2008 a displayed text message such as "PLEASE SIGN HERE" 2210. In one typical specific embodiment, touch screen 20 includes a height (front to back) of about 3.5 inches and a width of about 4.6 inches, a spacing from a front of touch screen 20 to signature capture area 2008 of about 0.5 inches and a spacing from a rear edge of touch screen 20 to area 2008 of about 2.3 inches.

For right-handed users using such a system, there is relatively less (but often significant) likelihood of user's hand contacting touch screen 20 with sufficient force to cause unwanted data entry during the signature capture process. The major portion of a right hander's hand is normally generally located closer to the right hander's body during the writing process. Thus, referring to FIG. 4g, if a right hander's hand contacts transaction terminal 10 during the writing process it is likely to contact top surface 2204 of frame 22f (typically, at surface region 2204-1) not a receipt surface of touch screen 20 particularly if area 2008 is closely spaced apart from frame 22f.

In contrast with right-handers, the major portion of the hand of a left hander is often located farther away from the left hander's body than a writing implement during the writing process. A common left hander writing style known as "overwriting" is depicted in FIG. 4h. The major portion of a left handed overwriter's hand during the writing process is located father away from the left hander's body than is writing implement 74. Further, the left hander commonly contacts a surface being written on with a finger or other portion of his hand rearward of the area where a signature is written. Accordingly, it will be seen that if signature area is defined toward a front of touch screen 20, as depicted in FIG. 4g, there is a strong possibility, if the features now described are not implemented, that the left hander's hand will contact a receipt surface of touch screen 20 rearward of signature area 2008.

The inventors discovered that configuring frame 22f to include a raised surface 2204, that is raised relative to touch screen 20 at least along one edge of touch screen 20 substantially reduces the problem of erroneous data entry into touch screen 20 by a left hander. With rear top surface of frame 22f along surface region 2204-2 of frame raised and a signature area 2208 spaced apart from surface region 2204-2, the left hander, it was found, tends to rest a major portion of her hand on rear surface region 2204-2 rather than on the receipt surface of touch screen 20 during the writing process. Raised surface 2204 substantially reduces erroneous data entry via hand contact during writing by right-handers as well. With raised surface frame 22f, a signature area 2008 can be displayed toward a center of touch screen 20 or otherwise be spaced apart from frame 22f and front raised surface region 2204-1 will discourage a right hander from contacting her hand on touch screen 20 during the writing process. Also, rear raised surface 2204-2 will substantially prevent a right-handed overwriter's hand from contacting touch screen 20 in the case signature capture area 2008 is displayed toward a front of touch screen 20 as is shown in FIG. 4g.

Field data corresponding to one specific example of the invention is present in Table 1. In Table 1 field data is summarized for transaction terminals having slightly crowned surfaces 2204-1 and 2204-2 (crowned at a slight crown angle similar to the example of FIG. 4f) of varying center-heights. In all of the examples of Table 1, a front boundary of signature area 2008 is spaced about 0.5 inches from frame 22f, a rear boundary of signature area 2008 is spaced about 2.3 inches from frame 22f, and touch screen 20 has a height (front to rear) of about 3.5 inches.

TABLE 1

| Center Height of surface 2204-1, 2204-2 | No. of People Surveyed | No. of Left Hand People | No. of Left Hand Failed Signatures | No. of Right Hand People | No. of Right Hand Failed Signature |
|---|---|---|---|---|---|
| 0 | 18 | 8 | 8 | 10 | 8 |
| 0.125 | 18 | 8 | 8 | 10 | 5 |
| 0.187 | 18 | 8 | 4 | 10 | 1 |
| 0.25 | 18 | 8 | 0 | 10 | 0 |

It is seen from Table 1 that configuring frame 22f so that a center height of surface 2204-1 is slightly higher (0.125 in.) than receipt surface of touch screen 20 significantly reduces right hander failures in the specific example provided. Configuring frame 22f so that a center height of surface 2204-2 is more than about 0.150 inches (0.187 in.) higher than a receipt surface of screen 20 significantly reduces left hander failures in the specific example provided.

Additional features of an exemplary panel assembly are now described. Upper panel 22 shown in FIG. 4e having raised surface frame 22f and window 22w, can be made so that window 22w is detachably detachable with frame 22f. Window 22w is of relatively low cost relative to frame 22f. It is advantageous therefore with use of transaction terminal 10 to periodically remove window 22w from frame 22f and replace it so that touch screen 20 remains clearly visible without its proper operation being diminished by a worn window 22w.

In order to make window 22w readily detachably detachable with frame 22f upper panel 22 (including frame 22f and window 22w) should be made detachably attachable with lower panel 21 (see FIG. 4a) which is securely attached to housing 11.

According to the invention and referring now to the assembly views of FIGS. 4e and 4i, adhesive material 2214 can be applied to both top and bottom surfaces of window 22w about an outer periphery thereof. In one embodiment, the adhesive interface between frame 22f and window 22w, is configured to have an adhesive strength greater than the adhesive interface between window 22w and lower panel 21. The adhesive strength of an adhesive interface can be controlled by controlling, alone or in combination any one of (a) characteristics of surfaces defining the interface (b) type or adhesive material, (c) amount of adhesive material. Adhesive material 2212 and 2214 can be provided, for example, by #367 adhesive, available from 3M Corporation.

In the embodiment of FIGS. 4e and 4i, window 22w is attached to frame 22f before the upper panel 22 comprising the combination of frame 22f and window 22w is applied over lower panel 21. The adhesive material 2214 of the bottom surface of window 22w need only apply a stabilizing force sufficient to work against sliding or "floating" of upper panel 22 on lower panel 21. To prevent a build up of adhesive material on lower panel 21, a top surface 2220 of lower panel 21 can be made of a high gloss, substantially nonporous material such as polyester.

In an alternative embodiment, the adhesive interface between window 22w and panel 21 is configured to have a greater adhesive strength than the interface between frame 22f and window 22w. In such an embodiment, window 22w is adhered to lower panel 21 when frame 22f is removed from lower panel 21. It will be appreciated that, in accordance with the invention, the adhesive interface between window 22w and lower panel 21 can be replaced or supplemented with an adhesive or other attachment interface between frame 22f and Raised surface frame 22f as shown in FIGS. 4e-4f and FIGS. 4i-4k, may include ribs 2234 which are defined on frame 22f during a molding process. The presence of ribs 2234 may render frame 22f less than optimally suited for receiving adhesive material 2214 of window 22w. Accordingly, as shown in the assembly views of FIGS. 4j and 4k, the panel assembly of the invention can include underlay 2230 which is interposed between window 22w and frame 22f. Instead of the window being attached directly to the major body of frame 22f, underlay 2230 can be firmly attached to frame 22f, to define enlarged flattened areas for receiving window 22w, and window 22w can be received on underlay 2230. If underlay 2230 is attached to frame 22f via an adhesive, the adhesive strength, (as controlled by e.g. adhesive material selection amount and/or surface conditions) of the adhesive interface between frame 22f and window 22w should be greater than the adhesive strength of the adhesive interface between underlay and window 22w. Underlay 2230 increases the vertical spacing distance between frame 22f and the receipt surface of touch screen 20. Underlay 2230, which may comprise resilient padding material for increased comfort during the writing process, may have a thickness or about 0.003 inches and adhesive attaching underlay 2230 to frame 22f can have a thickness of about 0.002 inches to bring a total vertical spacing distance between horizontal center lines of surface 2204 about a periphery of touch screen 20 and receipt surface of touch screen 20 (in the specific example of FIG. 4h) to about 0.248 inches. Underlay 2230 can be considered part of frame 22f when attached thereto.

In yet another embodiment, the holding function provided by adhesive material 2214 or material 2214 is supplemented or replaced by a mechanical securing element(s) such as fasteners, clips, microhook-and-loop type fasteners, and or friction engagement between mechanical members. For example, window 22w can be attached to frame 22f via spring-loaded chiming mechanisms (a represented by dashed-in element 2235, FIG. 4i) and frame 22f can be stabilized on top of lower panel 21 by sizing frame 22f to be friction fit onto a similarly sized recess formed in housing 11 provided frame 22f is also configured so that it can readily be removed from the recess for replacement of window 22w. Elements 2236 shown in FIGS. 4j and 4k represent microhook and loop fastener strips for securing panel 22 to panel, which may replace or supplement the holding force supplied by adhesive 2214.

In a further aspect of a panel system according to the invention, upper section 11up and panels 21 and 22 are complementarily formed so that bore holes 419h and the bolts or screws 416 which they accommodate are completely hidden from view when panels 21 and 22 are attached to housing 11. In the embodiment of FIG. 4a, it is seen that bolts or screws 416 which operate to secure upper section 11up to lower section 11lw are accommodated by bolt holes and are formed in housing 11 in such a position that both fasteners 416 and holes 410 can be hidden from view by application of panel 21. Further, lower panel 21 is made opaque so that these bolt holes 410h and fasteners 416 are substantially completely hidden from view when lower cover panel 21 is applied to housing 11. Because, holes 410 and fasteners 416 for holding the parts of housing together are hidden from view in the terminal of FIG. 1a, a person cannot determine the assembly features of terminal by inspection. The unscrupulous party considering opening terminal 10 may determine from inspection that terminal 10 is held together by forces supplied other than detachable fastening devices such as bolts or screws and may therefore give up the idea of breaking into terminal 10.

As has been described herein, PIN information should be encrypted whenever it is entered into terminal 10. If PIN information is not encrypted by terminal 10, an unscrupulous party may attempt to electronically siphon the PIN information from a storage device of terminal or in a computer system located upstream from terminal in the transaction cycle depicted in FIG. 3a. Other sensitive information may be designated as secure information which is to be encrypted. For example, credit card number information, debit card number information, personal identification information, signature information, fingerprint information, retinal signature information or other information which may be designated as secure, and received by any one of user interface devices RFID 261, optical reader imaged assembly 263, fingerprint scanner 265, retinal scanner 267, unit 240, etc. may be encrypted by terminal 10. In some countries, credit card numbers are required to be encrypted.

Figure 3H:
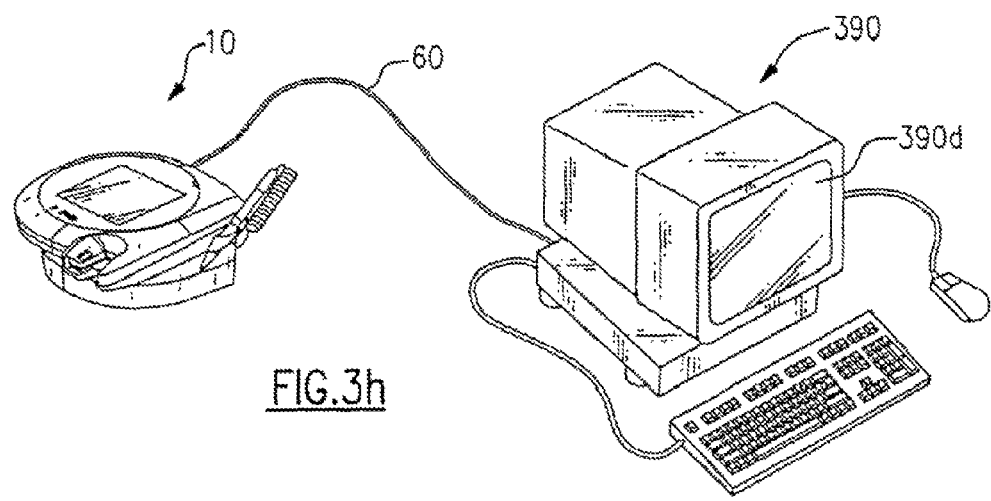

Terminal 10 is preferably adapted so that an operating program of terminal 10 can be customized by a user-programmer, so that the characteristic of, and sequence of, e.g. prompts, other messages, menus displayed by touch screen 20 are configurable by a user-programmer. In accordance with the invention, a programmer-user may develop instructions of an operating program using a program builder system 390 as seen in FIG. 3h (typically provided by a PC as shown) and then transmits the set of instructions built using the builder system 390 to terminal 10 over breakable link 392. However, providing a programmer-user with the capacity to freely define features of a terminal's main operating program raises the possibility that an unscrupulous user-programmer may develop prompts which encourage a customer-user to enter PIN information or other designated secure information without an encryption sequence of instructions properly being executed. The unscrupulous user-programmer may then electronically siphon the unencrypted PIN information or other secure information.

Figure 2E:
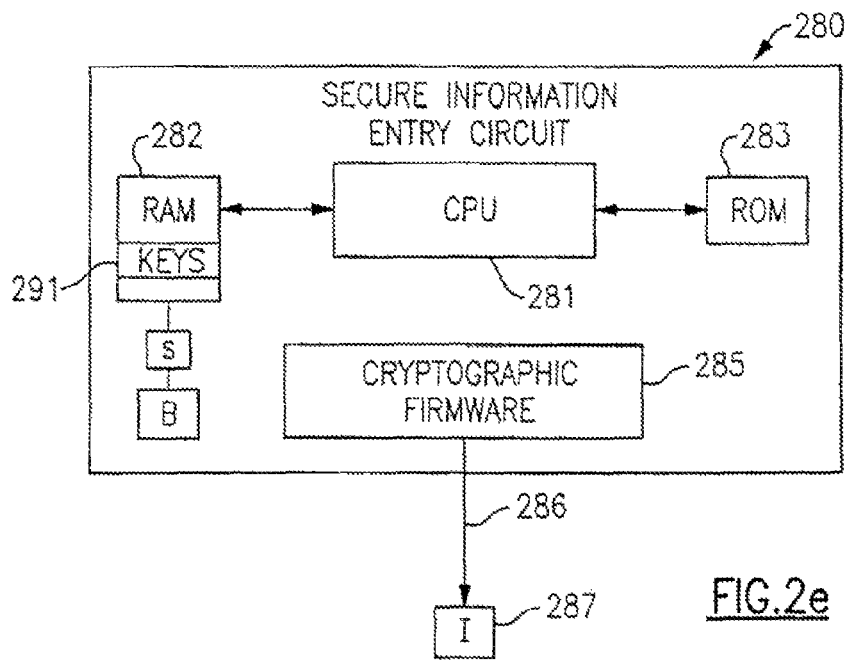
FIG. 2e shows a functional block diagram of a secure information entry circuit of the invention.
Figure 2F:
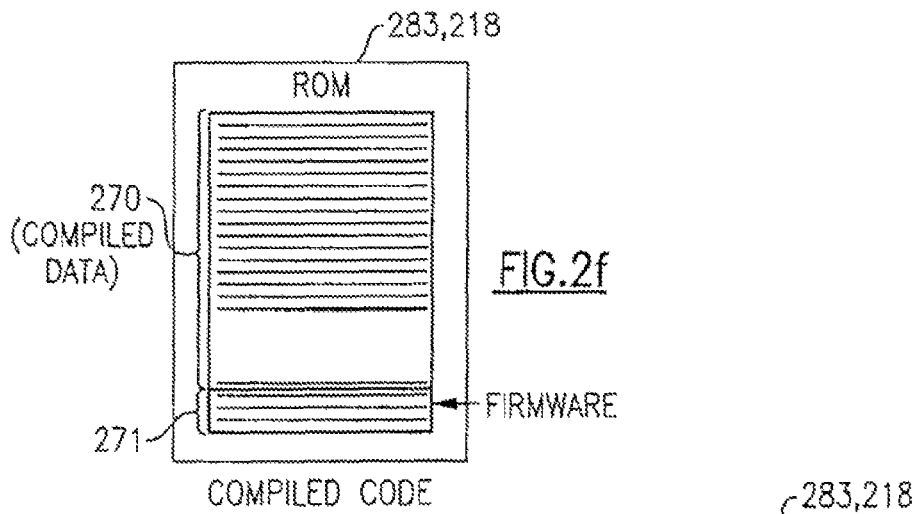
FIGS. 2f and 2g are memory maps illustrating just two of several possible embodiments of firmware.
Figure 2G:
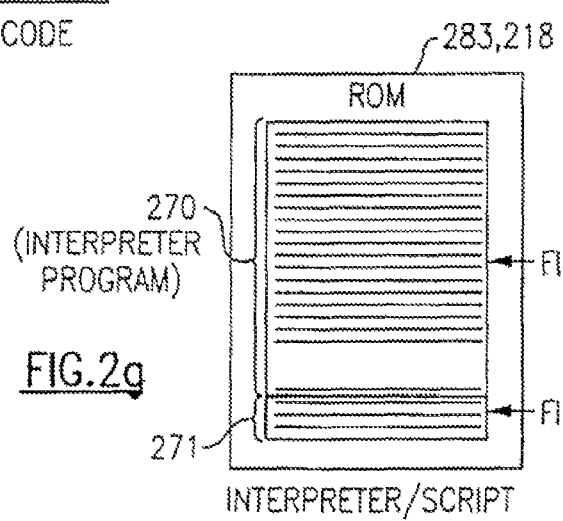
Figure 2H:
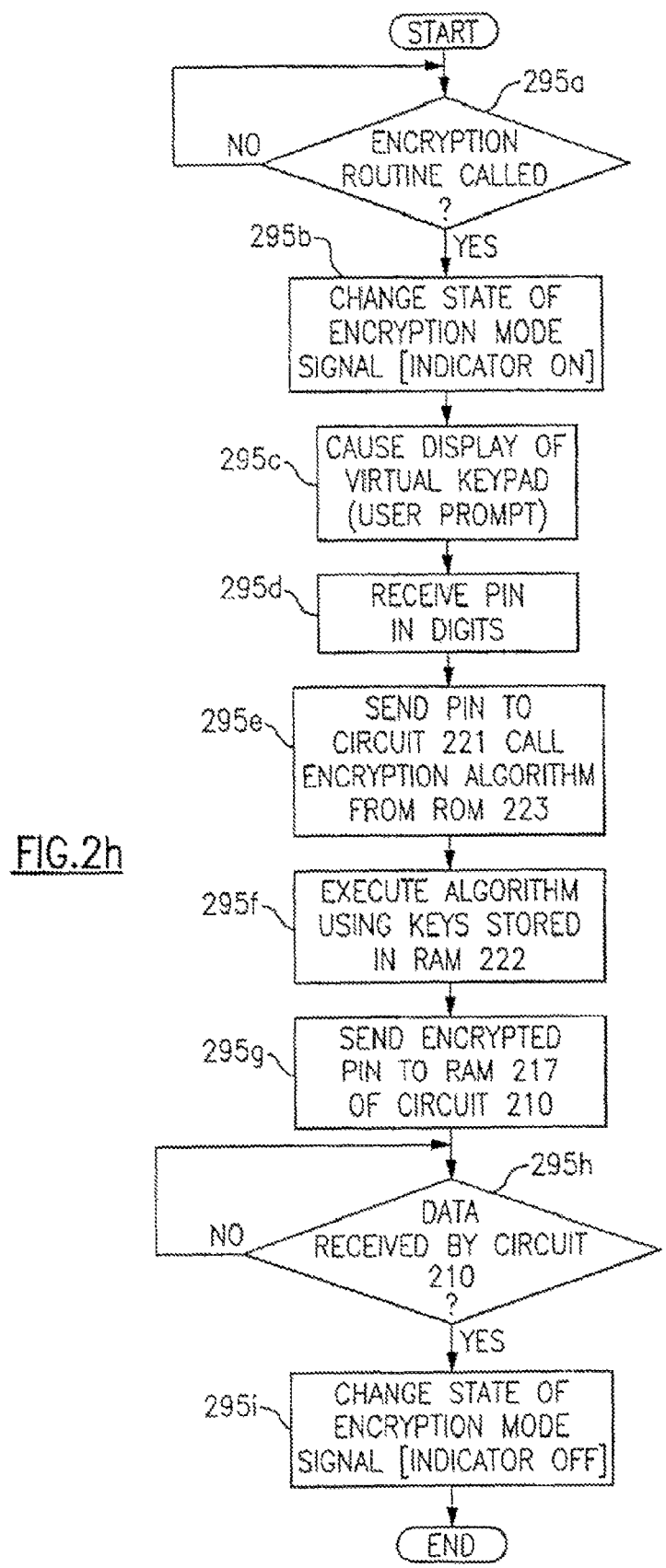
FIG. 2h is a flow diagram explaining operations of a secure information entry circuit.

Accordingly, terminal 10 may be adapted to include a secure information entry feature which is described with reference to FIGS. 2d, 2e and 2f. In accordance with a secure information entry feature of the invention, terminal 10 may include a secure information entry circuit 280 included in the embodiment shown as central processing unit 281, a program ROM 283, working RAM 282 and cryptographic firmware 285 which results in an encryption mode signal carried by line 286 being caused to change state whenever an encryption routine (executed in accordance with program instructions which may be stored in ROM 283) is called, which encryption mode signal can only be generated by calling the encryption routine. Further, in accordance with the secure information entry security feature, an indicator 287 is made responsive to the selective state changing encryption mode signal so that the indicator 287 is active only when the encryption routine is called. Preferably, firmware 285 is established so that indicator 287 is made responsive only to the encryption mode signal caused to change state by the secure information entry circuit so that an unscrupulous party cannot cause indicator 287 to be actuated in a mode other than an encryption mode. Still further, in accordance with the secure information entry security feature, in one embodiment an information message 288 is displayed on or about terminal 10 or visible by a user of terminal 10 which informs a customer-user 310 that the customer-user 10 should enter secure e.g. PIN information only if indicator 287 is active. Information message 288 is preferably substantially permanently affixed to terminal 10 so that an unscrupulous party cannot easily remove or destroy message 288. Information message 288 may be printed or formed as part of the graphics of upper cover panel frame 22f for example, or on a part of lower panel 21 visible with upper panel 22 attached. Information message 288 may also be formed on a normally visible part of housing such as with etching, stamping, immersion graphics, a sticker, etc., preferably in proximity with indicator 287.

Referring to aspects of the secure information entry feature of the invention in further detail, cryptographic firmware 281 of secure information entry circuit 280 can take on a variety of forms. In general, the term "firmware" as used herein shall refer to any hardware or software or combination hardware/software element of a processor based controller which cannot be changed by the ordinary methods and protocols available for use by a user-programmer for changing instruction of a main program of the processor based controller.

As will be discussed in greater detail herein, circuit 280 may comprise components of control circuit 210. Accordingly, it will be seen that the characteristic of cryptographic firmware 285 of secure information entry circuit 280 may vary depending on the software architecture selected for allowing reprogramming of terminal control circuit 210 (changing of instructions of the main program). Alternative software architecture which may be employed for enabling changing of instructions of a main program associated with control circuit 210 with use of a program builder system 390 are described with reference to the memory map diagrams of FIGS. 2e and 2f. In one software architecture for allowing reprogramming of terminal 10, program builder 390 builds, and control circuit 210 executes a compiled program. It is preferable that program builder system 390 allows programming of terminal using high level programming instructions or with use of graphical user interface prompts wherein program instructions are built by system 390 in response to programmer-user inputs that are input into system 390 using a GUI in response to GUI displayed prompts displayed on display 390d. Accordingly, program builder system 390, may build an operating program for terminal 10 in a high level language such as C or C++ which has to be compiled into machine code for execution. A main operating program written in a high level programming language and built in system 390 can be compiled into machine code in system 390 or in control circuit 210, if control circuit 210 is equipped with an operating system. In the case that control circuit 210 executes a compiled program or an assembled program (e.g. written in assembly code at system 390 and than assembled) cryptographic firmware 285 circuit 280 and circuit 210 may take the form as shown in the ROM program memory map as shown in FIG. 2e. As indicated by FIG. 2e several address locations 270 of program ROM 283 may be allocated for storing compiled operating program whereas other address locations 271 may be allocated for storing firmware instructions which are not affected by the compiling and loading of a new operating program on ROM 283. In the example of FIG. 2e firmware 281 refers to code instructions stored on firmware allocated address locations 290 of ROM 283. Cryptographic firmware 285 in the example of FIG. 2e may be e.g. a set of instructions which operate to poll the contents of instructions called for execution by compiled program stored in addresses 270. When a called instruction is an instruction to call an encryption routine, cryptographic firmware 285 results in an encryption mode signal changing state.

In another architecture which may be employed from allowing reprogramming of terminal 10, circuit 210, 280 executes a script program (which is sometimes referred to simply as a script) that is built by a programmer-user at builder system 390 using high level instructions or e.g. by inputting inputs in response GUI displayed programming prompts displayed on display 390d. When circuit 210, 280 is of the type that executes a script program, ROM 283, 218 stores an interpreter program stored in address locations 270. When a script program architecture is selected, script instructions built at builder system 390 do not have to be complied into machine code prior to being executed. Instead, when a script program architecture is selected, interpreter program stored at 270 interprets and executes script instructions built at system 390 and thereby eliminates the need to compile a set of high lever instructions authored at system 390 into machine code prior to their execution by terminal 10. In the example of FIG. 2f "firmware" can be considered to include code instructions of the interpreter program stored at address locations 270 since these instructions cannot be affected by changes in the script code built at builders system 390. In addition, when ROM 283, 218 includes an interpreter program, ROM 283, 218 can include additional firmware at locations 271 of the type described with reference to FIG. 2e (i.e. memory stored instructions impervious to changes in an interpreter program). While firmware is shown in the memory maps of FIGS. 2e and 2f to be included in program ROM 283, 218, it will be understood firmware can also be included in working RAM 282 or in an internal register of CPU 281.

It will be understood that the above archetypal examples are selected merely to highlight that cryptographic firmware 285 can take on a variety of different forms and are not intended to rigorously define the precise characteristic of subject matter that can be considered firmware. In fact many software architectures exhibit characteristics of both of the archetypal architectures described. Still further it will be understood that firmware e.g. 285, while most typically comprising some form of user inaccessible or difficult to access code instructions, need not comprise any code instructions. For example, cryptographic firmware 285 according to the invention can include discreet IC formed electrical circuit components tied to an appropriate address bus location e.g. a key storing address 291 of RAM 282 or ROM 283 called during execution of an encryption routine of the invention which circuit components are operative to change the state of an encryption mode signal when such an address is selected.

As has been indicated herein and again by FIG. 2d encryption keys utilized by an encryption routine are preferably stored in battery powered volatile RAM 282 which can be erased either by an instruction or by disconnecting a battery B supplying power thereto. Accordingly, as alluded to previously in one specific example of secure information entering circuit 280, circuit 280 may include elements of both control circuit 210 and security block 220, as is indicated by reference numeral 280 of FIGS. 2c and 2d.

Additional features of the invention will be understood with reference to one specific example of the invention. A flow diagram explaining operations of secure information entry circuit 280 as may occur when executing an encryption routine utilizing the two CPU architecture of FIGS. 2c and 2d is described in detail with reference to the flow diagram of FIG. 2h. At block 295a CPU 212 executing instructions stored in ROM 218 of circuit 210 determines if an encryption routine has been called, e.g. by selection of a menu option of a user or an insert and reading of a card by a user. If an encryption routine is called, cryptographic firmware 285 at block 295b changes the state of an encryption mode signal carried by line 286 from a first state to a second state to turn indicator ON. At block 295c CPU 212 causes virtual keypad to be displayed on touch screen 20. At block 295d CPU 212 captures the entered keystrokes and at block 295e CPU 212 sends the PIN information to circuit 221, and calls for the encryption algorithm stored in ROM 223 of chip 221 to be executed. At block 295f, CPU 224 of chip 221 executes this encryption algorithm using encryption keys stored in RAM 222, and at block 295g CPU 224 sends encrypted PIN information to RAM 217 of circuit 210. As indicated by block 295h, CPU 212 has been polling line 297 for received data. When data is received by circuit 210 CPU 212 changes the state of the encryption mode signal to its original state. It is seen that the above example is applicable to any other application as described herein, wherein encryption may be useful. For adapting the method of FIG. 2h for another application involving encryption of the PIN pad user prompt setup (block 295c) may be substituted for by another prompt message (a text message "Insert Card," "Place Finger on Recess," etc.).

Referring to further aspects of indicator 287 a secure information entry feature of the invention, indicator 287 may take on several forms. In the example of FIGS. 1a, 1f, and 4a indicator 287 is provided by an LED 287L mounted on main circuit board 290 in combination with a light pipe 287p having a distal end 287pd visible at top 11a of terminal 10 proximate touch screen 20. In one example, the changing of the encryption mode signal from a first state to a second state changes a light source indicator from an OFF state to an ON state. However, terminal 10 could be configured so that the changing of the state of the encryption mode signal from a first state to a second state could also change the state of light source indicator from an ON state to an OFF state. When indicator 287 is a light source, the light source may be a light source other than an LED, such as a filament used light source. Indicator 287 can be provided by a changing of the control of a backlight 236 of display 234. Further, a change in the state of the encryption mode signal need not change the state of a light source indicator from an OFF state to an ON state. Terminal 10 could be adapted so that a change in the state of the secure mode signal increases the intensity of light from a first ON state to a higher intensity second state. In addition, more than one light source can be used. Still further, indicator 287 if a light source need not be located at terminal 10. A light source indicator could comprise overhead or other visible lights proximate terminal 10 for example.

Importantly, indicator 287 need not comprise a light source. Indicator 287 could comprise an acoustic output device in terminal 10 or away from terminal 10. Indicator 287 could also be a graphical icon or message displayed on screen 20 or on a display e.g. display 340 spaced apart from terminal 10. The state changing encryption mode signal (which may be encrypted by terminal 10) can be transmitted to any computer system of POS network 300, shown in FIG. 3a, and any computer system of POS network may control indicator 287. Further, hub 360 may include a program which monitors encryption mode signal data from each of several terminals 10, to maintain a record on PIN captures, and report any anomalous events (e.g., encryption mode signal state changes not corresponding to PINs captures).

It will be understood that secure information entry circuit 280 and/or indicator 287 can be incorporated in many different apparatuses responsive to an integrated or nonintegrated user interface other than in terminal 10. In FIG. 7d indicator 287 is shown as being incorporated in a gas dispenser 770 having a card reader 910 and a touch screen 20. In FIG. 7f indicator 287 is shown as being incorporated in a card reading Kiosk 774 which may an Automatic Teller Machine or other self service transaction apparatus. In FIG. 7e indicator 287 is shown as being incorporated in an automatic parking meter 772 having a card reader 910. In FIG. 7g indicator 287 is shown as being incorporated in a personal computer 776. Indicator 287 in the embodiment of FIG. 7g is embodied by a computer generated icon 287i which could also be a text message, a plurality of light sources 287L, and an acoustic output device 287a, which may output a voice recording. Personal computer 776 in the embodiment of FIG. 7g is shown as being linked to an on-line banking website operated in the interest of a bank such as bank 330 or bank 332. It would be useful to incorporate indicator 287 in or about any apparatus which may be adapted to receive secure information, particularly where the apparatus is of the type which may be unscrupulously custom programmed to display prompts encouraging users to enter secure information without an encryption routine properly being actuated, e.g. a PDA, PDT, optical reader, a stand-alone card reader attachable via a connector such as a PCMCIA connector to another apparatus, etc. Apparatuses as showing FIGS. 7d-7f are increasingly being made in forms allowing custom programming.

Secure information entry circuit 280 can be incorporated in full in any of the apparatuses described with reference to FIGS. 7d-7g. Secure information entry circuit 280 can also be disposed in an apparatus not integrated with the apparatus incorporating or having an associated indicator 287, or else can be spread out over several apparatuses. FIG. 7H illustrates an example of the invention in which secure information entry circuit 280 is not incorporated in the same apparatus incorporating indicator 287. In the example of FIG. 7H, secure information entry circuit 280 including cryptographic firmware 285 is disposed in host 780 linked to internet or other network 380. Host 780 can be considered part of internet or other network 380 when linked thereto. Host 780 may store for example an interact banking website as indicated in FIG. 7g which prompts for PINs from on-line banking customers, or a program that monitors data inputs into several apparatuses. Host 780 may be linked to user interface device 775 directly as indicated by link 781, via a standard internet/network link as indicated by links 782 via a POS network as indicated by links 783, or another link. In addition to or instead of being incorporated in host 780, secure information entry circuit 280 including cryptographic firmware 285 may be incorporated in internet or other network 380, in POS network 300 or in user interface device 775 as indicated by dashed in elements 280 of FIG. 7h. It will be understood that secure information entry circuit 280 could also be incorporated in a computer system of another network not expressly depicted in FIG. 7H. Host 280 could also be considered to represent a host computer system of any one of issuing bank 330 acquiring bank 332, debit network 320, credit network 330 as shown in FIG. 3a, for example. As indicated in FIG.

7h, interface 775 depicted in FIG. 7h can be any one of the interface apparatuses mentioned herein, e.g. a gasoline dispenser 770, a Kiosk 774, a parking meter, a PC 776, a transaction terminal 10, a PDA, a PDT.

Referring to further aspects of information message 288, it will be understood that the attributes of information message 288 will change depending on what secure information is being captured by terminal 10 and the characteristics of indicator 287. In the example of FIG. 1a wherein indicator 287 comprises an LED and the secure information is PIN information, message information may be printed matter formed on housing stating "DO NOT ENTER PIN INFORMATION UNLESS LIGHT IS ON". If the secure information to be encrypted is a credit card number, and indicator is an acoustic device, then information message 288 may be printed matter which states "DO NOT INSERT CARD UNLESS TONE IS SOUNDED". In addition to or instead of being comprised of printed matter message information 288 may be electronically generated text information displayed by screen 20, permanently generated by firmware of terminal or caused by terminal firmware to be displayed by previous action of a user. Also, information message 288 need not be located on terminal 10. Information message 288 may be printed matter or electronically generated message data at a location proximate terminal, such as on a sign proximate terminal 10. Information message 288 may also include printed matter included in product literature supplied by a supplier of terminal, and may include electronically displayed messages which may be accessed by accessing a website of a supplier of terminal.

According to its major aspects and broadly stated the invention is a multifunctional transaction terminal for use in various transactions such as transactions involving credit cards, debit cards, and customer loyalty cards.

A transaction terminal includes a housing, a touch screen, a card reader, an imaging module, and a decode circuit coupled to the imaging module. The imaging module in one embodiment is disposed in the housing so that an imaging axis extends rearward of the housing. In a typical use of the terminal a store clerk can easily move objects into a field of view of the terminal. The transaction terminal can be coupled to a POS network which remotely sends a trigger signal actuating the imaging module when an age-proof-requirement product is being purchased.

A transaction terminal includes a housing, a touch screen, a card reader, an imaging module, and a decode circuit coupled to the imaging module. The imaging module in one embodiment is disposed in the housing so that an imaging axis extends rearward of the housing. In a typical use of the terminal a store clerk can easily move objects into a field of view of the terminal. The transaction terminal can be coupled to a POS network which remotely sends a trigger signal actuating the imaging module when an age-proof-require product is being purchased.

There is set forth herein:

A1. A transaction terminal comprising: a housing having a front, a top, and a rear; a card reader; a touch screen disposed on said top of said housing intermediate of said front and said rear; a rear imaging module assembly including a rear imaging module and a capture and decode circuit, said rear imaging module being disposed in said housing and having an imaging axis extending rearward from said housing; and a control circuit in communication with said card reader, said touch screen, and said rear imaging module.

A2. The transaction terminal of A1, wherein said terminal includes a manual trigger button disposed on said housing rearward of said touch screen, wherein said transaction terminal is configured so that said rear imaging module assembly commences image capturing and decoding when said manual trigger button is actuated.

A3. The transaction terminal of A1, wherein said transaction terminal is configured so that said rear imaging module automatically commences decoding when an object determined by said transaction terminal to include decodable indicia is disposed in a field of view of said rear imaging module.

A4. The transaction terminal of A1, wherein said transaction terminal is configured so that said rear imaging module assembly automatically commences image capturing and decoding when said transaction terminal receives a remotely generated trigger signal from a remote, nonintegrated device.

A5. The transaction terminal of A1, wherein said capture and decode circuit of said rear imaging module assembly is incorporated in said control circuit.

A6. The transaction terminal of A1, wherein said transaction terminal further includes a front imaging module assembly including a front imaging module and a capture and decode circuit, said front imaging module being disposed in said housing and having a front imaging axis extending forwardly from said transaction terminal.

A7. The transaction terminal of A6, wherein said transaction terminal further includes a manual trigger button disposed on said housing forward of said touch screen, wherein said transaction terminal is configured so that said front imaging module assembly commences image capturing and decoding when said manual trigger button is actuated.

A8. The transaction terminal of A6, wherein said capture and decode circuit of said front imaging module assembly is incorporated in said control circuit.

B1. A point-of-sale transaction system comprising: a cash register; a transaction terminal spaced apart from said cash register, said transaction terminal including: a card reader; a terminal housing; and at least one light source disposed in said terminal housing in such configuration that said at least one light source projects visible light to an exterior of said terminal housing when actuated, wherein said transaction system is configured so that when said cash register receives a product code corresponding to an age-proof-required product, said cash register sends a signal to said transaction terminal, and wherein said transaction terminal is configured so that when said transaction terminal receives said signal said transaction terminal actuates said at least one light source to project visible light to an exterior of said transaction terminal.

B2. The system of claim B1, wherein said at least one light source is a bank of LEDs.

B3. The system of claim B1, wherein said transaction terminal includes an imaging module having a bank of LEDs, and wherein said at least one light source is provided by said bank of LEDs.

B4. The system of claim B1, wherein said transaction terminal includes an imaging module assembly including an imaging module and a decode circuit, and wherein said transaction terminal is configured so that when said transaction terminal receives said signal, said transaction terminal actuates said imaging module assembly so that said imaging module assembly automatically commences decoding when said cash register receives a product code corresponding to an age-proof-required product.

B5. The system of claim B4, wherein said imaging module is disposed in said terminal hosing son that an imaging axis of imaging module extends rearward of said terminal housing.

B6. The system of claim B1, wherein said cash register includes a LUT correlating product codes with flag indicators indicating products that are age-proof required products.

C1. A point-of-sale transaction system comprising: a cash register; a transaction terminal spaced apart from said cash register, said transaction terminal including: a card reader; a terminal housing; and an imaging module assembly including an imaging module and a capture and decode circuit, said imaging module, being disposed in said terminal housing, wherein said transaction system is configured so that when said cash register receives a product code corresponding to an age-proof-required product, said cash register sends a signal to said transaction terminal, and wherein said transaction terminal is configured so that when said transaction terminal receives said signal, said transaction terminal actuates said imaging module assembly so that said imaging module assembly automatically commences decoding when said cash register receives a product code corresponding to an age-proof-required product.

C2. The system of claim C1, wherein said imaging module includes a bank of LEDS emitting visible light, wherein said imaging module is disposed in said housing so that visible light from said bank of LEDs is projected to an exterior of said terminal when said bank of LEDs is actuated, and wherein said imaging module assembly is configured so that said bank of LEDs is actuated when said assembly decodes image data, so that visible light is projected from said terminal when said cash register receives a product code corresponding to an age proof required product.

C3. The system of claim C1, wherein said imaging module includes an imaging axis and is disposed in said terminal housing so that said imaging axis extends rearward from said housing.

C4. The system of claim C1, wherein said imaging module includes an imaging axis and is disposed in said terminal housing so that said imaging axis extends upward from said housing.

C5. The system of claim C1, wherein said imaging module includes an imaging axis and is disposed in said terminal housing so that said imaging axis extends downward from said housing.

C6. The system of claim C1, further including a bar code reader in communication with said cash register, and wherein said product code is derived by decoding a bar code on a product using said bar code reader.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A terminal for use in capture of data, the terminal comprising:
   a housing having top, a first end, a second end, and a bottom;
   a display having an associated touch panel disposed at said top of said housing, the display extending in a first plane;
   a first color imaging assembly disposed in the housing for use in capture of images corresponding to objects disposed external to the housing, the first color imaging assembly having a color image sensor, the first color imaging assembly having an associated lens assembly, the first color imaging assembly having a first imaging axis, wherein the terminal is operative for storing of frames of image data captured with use of the first color imaging assembly;
   a second color imaging assembly disposed in the housing for use in capture of images corresponding to objects disposed opposite the top of the housing, the second color imaging assembly having a color image sensor, the second color imaging assembly having an associated lens assembly, the second color imaging assembly having a second imaging axis extending in a direction generally perpendicular to the first plane, wherein the terminal is operative for display of a displayed manual trigger button on the display, the displayed manual trigger button for actuation of the second color imaging assembly;
   wherein the terminal includes a radio communication interface for providing wireless communication.

2. The terminal of claim 1, wherein the terminal is operative for display of a virtual keypad on the display.

3. The terminal of claim 1, wherein the second imaging axis extends along a line that intersects the housing at a position between the display and the second end.

4. The terminal of claim 1, wherein the second imaging axis extends along a line that intersects the housing at a position between the display and the second end and centered with respect to the display.

5. The terminal of claim 1, wherein the first imaging axis extends along a first line, wherein the second imaging axis extends along a second line, wherein the second line is generally parallel to the first line.

6. The terminal of claim 1, wherein the associated lens assembly of the second color imaging assembly is a variable focus lens assembly for use in changing a best focus distance of the second color imaging assembly.

7. The terminal of claim 1, wherein the terminal includes first and second radio communication interfaces, each of the first and second radio communication interfaces for providing wireless communication.

8. The terminal of claim 1, wherein the terminal is operative to attempt to decode a decodable indicia utilizing a frame of image data captured with use of the second color imaging assembly.

9. The terminal of claim 1, wherein the terminal is operative in an operating mode in which the terminal stores a frame of image data captured with use of the second color imaging assembly.

10. The terminal of claim 1, wherein the terminal includes a visible indicator and wherein the terminal is operative in an operating mode in which the terminal, (a) captures a frame of image data utilizing the second color imaging assembly; (b) responsively to the capture function (a) transmits data to an external computer for processing; (c) receives a signal from the external computer responsively to a result of the processing by the external computer and (d) responsively to the receipt of the signal activates the visible indicator.

11. The terminal of claim 1, wherein the terminal is operative in a fixed position mode in which the terminal is detachably attached to an apparatus external to the terminal and wherein the terminal further operates in a mode in which the terminal is not attached to an apparatus external to the terminal.

12. The terminal of claim 1, wherein the first color imaging assembly includes a light source.

13. The terminal of claim 1, wherein the terminal comprises a card reader disposed at the first end of the housing, the card reader being operative for reading of cards selected from the group consisting of credit cards, debit cards, and customer loyalty cards.

14. A method for capture of data, the method comprising:

providing a terminal including a housing having top, a first end, a second end, and a bottom; a display having an associated touch panel disposed at said top of said housing, the display extending in a first plane, a first color imaging assembly disposed in the housing for use in capture of images corresponding to objects disposed external to the housing, the first color imaging assembly having a color image sensor, the first color imaging assembly having a first imaging axis extending along a first line, wherein the terminal is operative for storing of frames of image data captured with use of the first color imaging assembly, a second color imaging assembly disposed in the housing for use in capture of images corresponding to objects disposed external to the housing, the second color imaging assembly having a color image sensor, the second color imaging assembly having a second imaging axis extending along a second line, the second line being generally in parallel with the first line, wherein the terminal is operative for storing of frames of image data captured with use of the second color imaging assembly, and a displayed actuator displayed on the display for actuating the first color imaging assembly, wherein the terminal is operative so that when the first color imaging assembly is actuated to capture an image of an object disposed at a location in a first direction relative to the housing, the second color imaging assembly is oriented for capture of an image of an object at a location in a second direction relative to the housing that is opposite the first direction; and actuating the displayed actuator to capture an image of a face of a person performing the actuating, the second color imaging assembly at the time of the actuating being oriented for capture of images corresponding to an object disposed at a location in a direction relative to the housing opposite the direction relative to the housing of the person performing the actuating.

15. The method of claim 14 wherein the method comprises attempting to decode decodable indicia utilizing image data captured with use of the second color imaging assembly.

16. A terminal for use in capture of data, the terminal comprising:

a housing having top, a first end, a second end, and a bottom;

a display having an associated touch panel disposed at said top of said housing, the display extending in a first plane;

a first color imaging assembly disposed in the housing for use in capture of images corresponding to objects disposed external to the housing, the first color imaging assembly having a color image sensor, the first color imaging assembly having a first imaging axis extending along a first line, wherein the terminal is operative for storing of frames of image data captured with use of the first color imaging assembly;

a second color imaging assembly disposed in the housing for use in capture of images corresponding to objects disposed external to the housing, the second color imaging assembly having a color image sensor, the second color imaging assembly having a second imaging axis extending along a second line, the second line being generally parallel with the first line, wherein the terminal is operative for storing of frames of image data captured with use of the second color imaging assembly;

wherein the terminal is operative so the each of the first color image sensor assembly and the second color image sensor assembly can be actuated by actuation of a displayed actuator displayed on the display;

wherein the terminal is operative so that when an image corresponding to an object disposed at a location in a first direction relative to the housing is captured utilizing the first color imaging assembly, the second color imaging assembly is oriented for capture of an image of an object at a location in a second direction relative to the housing, the second direction being opposite relative to the first direction;

wherein the terminal includes a radio communication interface for providing wireless communication with an external device.

17. The terminal of claim 16, wherein the terminal comprises a first manually displayed actuator for actuation of the first color imaging assembly and a second manually displayed actuator-for activation of the second imaging assembly.

18. The terminal of claim 16, wherein the first color imaging assembly comprises a variable focus lens assembly for use in changing a best focus distance of the first color imaging assembly.

19. The terminal of claim 16, wherein the terminal is operative to attempt to decode a decodable indicia utilizing image data captured with use of the first color imaging assembly.

20. The terminal of claim 16, wherein the terminal comprises a visible indicator and wherein the terminal is operative in an operating mode in which the terminal, (a) captures a frame of image data utilizing the second color imaging assembly; (b) responsively to the capture function (a) transmits data to an external computer for processing; (c) receives a signal from the external computer responsively to a result of the processing by the external computer and (d) responsively to the receipt of the signal activates the visible indicator.

21. The terminal of claim 20, wherein the visible indicator is a light source.

22. The terminal of claim 20, wherein the visible indicator is the display, and wherein for activation of the visible indicator the terminal displays a message on the display.

23. The terminal of claim 20, wherein the data transmitted by execution of function (b) is a decoded message.

24. The terminal of claim 16, wherein the terminal is operative in a mode in which the terminal is attached to an apparatus external to the terminal.

25. The terminal of claim 16, wherein the terminal comprises a card reader disposed at the first end of the housing, the card reader being operative for reading of cards selected from the group consisting of credit cards, debit cards, and customer loyalty cards.

* * * * *